(12) United States Patent
Mack

(10) Patent No.: US 7,979,475 B2
(45) Date of Patent: Jul. 12, 2011

(54) COHERENT DATA IDENTIFICATION METHOD AND APPARATUS FOR DATABASE TABLE DEVELOPMENT

(76) Inventor: Robert Mack, Hillsborough, NJ (US)

( * ) Notice: Subject to any disclaimer, the term of this patent is extended or adjusted under 35 U.S.C. 154(b) by 61 days.

(21) Appl. No.: 12/500,957

(22) Filed: Jul. 10, 2009

(65) Prior Publication Data

US 2010/0174720 A1    Jul. 8, 2010

Related U.S. Application Data

(63) Continuation-in-part of application No. 11/308,723, filed on Apr. 26, 2006.

(51) Int. Cl.
*G06F 17/30* (2006.01)
*G06F 15/16* (2006.01)

(52) U.S. Cl. .................. 707/803; 707/792; 707/802

(58) Field of Classification Search .................. 707/792, 707/802, 803, 999.102
See application file for complete search history.

(56) References Cited

U.S. PATENT DOCUMENTS

| | | | |
|---|---|---|---|
| 5,907,846 A | 5/1999 | Berner et al. ............. 707/103 R |
| 6,442,557 B1 * | 8/2002 | Buteau et al. ........................ 1/1 |
| 6,847,979 B2 | 1/2005 | Allemang et al. ............ 707/102 |
| 7,024,417 B1 | 4/2006 | Russakovsky et al. ........ 707/101 |
| 2002/0022987 A1 * | 2/2002 | Mahmood et al. .............. 705/10 |
| 2003/0018616 A1 * | 1/2003 | Wilbanks et al. ................. 707/2 |
| 2004/0236618 A1 * | 11/2004 | Smith et al. ........................ 705/7 |
| 2005/0004902 A1 | 1/2005 | Torigoe et al. .................... 707/3 |
| 2006/0195460 A1 * | 8/2006 | Nori et al. ..................... 707/100 |
| 2008/0189776 A1 * | 8/2008 | Constable ......................... 726/7 |

OTHER PUBLICATIONS http://www.datamodel.org/NormalizationRules.html, Mar. 4, 2009.
Quigley, Edward; Debons, Anthony Interrogative Theory Information and Knowledge, 1999.

\* cited by examiner

*Primary Examiner* — Tony Mahmoudi
*Assistant Examiner* — Brittany N McCue
(74) *Attorney, Agent, or Firm* — Walter J. Tencza, Jr.

(57) ABSTRACT

A method, apparatus, and system for configuring, designing, and/or implementing database tables is detailed that provides a framework into which a remainder of database tables are developed. Also detailed is a method to develop this framework of database tables. This so developed framework provides a platform for integrating data from multiple databases. A method is also provided for maintaining and managing master data as a single source of reference data to multiple databases that are based upon this framework.

19 Claims, 31 Drawing Sheets

Fig. 2
(Prior Art)

| First Normal Form (1NF) | Eliminate Repeating Groups - Make a separate table for each set of related attributes, and give each table a primary key. |
|---|---|
| Second Normal Form (2NF) | Eliminate Redundant Data - If an attribute depends on only part of a multi-valued key, remove it to a separate table. |
| Third Normal Form (3NF) | Eliminate Columns Not Dependent On Key - If attributes do not contribute to a description of the key, remove them to a separate table. |
| BCNF | Boyce-Codd Normal Form - If there are non-trivial dependencies between candidate key attributes, separate them out into distinct tables. |
| 4NF | Isolate Independent Multiple Relationships - No table may contain two or more 1:n or n:m relationships that are not directly related. |
| 5NF | Isolate Semantically Related Multiple Relationships - There may be practical constrains on information that justify separating logically related many-to-many relationships. |

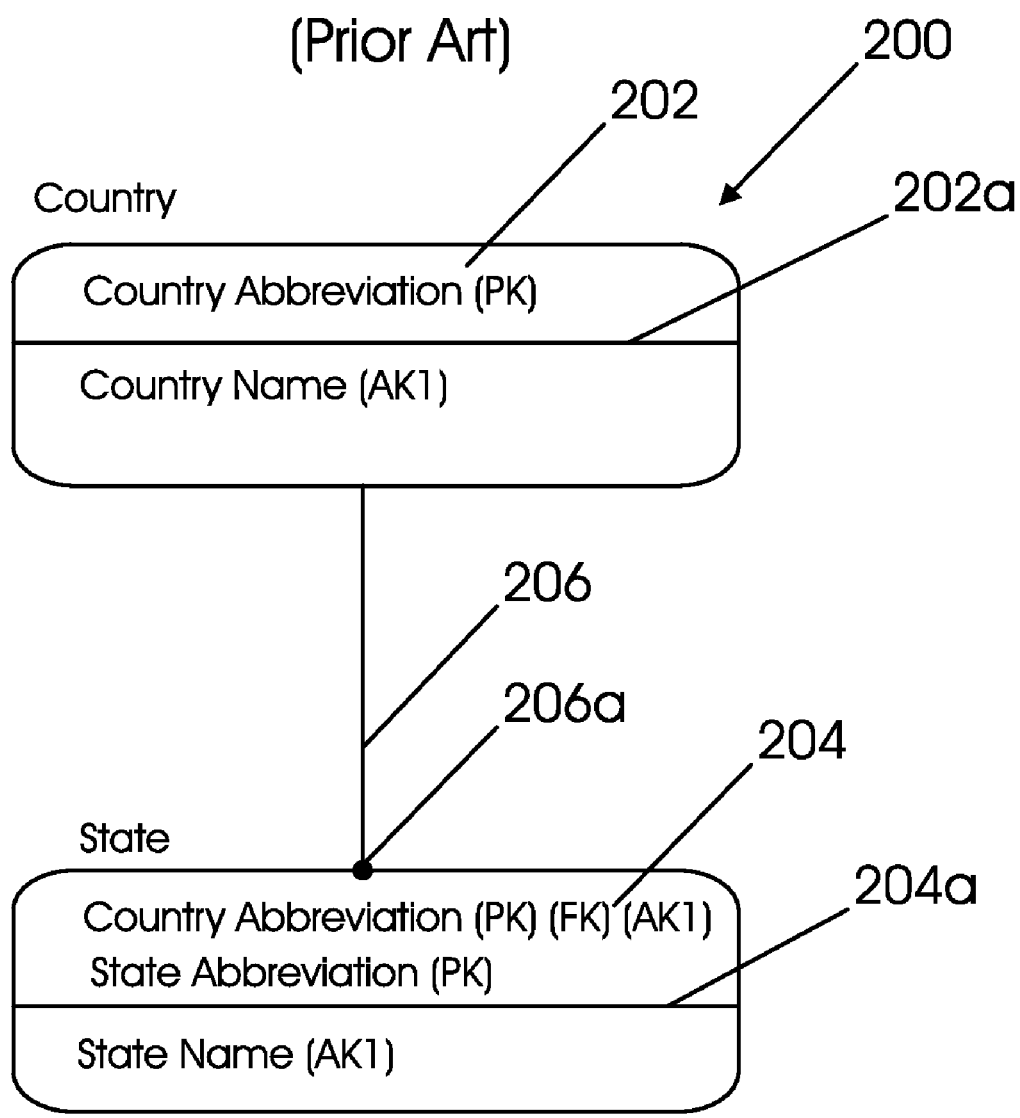

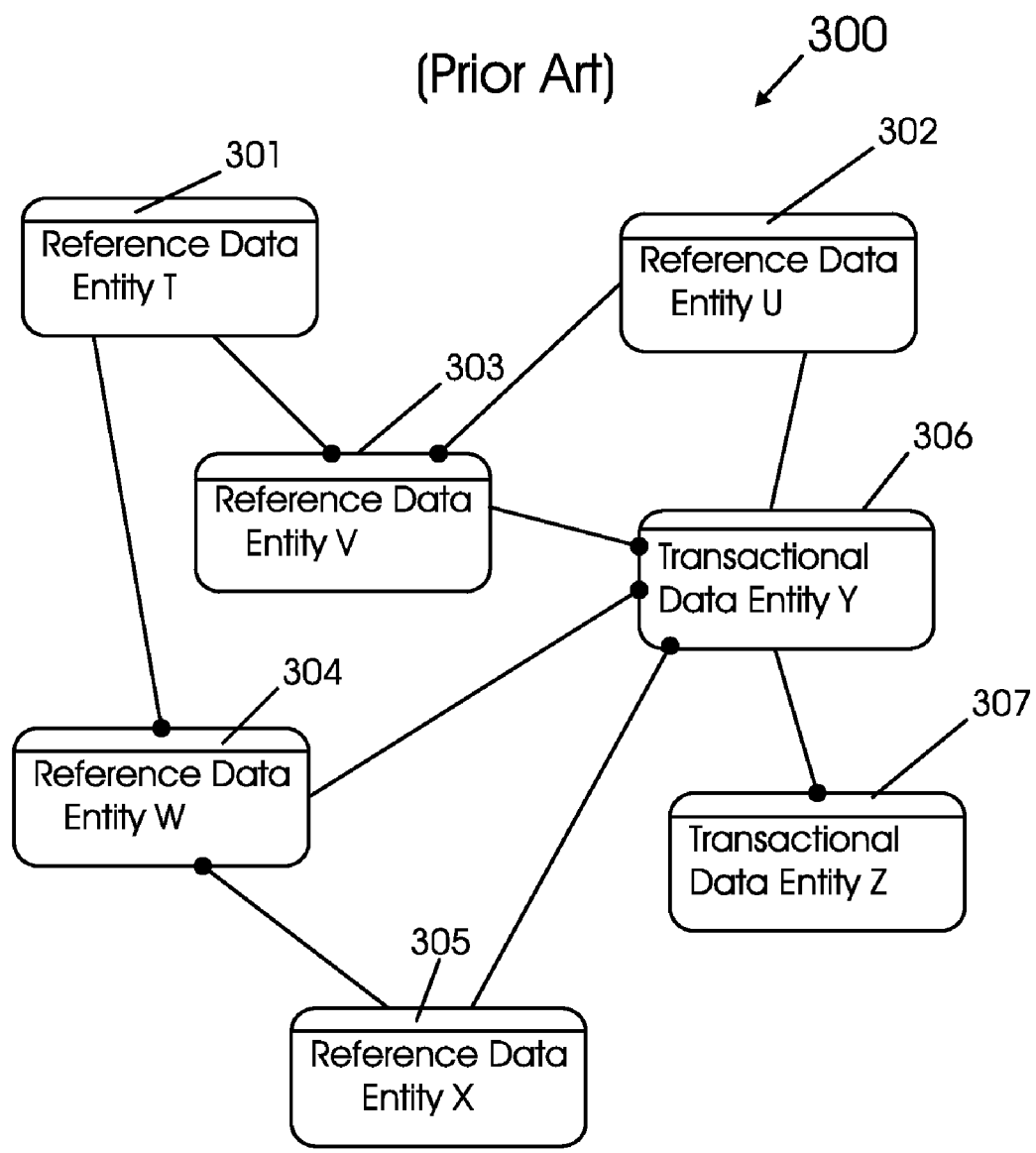

Fig. 5

| Date | Year | Month | Month Sequence in Year | Date Sequence In Year | Date Sequence In Month |
|---|---|---|---|---|---|
| 1/1/1991 | 1991 | January | 1 | 1 | 1 |
| 1/2/1991 | 1991 | January | 1 | 2 | 2 |
| 2/1/1991 | 1991 | February | 2 | 32 | 1 |
| 2/2/1991 | 1991 | February | 2 | 33 | 2 |
| 3/1/1991 | 1991 | March | 3 | 60 | 1 |
| 1/1/1992 | 1992 | January | 1 | 1 | 1 |
| 2/1/1992 | 1992 | February | 2 | 32 | 1 |

Gregorian Calendar Year — 700

| Year (PK) |
|---|
| 1991 |
| 1992 |

Gregorian Calendar Month — 800

| Year (PK, FK) | Month (PK) | Month Sequence in Year |
|---|---|---|
| 1991 | January | 1 |
| 1991 | February | 2 |
| 1991 | March | 3 |
| 1992 | January | 1 |
| 1992 | February | 2 |

Gregorian Calendar Date — 900

| Date (PK) | Year (FK) | Month (FK) | Date Sequence In Year | Date Sequence In Month | |
|---|---|---|---|---|---|
| 1/1/1991 | 1991 | January | 1 | 1 | 901 902 |
| 1/2/1991 | 1991 | January | 2 | 2 | 903 |
| 2/1/1991 | 1991 | February | 32 | 1 | 904 |
| 2/2/1991 | 1991 | February | 33 | 2 | 905 |
| 3/1/1991 | 1991 | March | 60 | 1 | 906 |
| 1/1/1992 | 1992 | January | 1 | 1 | 907 |
| 2/1/1992 | 1992 | February | 32 | 1 | |

Fig. 7B
(Prior Art)

Gregorian Calendar Month — 1000

| Year (PK) | Month (PK) | |
|---|---|---|
| 1991 | January | 1001 1002 |
| 1991 | February | 1003 |
| 1991 | March | 1004 |
| 1992 | January | 1005 |
| 1992 | February | |

Fig. 8A
(Prior Art)

Gregorian Calendar Month Sequence — 1100

| Month (PK) (FK) | Month Sequence in Year |
|---|---|
| January | 1 |
| February | 2 |
| March | 3 |

| Year | Month | Country | Product | Product Market Group | Sales |
|---|---|---|---|---|---|
| 1991 | January | USA | XYZ | US-XYZ | $37,000 |
| 1991 | January | Canada | XYZ | CA-XYZ | $67,000 |
| 1991 | February | USA | XYZ | US-XYZ | $34,500 |
| 1991 | February | Canada | XYZ | CA-XYZ | $124,000 |
| 1991 | March | USA | XYZ | US-XYZ | $45,000 |
| 1992 | March | Canada | XYZ | CA-XYZ | $64,500 |

Fig. 9A
(Prior Art)

Calendar Year ← 1300

| Year Number (PK) | Start Date (AK1) | End Date (AK1) |
|---|---|---|
| 1990 | 1/1/1990 | 12/31/1990 |
| 1991 | 1/1/1991 | 12/31/1991 |
| 1992 | 1/1/1992 | 12/31/1992 |
| 1993 | 1/1/1993 | 12/31/1993 |
| 1994 | 1/1/1994 | 12/31/1994 |

Fig. 9B
(Prior Art)

Calendar Year ← 1400

| Year ID (PK) | Year Number (AK1) | Start Date (AK2) | End Date (AK2) |
|---|---|---|---|
| 1 | 1990 | 1/1/1990 | 12/31/1990 |
| 2 | 1991 | 1/1/1991 | 12/31/1991 |
| 3 | 1992 | 1/1/1992 | 12/31/1992 |
| 4 | 1993 | 1/1/1993 | 12/31/1993 |
| 5 | 1994 | 1/1/1994 | 13/31/1994 |

Fig. 10A

(Prior Art)

Calendar Quarter    1500

| Quarter ID (PK) | Year ID (FK) (AK1) | Quarter Name (AK1) | Start Date (AK2) | End Date (AK2) |
|---|---|---|---|---|
| 1 | 1 | 1st | 1/1/1990 | 3/31/1990 |
| 2 | 1 | 2nd | 4/1/1990 | 6/30/1990 |
| 3 | 1 | 3rd | 7/1/1990 | 9/30/1990 |
| 4 | 1 | 4th | 10/1/1990 | 12/31/1990 |

Fig. 10B

When Unified Ultimate Reference    1600

| When Universal Surrogate Identification Number (PK) | Start Time Period (Ak1) | End Time Period (Ak1) | Year | Month Name | Date |
|---|---|---|---|---|---|
| 10001 | 1/1/1991 | 1/1/1991 | 1991 | January | 1/1/1991 |
| 10002 | 1/2/1991 | 1/2/1991 | 1991 | January | 1/2/1991 |
| 10003 | 2/1/1991 | 2/1/1991 | 1991 | February | 2/1/1991 |
| 10004 | 2/2/1991 | 2/2/1991 | 1991 | February | 2/2/1991 |
| 10005 | 3/1/1991 | 3/1/1991 | 1991 | March | 3/1/1991 |
| 10006 | 1/1/1992 | 1/1/1992 | 1992 | January | 1/1/1992 |
| 10007 | 2/1/1992 | 2/1/1992 | 1992 | February | 2/1/1992 |

When Unified Reference Data Entity  
1700

| When Univeral Surrogate ID Number (PK) | Start Time Period (AK1) | End Time Period (AK1) | Data Context (AK1) | Data Context Level (AK1) | Year | Month Name | Date |
|---|---|---|---|---|---|---|---|
| 1 | 1/1/1991 | 12/31/1991 | Gregorian Calendar | Year | 1991 | | |
| 2 | 1/1/1992 | 12/31/1992 | Gregorian Calendar | Year | 1992 | | |
| 3 | 1/1/1991 | 1/31/1991 | Gregorian Calendar | Month | 1991 | January | |
| 4 | 2/1/1991 | 2/28/1991 | Gregorian Calendar | Month | 1991 | February | |
| 5 | 3/1/1991 | 3/31/1991 | Gregorian Calendar | Month | 1991 | March | |
| 6 | 1/1/1992 | 1/31/1992 | Gregorian Calendar | Month | 1992 | January | |
| 7 | 2/1/1992 | 2/29/1992 | Gregorian Calendar | Month | 1992 | February | |
| 10001 | 1/1/1991 | 1/1/1991 | Gregorian Calendar | Date | 1991 | January | 1/1/1991 |
| 10002 | 1/2/1992 | 1/2/1991 | Gregorian Calendar | Date | 1991 | January | 1/2/1991 |
| 10003 | 2/1/1991 | 2/1/1991 | Gregorian Calendar | Date | 1991 | February | 2/1/1991 |
| 10004 | 2/2/1991 | 2/2/1991 | Gregorian Calendar | Date | 1991 | February | 2/2/1991 |
| 10005 | 3/1/1991 | 3/1/1991 | Gregorian Calendar | Date | 1991 | March | 3/1/1991 |
| 10006 | 1/1/1992 | 1/1/1992 | Gregorian Calendar | Date | 1992 | January | 1/1/1992 |
| 10007 | 2/1/1992 | 2/1/1992 | Gregorian Calendar | Date | 1992 | February | 2/1/1992 |

When Unified Reference Data Entity

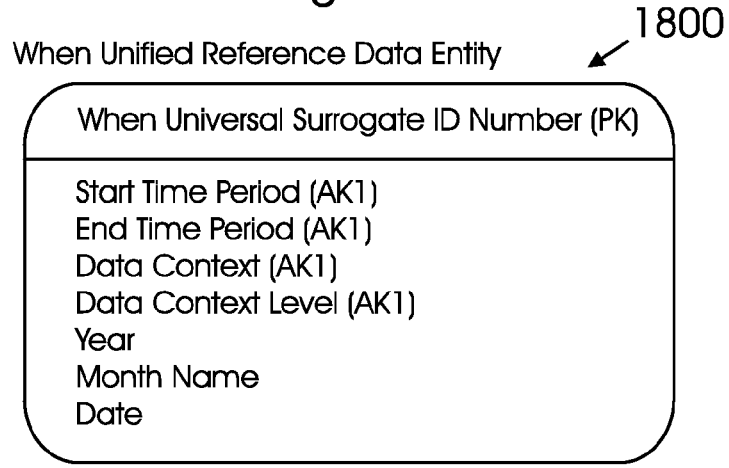
1800

When Universal Surrogate ID Number (PK)

Start Time Period (AK1)
End Time Period (AK1)
Data Context (AK1)
Data Context Level (AK1)
Year
Month Name
Date

When Unified Reference Data Entity

| When Universal Surrogate Identification Number (PK) | Start Time Period (AK1) | End Time Period (AK1) | Data Context (AK1) | Data Context Level (AK1) | Year | Month Name | Date |
|---|---|---|---|---|---|---|---|
| 10001 | 1/1/1991 | 1/1/1991 | Gregorian Calendar | Date | 1991 | January | 1/1/1991 |
| 10002 | 1/2/1991 | 1/2/1991 | Gregorian Calendar | Date | 1991 | January | 1/2/1991 |
| 10003 | 2/1/1991 | 2/1/1991 | Gregorian Calendar | Date | 1991 | February | 2/1/1991 |
| 10004 | 2/2/1991 | 2/2/1991 | Gregorian Calendar | Date | 1991 | February | 2/2/1991 |
| 10005 | 3/1/1991 | 3/1/1991 | Gregorian Calendar | Date | 1991 | March | 3/1/1991 |
| 10006 | 1/1/1992 | 1/1/1992 | Gregorian Calendar | Date | 1992 | January | 1/1/1992 |
| 10007 | 2/1/1992 | 2/1/1992 | Gregorian Calendar | Date | 1992 | February | 2/1/1992 |

Fig. 13

When Unified Reference Data Entity 2000

| When Universal Surrogate Identification Number (PK) | Start Time Period (AK1) | End Time Period (AK1) | Data Context (AK1) | Data Context Level (AK1) | Name | Year | Month Name | Date |
|---|---|---|---|---|---|---|---|---|
| 1 | 1/1/1991 | 12/31/1991 | Gregorian Calendar | Year | 1991 | 1991 | | |
| 2 | 1/1/1992 | 12/31/1992 | GregorianCalendar | Year | 1992 | 1992 | | |
| 3 | 1/1/1991 | 1/31/1991 | Gregorian Calendar | Month | Jan. 1991 | 1991 | January | |
| 4 | 2/1/1991 | 2/28/1991 | GregorianCalendar | Month | Feb. 1991 | 1991 | February | |
| 5 | 3/1/1991 | 3/31/1991 | Gregorian Calendar | Month | March 1991 | 1991 | March | |
| 6 | 1/1/1992 | 1/31/1992 | Gregorian Calendar | Month | Jan. 1992 | 1992 | January | |
| 7 | 2/1/1992 | 2/29/1992 | Gregorian Calendar | Month | Feb. 1992 | 1992 | February | |
| 10001 | 1/1/1991 | 1/1/1991 | Gregorian Calendar | Date | Jan. 1, 1991 | 1991 | January | 1/1/1991 |
| 10002 | 1/2/1991 | 1/2/1991 | Gregorian Calendar | Date | Jan. 2, 1991 | 1991 | January | 1/2/1991 |
| 10003 | 2/1/1991 | 2/1/1991 | Gregorian Calendar | Date | Feb. 1, 1991 | 1991 | February | 2/1/1991 |
| 10004 | 2/2/1991 | 2/2/1991 | Gregorian Calendar | Date | Feb. 2, 1991 | 1991 | February | 2/2/1991 |
| 10005 | 3/1/1991 | 3/1/1991 | Gregorian Calendar | Date | March 1, 1991 | 1991 | March | 3/1/1991 |
| 10006 | 1/1/1992 | 1/1/1992 | Gregorian Calendar | Date | Jan. 1, 1992 | 1992 | January | 1/1/1992 |
| 10007 | 2/1/1992 | 2/1/1992 | Gregorian Calendar | Date | Feb. 1, 1992 | 1992 | February | 2/1/1992 |
| 20001 | 3/21/1991 | 6/21/1991 | Gregorian Calendar | Season | Spring 1991 | 1991 | | |
| 20002 | 6/21/1991 | 9//21/1991 | Gregorian Calendar | Season | Summer 1991 | 1991 | | |
| 30003 | 1/1/1901 | 12/31/2000 | Gregorian Calendar | Century | 20th Century | | | |
| 40004 | 1/1/1991 | 12/31/1991 | Julian Calendar | Year JD | 1991 JD | 1991 | | |

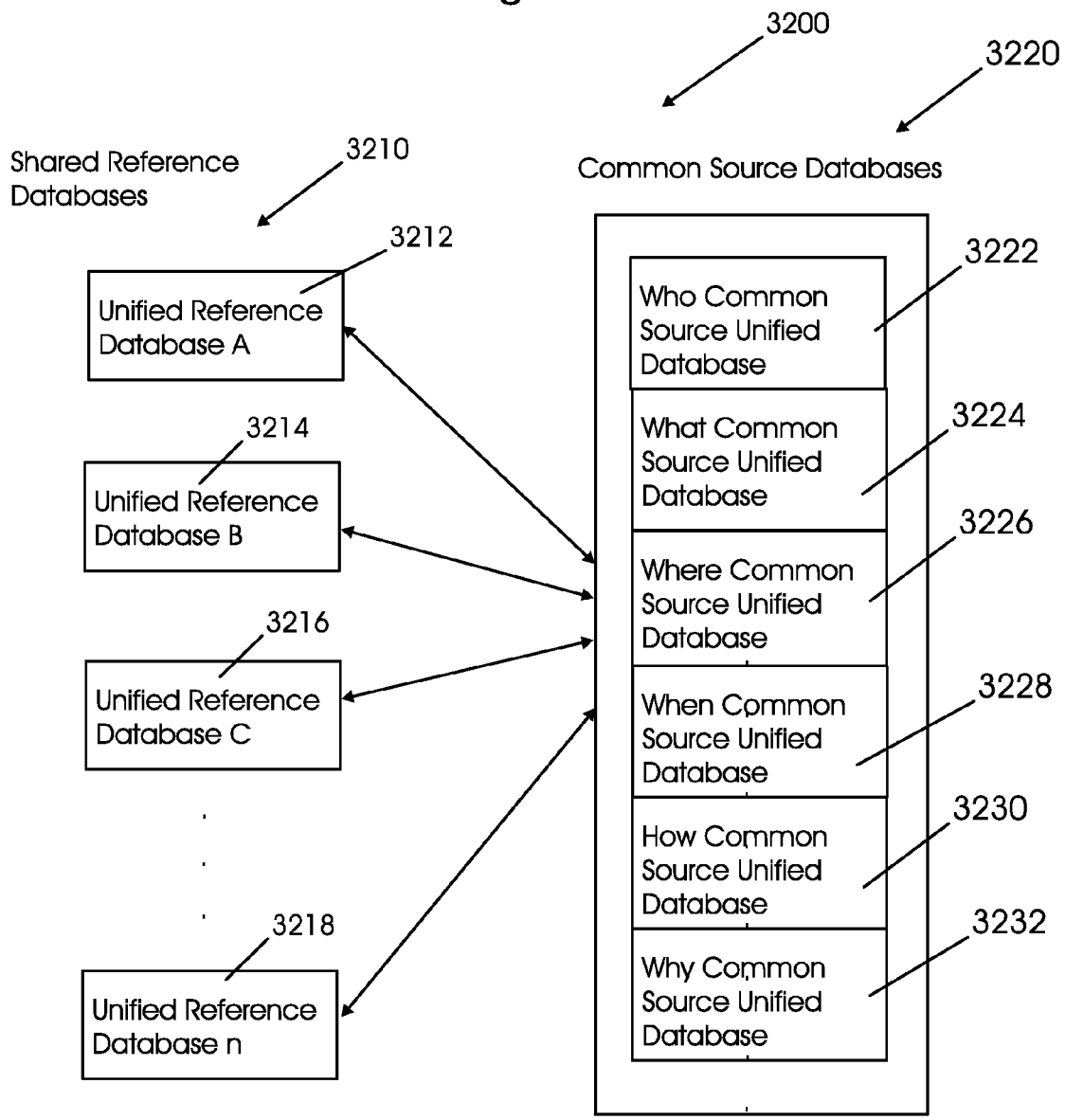

Fig. 26

| Constituent Data Item Name | Constituent Data Item Definition | Reference Data Item Indicator | Who | What | Where | When | How | Why | Business Key Data Items |
|---|---|---|---|---|---|---|---|---|---|
| Corporation | An organization incorporated by a governing authority. | Yes | Yes | No | No | No | No | No | Organization ID (Organization) (AK1), Organization ID (Governing Authority) (AK1), Geographic Area ID (AK1) |
| Country | A geographic area or a governing authority of a nation. | Yes | Yes | No | Yes | No | No | No | Geographic Area ID, Organization ID |
| Customer | A person or organization that purchases products or services. | Yes | Yes | No | No | No | No | No | Customer Number |
| Date | A time period of twenty-four hour duration that represents a particular day, within a particular month, and within a particular year. | Yes | No | No | No | Yes | No | No | Start Time Period, End Time Period (AK1) or Date designation (AK2) |
| Date Seq. In Year | The sequential number of the day within a particular year. | No | No | No | No | Yes | No | No | None |
| Month | A time period of duration between 28 and 31 days that ... | Yes | No | No | No | Yes | No | No | Start Time Period, End Time Period (AK1) or Month designation (AK2) |
| Month Seq. In Year | The sequential number of the month within a year. | No | No | No | No | Yes | No | No | None |
| Product | A commodity offered for sale. | Yes | No | Yes | No | No | No | No | Universal Product Code |
| Product Market Grp. | Used to identify a group of customers to which a product group is marketed. | Yes | Yes | Yes | Yes | No | Yes | No | Product Market Group Code |
| Sales Amount | The amount of money in a specific currency received for the sale ... | No | Yes | Yes | No | No | Yes | Yes | None |
| Year | A time period of 365 or 366 days ... | Yes | No | No | No | Yes | No | No | Start time Period, End Time Period (AK1) or Year designation(AK2) |
| Organization | A group of persons organized ... | Yes | Yes | No | No | No | No | No | Organization ID |
| Governing Authority | An organization that has rule over a geographic area... | Yes | Yes | No | Yes | No | No | No | Organization ID, Geographic Area ID |
| Geographic Area | A named and a demarcated area of the Earth. | Yes | No | No | Yes | No | No | No | Geographic Area ID |
| Time Period | Begins on a date and ends ... | Yes | No | No | No | Yes | No | No | Start time Period, End Time Period (AK1) or time period designation(AK2) |
| Person | A human being. | Yes | Yes | No | No | No | No | No | Person ID |

COHERENT DATA IDENTIFICATION METHOD AND APPARATUS FOR DATABASE TABLE DEVELOPMENT

CROSS REFERENCE TO RELATED APPLICATION(S)

The present application is a continuation in part of and claims the priority of U.S. patent application Ser. No. 11/308,723, filed on Apr. 26, 2006, inventor and applicant Robert Mack.

FIELD OF THE INVENTION

This invention relates to improved methods and apparatus concerning the design and development of data models and the deployment of database tables and other associated database objects.

BACKGROUND OF THE INVENTION

Database development is a relatively new technology dating back to around the 1960's. Initially, individual data items were grouped into database tables based upon some functional need. In the early 1970's, a data flow diagram method was developed to depict the data as inputs and outputs to data processing functions. The data groupings depicted as inputs and as outputs became database tables or data files. The data processing functions were programmed as computer software to read and write data into these database tables or data files. Around this same time, data normalization rules were formulated that dictated how to develop normalized groupings of data items where the normalized groupings were independent of the data processes that use them. Each so developed data item normalized grouping often became a database table. The data normalization rules were developed to create databases with minimal data storage requirements. At that time, data storage was a very expensive commodity and minimizing a database's data storage yielded a less expensive data system solution.

In 1976, the concept of entity-relationship diagramming and data modeling was developed. One function of data models is to design the structures of databases such as database tables and database table columns. A data model is a combination of the entity-relationship diagram and its associated metadata, all of which is typically stored in a computer memory.

Each data item or data attribute of a data model must also have metadata defined for it. Metadata is often referred to as the data about data. Metadata is information about specific data items such as the definition of the data item along with the type of data, the length and precision of the data, valid acceptable data values, and whether a data value is required or optional. The metadata of a data system is often recorded in a data model. Sometimes, the metadata of a data system, including the data model, is stored in a metadata repository. Over time, the entity-relationship diagram method replaced the data flow diagram method. Today, entity-relationship diagrams and data model concepts are used by the majority of database designers. Entity-relationship diagrams have become the basis of the process of data modeling.

In the late 1980's, another method to the data normalization rules based database table development was developed, which was referred to as "data warehouse design methodology". It was, developed mainly for optimizing report generation speed from a database. Now, instead of the data storage efficiency provided via normalized database tables, the data warehouse database uses data redundancy to improve data retrieval speed. In the data warehouse database, redundant data abounds, which often improves the data retrieval speeds. The data warehouse development method begins with the same data normalization rules methods employed previously. However, the data items are then de-normalized in computer memory to form data warehouse database tables of two types. These two data warehouse database table types are the dimensional database tables and the fact database tables. In general, the fact type database tables contain mostly quantitative data items or data items that have numerical data values while the dimensional type database tables contain mostly non-quantitative data items or data items that have textual data values.

Databases developed and stored as data warehouses in a computer memory are additional to databases developed and stored in a computer memory using data normalization rules. In fact, data normalization developed databases often referred to as on-line transactional processing (OLTP) databases are the source of data for most data warehouse type databases. OLTP databases are used to collect data needed for the day to day operations of the organization while data warehouse databases use this collected data to generate complex reports about how the organization is performing. In some cases, data warehouse databases are sourced from unstructured data files usually associated with legacy mainframe data systems. These legacy mainframe data systems were often implemented before the data normalization rules were developed.

Alternative data model development methods have since been developed that are variations of the entity-relationship diagrams. These alternative data model development methods are also computer based software applications that include the Unified Modeling Language method and the Object-Oriented Data Modeling method. Also, some vendors supply skeletal data models stored in computer memory that are incomplete data models usually specific to certain industries. The purchased skeletal data models are then completed in computer memory where more specific data requirements are implemented.

SUMMARY OF THE INVENTION

One or more embodiments of the present invention include a method of placing a data item into an individual column of a database table and grouping data items into a single coherent database table, in a computer memory. The method may further include the addition of more data items to a database table, in a computer memory, for the purposes of combining data in multiple database tables, in a computer memory. In addition, a method in accordance with an embodiment of the present invention may include the creation, in a computer memory, of unique indices to aid in the retrieval of the data records stored in said database tables in a computer memory.

A coherent data identification method, in accordance with one or more embodiments of the present invention, is typically not used to optimize data storage in a computer memory via data normalization or to facilitate data reporting via data warehouse databases in computer memory as are the focus of prior database development methods. The concern for the coherent data identification method of one or more embodiments of the present invention is in developing core database table structures that are standardized. One or more embodiments of the present invention develops standard core database tables in a computer memory that may be incorporated into many databases in computer memory thus providing a data sharing functionality to these so developed databases.

A coherent data identification method in accordance with one or more embodiments of the present invention begins with a data item classification method, which can be executed by a computer processor programmed by computer software. This data item classification method, in one or more embodiments of the present invention, is programmed through computer software to yield a framework of data commonality that allows sharing of data between these so developed databases, which are stored in one or more computer memories. With the coherent data identification method of one or more embodiments of the present invention, database tables are not developed to be identified independently. Instead, these database tables are developed as a coherent grouping of tables, in one or more computer memories, so that the data is more integrated or universally identified. This coherent data identification of these database tables, in one or more computer memories, becomes important as it provides additional functionality in the definition of all database tables, in one or more computer memories. That is, with a coherent data identification method of one or more embodiments of the present invention, database tables are developed more as clusters of coherent database tables in one or more computer memories, as opposed to independent database tables. The resulting database data records are more universally identified since all database tables are considered instead of developing database tables as totally independent data structures.

A coherent data identification method in one or more embodiments is preferably incorporated as a first consideration to any new database table development methodology. A coherent data identification method in accordance with one or more embodiments of the present invention does not replace the data normalization methods or data warehouse database development methods previously known in the art, but is used as a precursor for these previously known database development methods. Within this foundation of data sharing, data normalization and data de-normalization may be used to further refine the database table structures developed by a coherent data identification method in accordance with embodiments of the present invention.

BRIEF DESCRIPTION OF THE DRAWINGS

FIG. 2 shows a spreadsheet of rules for data normalization in accordance with a prior art database table development method;

FIG. 3A shows a prior art simple logical-level entity-relationship diagram of a country data entity and a related state data entity;

FIG. 3B shows a prior art high-level or conceptual entity-relationship diagram;

FIG. 5 shows a spreadsheet of Gregorian calendar data items that can be displayed on a display device of the apparatus of FIG. 1 or stored in a computer memory of the apparatus of FIG. 1;

FIG. 6A shows a prior art first normal form (1NF) database table of Gregorian calendar years as derived from the spreadsheet of data items in FIG. 5 based upon the first normal form data normalization rule in FIG. 2, the result of which can be stored in the computer memory or displayed on the display device of FIG. 1;

FIG. 6B shows a prior art first normal form (1NF) database table of Gregorian calendar months as derived from the spreadsheet of data items in FIG. 5 based upon the first normal form data normalization rule in FIG. 2, the result of which can be stored in the computer memory or displayed on the display device of FIG. 1;

FIG. 7A shows a prior art first normal form (1NF) database table of Gregorian calendar dates as derived from the spreadsheet of data items in FIG. 5 based upon the first normal form data normalization rule in FIG. 2, the result of which can be stored in the computer memory or displayed on the display device of FIG. 1;

FIG. 7B shows a prior art second normal form (2NF) database table of Gregorian calendar months as derived from the first normal form (1NF) database table in FIG. 6B based upon the second normal form data normalization rule in FIG. 2, the result of which can be stored in the computer memory or displayed on the display device of FIG. 1;

FIG. 8A shows a prior art second normal form (2NF) database table of Gregorian calendar month sequences as derived from the first normal form (1FN) database table in FIG. 6B based upon the second normal form data normalization rule in FIG. 2, the result of which can be stored in the computer memory or displayed on the display device of FIG. 1;

FIG. 8B shows a spreadsheet of sales related data items for data item classification, which can be stored in the computer memory or displayed on the display device of FIG. 1;

FIG. 9A shows a prior art database table containing calendar year data items and based upon a business key as the designated primary key, Year Number (PK), which can be stored in the computer memory or displayed on the display device of FIG. 1;

FIG. 9B shows a prior art database table containing calendar year data items and based upon a surrogate key as the designated primary key, Year ID (PK), and the year number data item as the first alternate key, Year Number (AK1), and a second alternate key that is a compound alternate key, Start Date (AK2) and End Date (AK2), which can be stored in the computer memory or displayed on the display device of FIG. 1;

FIG. 10A shows a prior art database table containing calendar quarter data items with a Quarter ID (PK) primary key, a Year ID (FK) foreign key, and a Year ID (AK1) and Quarter Name (AK1) composite first alternate key, as well as a Start Date (AK2) and End Date (AK2) second composite alternate key that can be stored in the computer memory or displayed on the display device of FIG. 1;

FIG. 10B shows a when unified reference database table of time periods with a universal surrogate identifier number, When Universal Surrogate Identification Number (PK), with a start time period (AK1), and with an end time period (AK1), which could be the result of process steps 2402, and 2404 of flow chart 2400 shown in FIG. 17, which can be stored in the computer memory or displayed on the display device of FIG. 1;

FIG. 11 shows a when unified reference database table of time periods with two data context data items added and included into an alternate key, which could be the result of process steps 2502, 2504, and 2506 of flow chart 2500 shown in FIG. 18, which can be stored in the computer memory or displayed on the display device of FIG. 1;

FIG. 12A shows a detailed or logical-level data model's when unified reference data entity that may be used to database instantiate the database table shown in FIG. 11 into a database, and that could result after process step 2206 of flow chart 2200 shown in FIG. 15;

FIG. 12B shows the when unified reference database table representation of the same Gregorian calendar dates' data values that are shown spreadsheet 600 of FIG. 5, which can be stored in the computer memory or displayed on the display device of FIG. 1;

FIG. 13 shows a more extensive database table 2000 of time periods with a time period name column added along with various time period example data records of different Data Context (AK1) data values and Data Context Level (AK1) data values, which can be stored in the computer memory or displayed on the display device of FIG. 1;

FIG. 25 shows a diagram of a plurality of common source databases 3220 comprised of six common source unified databases 3222, 3224, 3226, 3228, 3230, and 3232 where common reference data records are maintained and shared with a plurality of shared reference databases 3210 composed of several application unified reference databases 3212, 3214, 3116 and 3218; and FIG. 26 shows a spreadsheet of metadata which can be stored in the computer memory or displayed on the display device of FIG. 1.

DETAILED DESCRIPTION OF THE DRAWINGS

Figure 1:
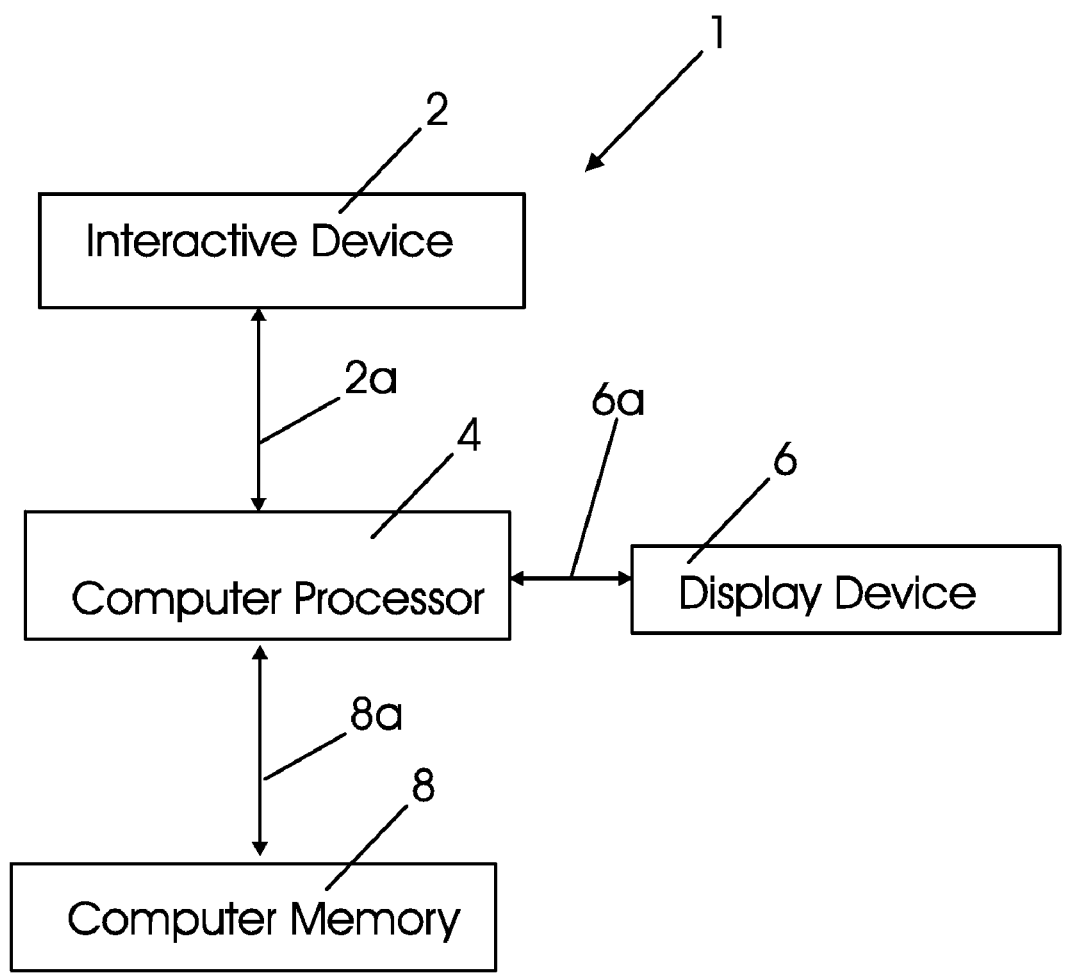
FIG. 1 shows a diagram of an apparatus in accordance with an embodiment of the present invention.

In the present application the following terms have the following definitions:

Alternate key—In an entity-relationship diagram, a data entity's alternate key is a unique key, stored in one or more computer memories, such as computer memory 8 in FIG. 1 that is declared in the entity-relationship diagram as an alternate method of selecting unique data records from a resultant database table in one or more computer memories. In FIG. 1, the computer memory 8 may actually include one or more computer memories. A database table's alternate key is a unique index placed upon the database table in one or more computer memories by the database management system implemented by a computer processor, such as computer processor 4 in FIG. 1 and used to select data records from the database table.

Business key—In an entity-relationship diagram, a data entity's business key is typically based solely upon one or more data items of significance to a business. The business key may also be declared as a primary key or as an alternate key by a computer user utilizing a CASE tool or data modeling tool that is executing on a computer processor such as in one or more computer memories. There may be one or more business keys declared, for each data entity in the data model and all business keys may be database instantiated by executing computer software such as a database management system into the database as unique indexes associated with database tables.

Business key data item—A business key data item is a data item that is used in one or more business keys as the entire business key or as a part of a compound business key.

CASE tool—A CASE tool is a computer software package that is executed on a computer processor, such as computer processor 4 of FIG. 1, for the purpose of developing and documenting data systems. CASE stands for Computer Aided Software Engineering. Generally, speaking, most CASE tools include a data modeling component to develop entity-relationship diagrams, to manage metadata and to aid in designing and implementing database tables.

Common interrogative—A common interrogative is a word used to ask questions. In the English language, the common interrogatives are Who, What, Where, When, How and Why. The use of common interrogatives is for the purpose of differentiating and classifying information and knowledge. Beyond this classification, in one or more embodiments of the present invention, associating a reference data item ("reference data item" is defined later) to one and only one interrogative provides a method that aids in determining if a reference data item may be an elemental reference data item ("elemental reference data item" is defined later). This use of one and only one interrogative to aid in determining whether a reference data item is an elemental reference data item is not known in the prior art.

Common source database—A common source database is a database in computer memory used as a repository of reference data records for multiple databases that require such a set of reference data records. Reference data records are data records comprised of reference data items ("reference data item" is defined later). A common source database is typically used to maintain the data quality of a set of reference data records. Each database that requires such a set of reference data records will normally contain only a subset of the reference data records that are maintained in a common source database in a computer memory.

Common source unified database—A common source unified database is a unified reference database ("unified reference database" is defined later) that is used as a source of unified reference data records to multiple unified reference databases that require such a set of reference data records. A unified reference data record is a data record comprised of reference data items ("reference data item" is defined later) that is stored in a unified reference database table which was database instantiated from a unified reference data entity ("unified reference data entity" is defined later). A common source unified database is typically used to maintain data quality of a set of unified reference data records. Each unified reference database that requires such a set of reference data records will normally contain only a subset of the unified reference data records that are maintained in a common unified source database. The common source unified database as well as the databases that require the reference data stored in the common source database are all stored in computer memory.

Conceptual data model—A conceptual data model is a high-level data model that typically shows an entity-relationship diagram where the entities are merely named but no data attributes or data entity keys are shown. A conceptual data model is typically stored in computer memory. The conceptual data model will normally be developed into a logical data model ("logical data model" defined later) in preparation for database instantiation ("database instantiation" defined later).

Constituent data item—A constituent data item is a compounded data item that may be comprised of more than one data item. For example, a constituent data item, such as a postal address, may be decomposed into multiple postal address line data items. Each postal address line data item may again be further decomposed, for example, into a city data item, a state data item and a ZIP Code data item. A ZIP Code data item may be decomposed into the five digit ZIP Code data item and the plus four digit ZIP Code data item. These constituent data items should be further decomposed into single data value data items for each data record in a database table in an attempt to find elemental reference data items.

Database—A database is generally a grouping of data values typically stored in a computer memory and organized for convenient access. More specific to this patent application, a database is a defined data structure, generally stored in computer memory, comprised of database tables and other database objects defined using a database management system. In the present application a database management system is a computer software application for maintaining database objects as well as database data values.

Database index—A database index is a type of database object stored in computer memory that is associated to a database table. A database index may be comprised of a single database table column or be comprised of multiple database table columns from the same database table. A database index may be designed as a unique index, which may use a key data value only once per database table, or designed as a non-unique index, which may repeat key data values in that database table. Database indexes are used to maintain the data value integrity of the database table data records as well as to aid in the rapid retrieval of specific data records from a database table.

Database instantiation—The process of database instantiation is used to construct and manage public database objects. Public database objects are database objects that are available within a database through use of, for example, interactive device 2 and computer processor 4 shown in FIG. 1 to a database user. These public database objects are created, maintained and deleted by a typically very complex computer software program referred to as a database management system. A database management system is a computer program that executes on a computer and that may be used to support multiple databases on one or more computers. A database created under a database management system is stored in computer memory. This database instantiation process is often controlled by another computer software program such as a data modeling tool or a CASE tool. CASE stands for Computer Aided Software Engineering. Once a physical data model ("physical data model" is defined later) has been developed within the data model tool or the CASE tool, that physical data model is forward engineered. This process of forward engineering, which may be programmed on a computer program, instructs the database management system to construct these public database objects such as database tables, database table indexes, and database table constraints. These public database objects are distinguished from the private database objects that already exist to support the database management system and that are not normally available to database users. Private database objects are stored in computer memory, such as computer memory 8, but typically the computer processor 4 would be programmed to not make the private objects easily available to a user. That is, the database management system controls database access to database objects for each database user defined by the database management system. The process of database instantiation converts the physical data model objects and metadata into public database objects. Each data entity of the physical data model is converted into a database table, which is stored in computer memory, such as computer memory 8 shown in FIG. 8, where each data attribute of the physical data model becomes a column within a database table stored in computer memory. The metadata associated with each data attribute of the physical data model are used to define the data types for each database table column, as well as the column's data lengths, the column's precision, and whether the column must be populated with data for each data record. The physical data model keys such as primary keys, alternate keys, and foreign keys, become database table unique and non-unique indexes. Some data model tools or CASE tools will produce a script of data definition language (DDL) computer software from the forward engineering or conversion of the physical data model. This script of data definition language (DDL) computer software is a type of standard query language (SQL) computer software that will be interpreted by the database management system computer software to actually construct the public database objects within a database. For example, the following SQL command statement:

```
CREATE TABLE employees (
    id         INTEGER PRIMARY KEY,
    first_name CHAR(50) NULL,
    last_name  CHAR(75) NOT NULL,
    dateofbirth DATE NULL
);
```

This SQL command statement is used to create a database table named employees that includes 4 database table columns named id, first name, last name and date of birth. The database table column named id has a data type of integer that will accept only numeric integers as data values and is declared as the database table's primary key data item. The database table column named first name has a data type to support textual data values containing up to 50 alphanumeric characters. This database table column does not require a data value. The database table column named last name requires a data value that is textual containing up to 75 alphanumeric characters. The database table column named date of birth does not require a data value and any data value entered must represent a valid calendar date. There are also many other SLQ commands that may be used for example to alter a database table, to drop or delete a database table, to create, alter or delete database table indexes, and to grant various levels of access to database objects.

Database table identifying keys—A database table identifying key is comprised of one or more data items stored in computer memory, used in combination to provide unique identification for all data records to be stored in the database table. That is, the data values of the identifying keys may only be found once in the entire database table of data records. Identifying keys are categorized as primary keys or alternate keys. There may only be one primary key declared per database table, however, multiple alternate keys may be declared for that same database table. All database table identifying keys are stored in computer memory via the database management system software executing on a computer processor 4.

Data context data items—A data context data item is a data item stored in computer memory added to a unified reference data entity (defined later) or a data column added to a unified reference database table (defined later) to allow multiple types of data records to be stored within a single database table. Data context data items are not business significant data items since these data items are added to the database table to support database functionality and not to support business information and would not be part of a prior art database table structure. For example, a data entity of time periods may contain both Gregorian calendar components as well as Julian calendar components. Data context values, in this case, could be either Gregorian or Julian. Each data context data value may be further decomposed into data context levels. That is, the Gregorian calendar data records could support data context levels such as year, month, date, week and season.

Data context analysis—Data context analysis is an analysis of a unified reference data entity (defined later) to determine what data record types need to be supported by that unified reference data entity. Each unified reference data entity may support many different data types or data contexts as long as these data contexts are of the same single interrogative. Within each data context such as the Gregorian calendar data context value may have multiple data context levels of granularity values such as years, months, weeks, and dates. Multiple data record types are supported by a data context data attribute in combination with a data context level data attribute. In at least one embodiment of the present invention, both a data context data attribute and a data context level data attribute are added to each and every alternate key in a unified reference data entity.

Data context level—The data context level is a data item added to a unified reference data entity or a database table column added to a unified reference database table used to define specific types of data records within a specific data context. For example, a single database table may contain calendar year data records, calendar month data records, as well as calendar date data records. In this example, there would be three different data context levels, which is one for each of the three data record types. Data context level data items are data items added to support a coherent data identification method in accordance with an embodiment of the present invention and in at least one embodiment are not business significant data items and would also not be part of a prior art database table structure. The data context level data item is not a business significant data item since the data item is added to the database table to support database functionality and not to support business information. The data context level data item is used in conjunction with the data context data item and the other defined alternate key data items in accordance with one or more embodiments of the present invention.

Data entity—A data entity is a basic component of an entity-relationship diagram. Each data entity of the entity-relationship diagram will be given a name to uniquely identify that data entity from all other data entities of the entity-relationship diagram. When the database is formed from the entity-relationship diagram, each data entity typically is database instantiated in the database as a single database table. In addition, a data entity includes a list of data items, which, when the database is formed, becomes the list of database table columns. Each data entity generally has a primary key declared based upon one or more of the data items listed for that data entity. Each data entity may also have alternate keys declared also based upon one or more of the data items listed for that data entity. When the database is formed from the entity-relationship diagram, the primary key and the alternate keys are typically database instantiated as database table indexes.

Data entity relationship—A data entity relationship is a connector or link, which is stored in one or more computer memories, such as computer memory 8, between two data entities in an entity-relationship diagram. A data entity relationship provides a means of joining data items of one data entity with data items of another data entity. The data entity relationships, depicted graphically in entity-relationship diagrams as lines that begin attached to a first data entity and end with a filled circle on the dependent data entity. A data entity relationship causes the CASE computer software tool to duplicate the primary key data items or to duplicate an alternate key data item from a first data entity into a data entity which is dependent on the first data entity. The computer processor 4 may be programmed by a CASE tool computer software to permit a user via interactive device 2 to make relationships between data entities. The user, via interactive device 2, may select which of a first data entity's key data items will be duplicated by the CASE Tool computer software. These duplicated key data items are referred to as a foreign key in the dependent data entity. Upon database instantiation, a data entity relationship from the entity-relationship diagram is instantiated as a foreign key database table constraint, in one or more computer memories, such as computer memory 8. Each foreign key database table constraint is associated to a database table formed from the dependent data entity and that foreign key database table constraint references the database table identifying key data items formed from the first data entity. The foreign key database table constraints are used in databases to maintain the referential integrity of the data. Referential integrity insures that the data records from two database tables share common foreign key data values so that the proper data records may be linked together consistently. The database table constraints are stored in computer memory, such as computer memory 8, as database objects by the database management software running on computer processor 4.

Data field—A data field is a named and designated area in computer memory used to store data values. For example, a data field may be found displayed on a data entry form on the computer display device. Data value contents of that displayed data field are stored in a specific location of a data file in computer memory. Sometimes, named database table columns are considered analogous to named data fields.

Data item—A data item is a named data field that is used to identify a column in a database table or a data attribute in a data entity of an entity-relationship diagram. A data item, however, may be a constituent data item that is comprised of multiple data items.

Data model—A data model is a method used to design or architect database structures such as database tables and database table columns. In prior art data modeling there are three different levels of detail defined for data model development. The first level data model is referred to as a conceptual data model and is the least detailed of the three data models. The second level data model is referred to as the logical data model ("logical data model" is defined later). The most detailed data model is referred to as the physical data model ("physical data model" is defined later).

Data modeling tool—A data modeling tool is a computer software program or package that is executed on a computer processor, such as the computer processor 4, for the purpose of developing conceptual data models, logical data models, and physical data models. These three data model types often contain both an entity-relationship diagram and related metadata. The conceptual data model usually contains a high-level entity-relationship diagram, while the logical data model contains a more detailed database independent entity-relationship diagram and metadata. The physical data model contains the most detailed and database management system specific entity-relationship diagram and metadata. The physical data model supports the forward engineering of the entity-relationship diagram and metadata to a database instantiated on a computer that is executing the database management system of computer software.

Data record—A data record is a single row of data values in a database table stored in a computer memory, such as computer memory 8, which is comprised of a grouping of data items' values. Each data record will usually include a primary key value for uniquely identifying that data record. In addition, a data record may include alternate key values to provide alternative methods for finding unique data records in a computer memory, such as computer memory 8 in FIG. 1. A data record may also include foreign key values to allow linking of data records from multiple database tables.

Data value—A data value is an alphanumeric string stored in a specific location in a computer memory such as a named data field. For example, a data value may be stored in a data field of a data entry form in a computer memory or in a specific cell of a spreadsheet or in a specific data column of a specific data record of a database table in computer memory. The interpretation of the actual value of the alphanumeric string is dependent upon the data type of the data field. For example, if the data type of a data field is numeric, only valid numeric alphanumeric strings will be accepted into the data field.

Distributed Integrated Data Systems—A distributed integrated data system is one data system of a group of data systems with their associated databases designed to share all data across all data systems of that group. With this integrated data approach, the data that is distributed to multiple data systems will appear like all the data is part of the same data system. That is, neither data transformation nor data integration processes are required to alter the data into a common data domain because the data is already from a common data domain.

Elemental reference data item—An elemental reference data item, as defined for this patent application, is an independent reference data item that it is not dependent on another data item that is used to uniquely identify a constituent data item which is also independent of other constituent data items before any data normalization rules are applied. In at least one embodiment, an elemental reference data item must be a business key data item since all data items that are not business key data items are dependent upon business key data items for unique identification. Elemental reference data items are the fundamental data items upon which all other data items depend in a data model stored in one or more computer memories, such as computer memory 8, in accordance with an embodiment of the present invention. These elemental reference data items represent the boundary of unified reference data models since all other data items in a unified reference data model's entity-relationship diagram are dependent upon these elemental reference data items. The 'date-time' elemental reference data item, for example, may be used to uniquely identity the constituent data item named time period. The date-time elemental reference data item is independently defined as a point in time such as Jan. 1, 1999 14:00:00 GMT (Greenwich Mean Time twenty-four hour clock). The time period constituent data item has the composite business key data items of time period start date-time and time period end date-time. The time period constituent data item is itself an independent constituent data item. Another example of elemental reference data items are the latitude, the longitude and the altitude as defined for the Earth. These elemental reference data items are defined as the composite business key to uniquely identify the constituent data item Earth geographic location. The Earth geographic location constituent data item is itself an independent constituent data item before any data normalization rules are applied. However, very few business key data items in a unified reference data model are independent and are therefore not elemental reference data items. Several tests have been developed and can be implemented by computer processor 4 of FIG. 1, in one or more embodiments of the present invention to determine that a data item is indeed an elemental reference data item. One test for elemental data items involves the use of common interrogatives. An elemental reference data item may only be classified by one and only one interrogative. If a data item may be classified by more than one interrogative, that data item is not an elemental reference data item and is not identified as an elemental reference data item in computer memory in accordance with a data modeling technique of an embodiment of the present invention.

Foreign key—A foreign key provides a link, via a data entity relationship stored in computer memory, such as computer memory 8 between two data entities. The data items from the primary key or a selected alternate key of a first data entity are duplicated into a second data entity which is now dependent upon the first data entity. This link or relationship allows one data record from the first data entity to be combined with zero, one or more data records from the second data entity. In entity-relationship diagrams, each foreign key is declared via a single data entity relationship between two entities. In the database tables, the foreign key constraint is database instantiated on the database table formed from the dependent second data entity. This foreign key constraint references the primary key index or a selected alternate key index of the database table formed from the first data entity.

Foreign key data item—A foreign key data item, in an entity-relationship diagram, is a data item of a dependent data entity that was inherited, via a data entity relationship, from a primary key data item or from an alternate key data item of related data entity. A foreign key data item in a database table is a dependent database table column that references another database table column from another database table in the same database. Foreign key data items are used to enforce referential integrity between data records of multiple database tables.

Forward engineering—Forward engineering is a process of converting a physical data model's entity-relationship diagram and associated metadata into an database instantiated set of database tables, database table indexes, and database table constraints defined within a database management system which is being executed by a computer program on a computer. One method used in forward engineering is for the data modeling tool computer software to generate a script of data definition language that is submitted to the database management system which may be a computer program running on computer processor 4.

Independent data entity—An independent data entity is a data entity in an entity-relationship diagram that does not inherit data attributes from any other data entity via data entity relationships. When an independent data entity is database instantiated as a database table in a database, that database table will not have foreign key database constraints but will be referenced by other database table foreign key constraints. When a data record is stored into an independent database table, there is no need to reference other database tables before that data record is committed to the independent database table.

Logical data model—A logical data model is a type of data model produced from a data modeling tool computer software that is a database management system independent. That is, each vendor provided database management system has different functions or methods of creating, maintaining and deleting database objects. The logical data model is concerned with the design of database objects and not with how they are implemented by a specific vendor's database management system. The database management system implementation specific details are added to the physical data model. A logical data model is typically comprised of a data entity-relationship diagram and metadata. The data entities of the logical data model typically include a set of data items for each data entity and a declared primary key, along with declared alternate keys and foreign keys.

Mutually exclusive primary key—A mutually exclusive primary key is a primary key used to uniquely identify all data records in a cluster of multiple database tables. The primary key values are required to be unique for every data record within the cluster of related database tables. Within a cluster of database tables, which are identified by a single mutually exclusive primary key, the database tables' structures may now be repeatedly normalized and de-normalized without violating any of the database table's primary key unique index constraints. The mutually exclusive primary key supports reversible data normalization. If the same cluster of database tables were each identified by an independent primary key, their data structures could not be de-normalized because, when combined, the uniqueness of the primary key values could no longer be guaranteed.

Non-Reference data item—A non-reference data item is a data item which does not provide identifying or defining information. The non-reference data items are often quantitative or qualitative detailed information that is always related to one or more sets of reference data items. The data values for non-reference data items are typically numeric while reference data item values are typically textual. Some of these non-reference data items are also referred to as transactional data.

Primary key—A primary key is comprised of one or more data items within a data entity that are declared using a CASE tool or a data modeling tool executing on computer processor 4 which is programmed to store the declared primary key in computer memory, such as computer memory 8 of FIG. 1. The primary key of a data entity is the primary method of uniquely identifying data records within a database table. In a database table, the primary key is database instantiated as the primary index of that database table which is used as a means of rapidly selecting unique data records from the database table.

Physical data model—A physical data model is a database management system specific representation of a very detailed entity-relationship diagram and the most detailed metadata produced from a data modeling tool. A physical data model is used to database instantiate database objects into a database management system computer program which is executed on a computer or computer processor, such as computer processor 4 of FIG. 1. These database objects are stored in computer memory.

Reference data entity—a reference data entity is a data entity in an entity-relationship diagram of a data model, stored in computer memory, such as computer memory 8, which contains only reference data attributes or reference data items. Reference data item data values are typically textual.

Reference data item—A data item which is used to define or identify some person, place, time, method, reason, or thing. Reference data items often are textual as opposed to non-reference data items that are quantitative or qualitative in nature and typically have data values that are numeric.

Reversible data normalization—Reversible data normalization is a process where a cluster of related data entities and their database instantiated database tables may be repeatedly normalized and de-normalized without the need to provide new primary keys. The primary keys declared for this cluster of related data entities must be a mutually exclusive primary key that provide unique values for each data record in the combined cluster of database tables. Without this mutually exclusive primary key, unique primary key values across database tables could not be guaranteed. Therefore, in this case of independent primary keys, the data records in the cluster of database tables could not be de-normalized.

Shared reference database—A shared reference database is a database that uses the reference data records stored in a common source database. By using the reference data records from a common source database, shared reference databases now have a common set of reference data records that will form the basis to integrate the data records from multiple shared reference databases.

Similar data entities—Similar data entities are two independent data entities that have the same unique business key. Independent data entities are data entities that have no data items inherited via foreign keys. If two independent data entities have the same business key, than these two independent data entities are similar data entities. Similar data entities may be merged into a single independent data entity. This merged data entity will still have the same business key and the data items of the resultant data entity would be the union of data items from the original two independent data entities.

Similar database tables—Similar database tables are two independent database tables that have the same business key. Independent database tables are database tables that have no data columns inherited via foreign keys. If two independent database tables have the same business key, than these two independent database tables are similar and the data records from both independent database tables may be merged into a single set of integrated data records. This merged set of data records will still have the same business key and the data columns of the resultant independent database table would be the union of data columns from the two original independent database tables.

Surrogate primary key—A surrogate primary key is a type of data entity primary key or a database table primary key that is based upon a single numeric data item. The surrogate primary key has no business significance and is therefore not a part of a business key.

Ultimate elemental reference database—An ultimate reference database is a database that has ultimate reference database tables that are independent database tables and that contain elemental reference data columns as the business keys for these ultimate reference database tables. Independent database tables are database tables that have no data columns inherited via foreign keys.

Ultimate reference data entity—An ultimate reference data entity is a data entity of a data model that contains elemental reference data items and is independent of all other data entities in a data model. As with other data entities, ultimate reference data entities are stored in a computer memory, such as computer memory 8. "Independent" here means that an ultimate reference data entity does not have duplicated data items from another data entity in the data model in the computer memory 8, that result from a foreign key data entity relationship. In general, most data entities in a data model contain duplicate data attributes that result from foreign key inheritance that form links from other data entities in order to provide a method of joining data records from multiple database tables resulting in a composite data record.

Unified reference data entity—A unified reference data entity is an ultimate reference data entity that is associated to one and only one interrogative in a computer memory in accordance with an embodiment of the present invention. Therefore, the unified reference data entity in a computer memory contains elemental reference data items that are also classified in a computer memory by the same one and only one interrogative as the interrogative classifying the unified reference data entity itself. In addition, there are up to six unified reference data entities in any entity-relationship diagram in a computer memory, which is one unified reference data entity assigned, in computer memory, to each of the six common interrogatives. These unified reference data entities define the boundary for any and every entity-relationship diagram in a data model stored in a computer memory in accordance with an embodiment of the present invention. Again, these unified reference data entities may also be data normalized and data de-normalized once placed into an entity-relationship diagram in a computer memory.

Unified reference data model—A unified reference data model is a data model based upon a set of unified reference data entities. All data systems that are constructed from a unified reference data model will have a common foundation of metadata and unified reference data entities.

Unified reference database—A unified reference database is a database that contains a set of unified reference database tables such as those formed from a unified reference data model.

Unified reference entity-relationship diagram—A unified reference entity-relationship diagram is an entity-relationship diagram where the independent data entities are unified reference data entities.

Universal reference data identification method—The universal reference data identification method is a method, used within a coherent data identification method in accordance with an embodiment of the present invention, wherein each of a plurality of unified reference data entities is provided with a universal surrogate primary key. With the universal surrogate primary key, a plurality of unified reference database tables may be repeatedly normalized and de-normalized without the need to declare a new primary key. This is an important property for a coherent data identification method in accordance with an embodiment of the present invention, as the universal reference database tables will be used in multiple databases and need to keep their primary key values consistent.

Universal surrogate primary key—The universal surrogate primary key is a surrogate type of primary key that provides mutually exclusive identification for a given cluster of related data entities or of related database tables. A cluster of related database tables, from a single universal surrogate primary key, may be the result of data normalization of that single unified reference data entity.

In accordance with at least one embodiment of the present invention, a method is provided, which can be called a "Coherent Data Identification Method". This method is a method for configuring, designing, and/or implementing database tables and data models in one or more computer memories, such as computer memory 8 of FIG. 1 which gives a person who defines data models and database tables a predefined framework into which the remainder of the data entities and database tables are developed.

FIG. 1 shows a diagram of an apparatus 1 in accordance with an embodiment of the present invention. The apparatus 1 includes an interactive device 2, a computer processor 4, a display device 6, and a computer memory 8. Computer memory 8 may include any type of computer memory, including long term memory such as disk memory in addition to computer random access memory which may lose its values when power is removed. The computer memory 8 may include one or more computer memories. The interactive device 2, the display device 6, and the computer memory 8 communicate with the computer processor 4 via communications links 2a, 6a, and 8a respectively, which may be electronic, computer software, optical, wireless or any other type of communications links. The computer processor 4 may be programmed by computer software to implement the coherent data identification method in accordance with the present invention to create database tables in the computer memory 8, such as shown by FIG. 11.

FIG. 2 shows a table 100 of rules for data normalization. Data items are grouped into data entities and database tables based upon these well-known data normalization rules. General data normalization is a known process, but, a coherent data identification method in accordance with one or more embodiments of the present invention may make use of any well known data normalization method.

The data normalization rules shown in table 100 include two columns and six rows. The first column identifies the specific data normalization rule. The second column describes a procedure or rule identified in the corresponding row. For example, the first column, first row identifies the procedure or rule of creating a "First Normal Form (1NF)" data entity or database table, in computer memory 8, and the description in the second column, first row provides a description of what the data normalization rule achieves and explains how to accomplish that form of data normalization. The description in the second column, the first row indicates that the procedure of creating a "First Normal Form (1NF)" generally entails eliminating repeating groups of data items and more specifically entails making a separate database table in the computer memory 8 for each set of related groups of data items and entails giving each database table a primary key. An example of a first normal form (1NF) database table is shown in FIG. 6B.

The first column, second row in the table 100 of FIG. 2, identifies the procedure or rule of creating a "Second Normal Form (2NF)" in the computer memory 8, and the description in the second column, second row provides further description. The description in the second column, second row indicates that the procedure of creating a "Second Normal Form (2NF)" generally entails eliminating redundant data and more specifically if a data item depends on only part of a multi-valued or composite key, the data item is removed from an existing database table, and the removed data item is used to form and store a separate new database table in the computer memory 8. An example of a second normal form (2NF) database table is shown in FIG. 7B. This second normal form database table was derived from the first normal form table shown in FIG. 6B.

The first column, third row in the table 100 of FIG. 2, identifies the procedure or rule of creating a "Third Normal Form 3NF" in the computer memory 8, and the description in the second column, third row provides further description. The description in the second column, third row indicates that the procedure of creating a "Third Normal Form 1NF" generally entails eliminating data items not dependent upon the primary key and more specifically if data items do not contribute to a description of a primary key, the data items are removed from an existing database table to form a new, separate database table.

The first column, fourth row in the table 100 of FIG. 2, identifies the procedure or rule of creating a "BCNF" (Boyce-Codd Normal Form) in the computer memory 8, and the description in the second column, fourth row provides further description. The description in the second column, fourth row indicates that the procedure of creating a "BCNF" generally entails creating a "Boyce-Codd Normal Form", and more specifically if there are non-trivial dependencies between candidate key data items, the candidate key data items are separated out into distinct database tables which are formed and stored in the computer memory 8.

The first column, fifth row in the table 100 of FIG. 2, identifies the procedure or rule of creating a "4NF" ($4^{th}$ Normal form) in the computer memory 8, and the description in the second column, fifth row provides further description. The description in the second column, fifth row indicates that the procedure of creating a "4NF" generally entails isolating independent multiple data entity relationships, and more specifically making sure that no database table in the particular data model in the computer memory 8 contains two or more optional data entity relationships that are not directly related.

The first column, sixth row in the table 100 of FIG. 2, identifies the procedure or rule of creating a "5NF" ($5^{th}$ Normal form) in the computer memory 8, and the description in the second column, sixth row provides further description. The description in the second column, sixth row indicates that the procedure of creating a "5NF" generally entails isolating semantically related multiple data entity relationships, and more specifically isolating logically related many to many data entity relationships.

Figure 14:
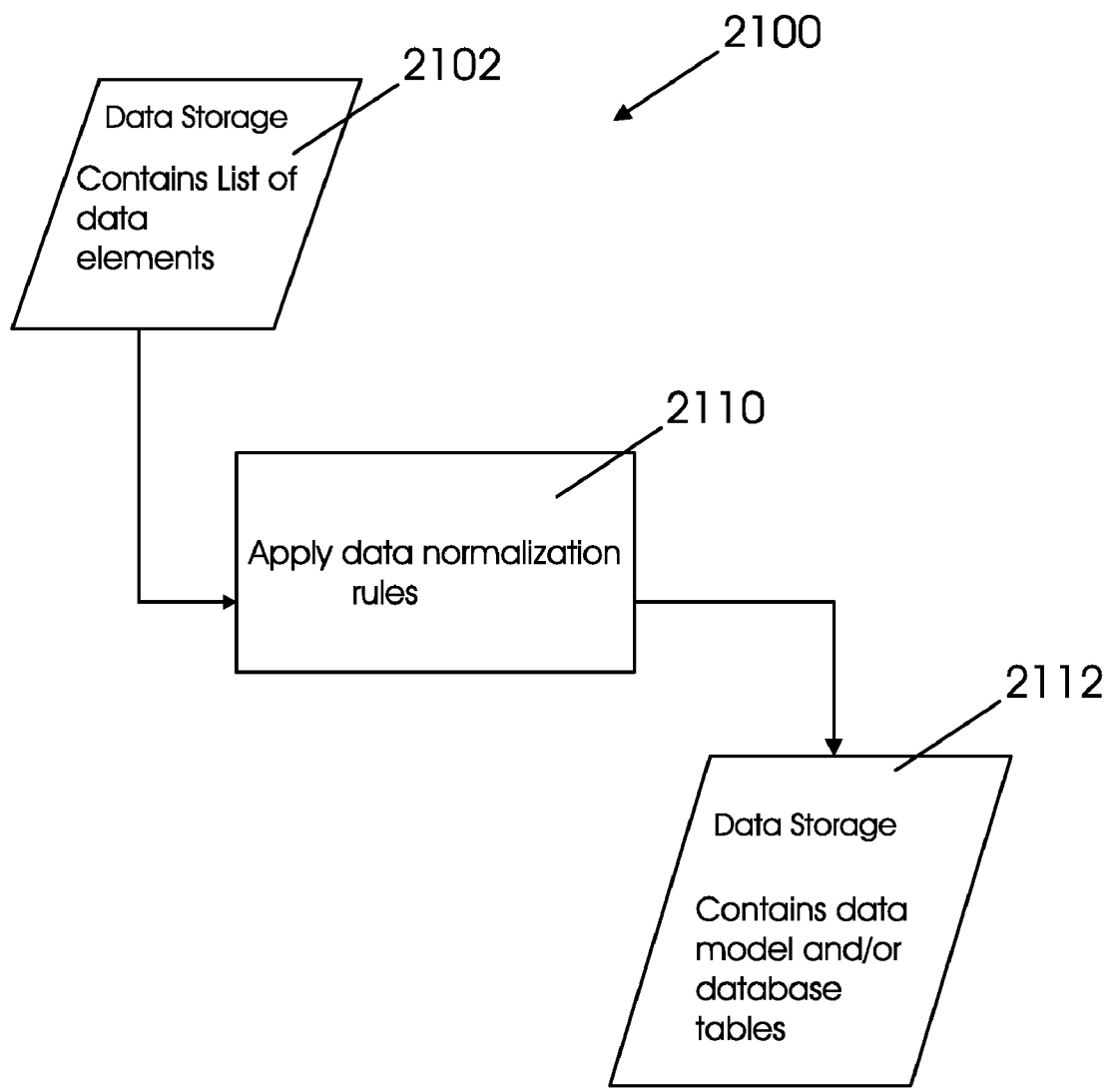
FIG. 14 shows a flow chart 2100 representing a prior art data model and entity-relationship diagram development method as well as a database table development method based upon the data normalization rules shown in FIG. 2.

FIG. 14 shows a flow chart 2100, which represents a prior art method of data model and database table development. Data models are most often developed by one or more persons using a computer software program (running or executed on a computer) referred to as a CASE tool or a data modeling tool. This computer software program can be executed by data processor 4 of FIG. 1 and stored in computer memory 8 also of FIG. 1. The prior art data model method begins with a list of data items represented by 2102 in FIG. 14, to be converted to a data model's entity-relationship diagram such as shown in FIG. 3A.

This list of data items is represented in flow chart 2100 of FIG. 14 as data storage 2102. This list of data items or data storage 2102 may be input directly into the CASE or data model tool computer software program and stored in the computer memory 8 of FIG. 1. These data items of data storage 2102 are processed against the data normalization rules 100 from FIG. 2 applied in sequence in process step 2110 of flow chart 2100 as shown in FIG. 14. That is, the first normal form (1NF) rule is applied to the set of data items that result in a set of data entities in first normal form. These first normal form data entities could be stored in data storage 2112 in the computer memory 8, as shown in FIG. 14. If desired, the first normal form data entities may be forward engineered to generate the first normal form database tables such as database table 700 shown in FIG. 6A, database table 800 as shown in FIG. 6B and database table 900 as shown in FIG. 7A. Then, if desired, the first normal form data entities may have the second normal form (2NF) rule applied, which results in data entities and database tables, if forward engineered, that are in second normal form. Database table 1000 shown in FIG. 7B and database table 1100 shown in FIG. 8A are examples of second normal form database tables. These second normal form data entities could replace the first normal form data entities stored in data storage 2112 in the computer memory 8 as shown in FIG. 14. Then, if desired, the third normal form (3NF) rule may be applied to the second normal form data entities that results in the third normal form data entities and database tables if they are forward engineered. These third normal form data entities could replace the second normal form data entities stored in data storage 2112 in the computer memory 8 as shown in FIG. 14.

A data model is normally a combination of an entity-relationship diagram and other related metadata. There are multiple levels of data models developed to implement a database. The conceptual data model is the highest-level data model and contains the least detail. Normally, in the conceptual data model, only the highest-level entity-relationship diagram is provided and often the data entities are only in first normal form. An example of a conceptual data model's entity-relationship diagram is shown in entity-relationship diagram 300 of FIG. 3B. The data entities are named but may not show actual data attributes and keys. The logical-level data model, normally referred to as the logical data model, is the next level of data model that may be developed. The logical data model is designed to be database management system independent. The logical data model's entity-relationship diagram has a set of named entities that contain the data attributes, and has the primary key, the alternate keys and the foreign keys declared in the computer memory 8. An example of a logical data model's entity-relationship diagram is entity-relationship diagram 200 shown in FIG. 3A. In the logical data model, data items are most often referred to as data attributes, however, sometimes the two terms are used interchangeably. Finally, the physical-level data model, normally referred to as the physical data model, is converted from the logical data model and is represented by data model tables that are converted data entities and data model constraints that are the converted data entity relationships. The computer processor 4 is programmed to add database management system specific metadata to the physical data model in the computer memory 8 in preparation for forward engineering the physical data model into a database in the computer memory 8. In many actual database design efforts, only the logical data models and the physical data models are used.

FIG. 3A shows a very simple entity-relationship diagram 200, which may be stored in the computer memory 8 of FIG. 1. This entity-relationship diagram contains two entities, data entities 202 and 204, combined with a single data entity relationship 206 that connects these two data entities. In this representation of an entity-relationship diagram, the data entity is represented by a rounded-corner rectangle while the data entity relationship is represented by a line 206 terminated with a filled circle 206a. Each data entity, such as each of 202 and 204, represents a group of related data items or data attributes, such as the country name (AK1) data attribute and the country abbreviation (PK) data attribute for data entity 202. In this notation of data entities, the data attributes above a line in the rounded-corned rectangle, such as for example, above line 202a for data entity 202, or above line 204a for data entity 204, are declared to be the primary key of the data entity. The primary key data attributes or data items of each data entity are denoted as such by the (PK) which follows the data item's name. This primary key is a unique identifier for the data entity. In addition to the data entity's primary key, each data entity may have zero, one or more alternate keys defined. In FIG. 3A, both data entities 202 and 204 contain a single alternate key denoted by the (AK1) following the alternate key's data attributes. In data entity 202, the alternate key is declared upon the single data attribute Country Name (AK1). In data entity 204, the alternate key is a composite alternate key composed from the data attributes Country Abbreviation (AK1) and State Name (AK1). The data entity relationships of entity-relationship diagrams stored in computer memory 8 provide a link or data access path stored in the computer memory 8 between data entities which allow for data attributes from a first data entity, such as 204 to be related to data attributes from the second data entity, such as 202. A data entity relationship is shown in FIG. 3A that links the first state data entity 204 to the second country data entity 202. Note that the state data entity 204 also contains the data attribute country abbreviation (PF) (FK) (AK1) that is duplicated from the primary key of the country data entity 202. In this example, the country data entity 202 is an independent data entity, since it contains no foreign key (FK) data attributes. On the other hand, the state data entity 204 would be the dependent data entity since it does contain foreign key (FK) data attributes. This duplication of data attributes allows the state data attributes to be grouped to their proper country data attributes. This duplication of a first data entity's primary key data attributes or one of that data entity's alternate key data attributes into a second data entity is referred to as a foreign key. The duplicated data attributes that result from a foreign key are denoted with a (FK) following the data item's name. Note that a single data attribute may be used in zero, one, or more data entity keys.

FIG. 3B is a depiction of a prior art entity-relationship diagram for a data model which can be stored in a computer memory. In this entity-relationship diagram, only a conceptual data model of the data entities is provided. Each data entity in FIG. 3B is labeled as a reference data entity or a transactional data entity. In this entity-relationship diagram, there are five reference data entities 301, 302, 303, 304, and 305 and two transactional data entities 306 and 307. Some reference data entities are considered independent data entities for this data model. These independent data entities are Reference Data Entity T 301', Reference data Entity U 302, and Reference Data Entity X 305 in FIG. 3B. Independent data entities have relationships where they contribute data attributes to the other related data entities but do not themselves receive data attributes from any other related data entity. Generally, in the entity-relationship diagrams, all the independent data entities' relationships do not have the filled circles attached to that data entity. The transactional data entities in this data model always have at least one data relationship that contribute one or more duplicate data attributes and therefore Transactional Data Entity Y 306 and Transactional Data Entity Z 307 in FIG. 3B have at least one darkened circle to show that they receive data attributes from other data entities.

All logical entity-relationship diagrams have independent data entities. All other data entities of the entity-relationship diagram contain data attributes inherited from the independent data entities either directly or indirectly via other dependent data entities and data entity relationships. In the example entity-relationship diagram representation of FIG. 3B, the independent data entities are Reference Data Entity T 301, Reference Data Entity U 302, and Reference Data Entity X 305. In this same example prior art entity-relationship diagram, Reference Data Entity V 303 is not an independent data entity as it has key data attributes duplicated from both Reference Data Entity T 301 and Reference Data Entity U 302. Likewise, 'Reference Data Entity W 304 is not an independent data entity as it contains key data attributes duplicated from both Reference Data Entity T 301 and Reference Data Entity X 305.

Independent data entities are extremely important to at least one or more embodiments of the present invention. In prior art entity-relationship diagrams, there are many independent data entities. These independent data entities are not given any special significance, and there are no standard methods for developing these independent data entities. Independent data entities define the boundaries of any entity-relationship diagram in that all other data entities of a particular entity-relationship diagram are dependent upon these independent entities to define their significance within the entity-relationship diagram. However, the independent data entities from one entity-relationship diagram stored in the computer memory will not normally be usable as the independent data entities in another entity-relationship diagram stored in computer memory. In the previous database design methods, no attempt was made to define the ultimate boundaries for all entity-relationship diagrams. In at least one embodiment of the present invention, once ultimate reference data entities are defined and stored in computer memory, any entity-relationship diagram in a data model of the present invention in computer memory may then be developed from a "complete" set of ultimate reference data entities in a computer memory as the independent data entities.

Ultimate reference data entities must be based upon business key data items in computer memory that are elemental reference data items. Elemental reference data items are data items that are independently identified and as such represent a boundary or a limit in the ultimate reference entity-relationship diagram. The set of six unified reference data entities, i.e. unified reference data entities for interrogatives why, what, who, when, where, and how, defined in one or more embodiments of the present invention, represents a "complete" set of ultimate reference data entities stored in a computer memory.

In order to ensure that a complete set of ultimate reference data entities are defined, the common interrogatives are utilized. Since the common interrogatives may be used to classify everything, a complete set of ultimate reference data entities may be insured by assigning in a computer memory a single ultimate reference data entity to each common interrogative (of why, what, who, when, where, and how). Each of these ultimate reference data entities that are defined for a single interrogative are now referred to as unified reference data entities.

Figure 4A:
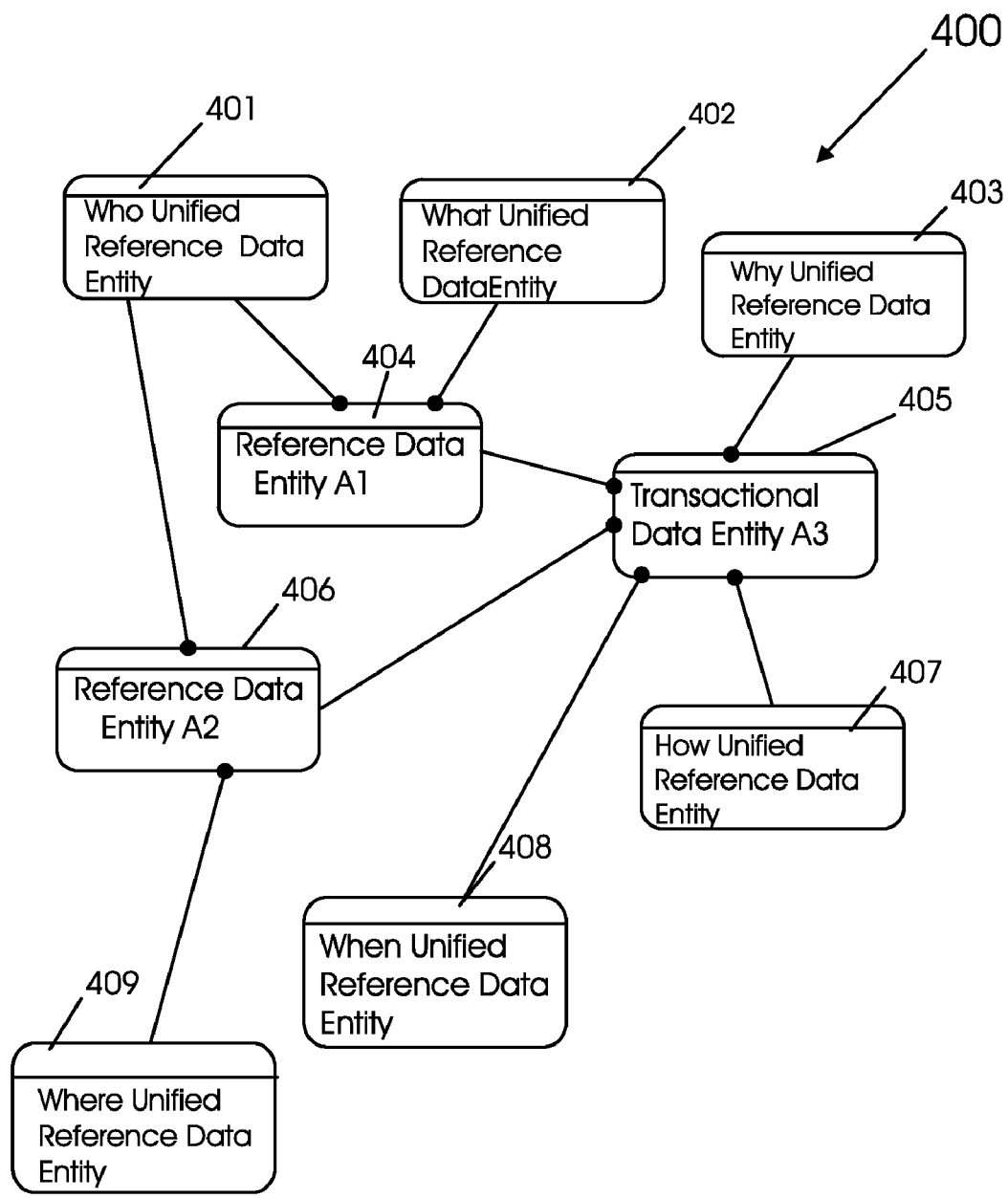
FIG. 4A shows a first unified reference data model's high-level or conceptual entity-relationship diagram in accordance with an embodiment of the present invention

FIG. 4A shows a unified reference data model's entity-relationship diagram 400. There are six unified reference data entities in the unified reference data model's entity-relationship diagram 400 to support a coherent data identification method in accordance with an embodiment of the present invention. Each of these six unified reference data entities are independent data entities. These six unified reference data entities are the who unified reference data entity 401, the what unified reference data entity 402, the why unified reference data entity 403, the where unified reference data entity 409, the when unified reference data entity 408, and the how unified reference data entity 407. In addition, the entity-relationship diagram shown in FIG. 4A contains other data entities such as reference data entity A1 404, reference data entity A2 406, and transactional data entity A3 405.

Each of these unified reference data entities represents one of the common interrogatives that are "Who", "What", "Where", "When", "How" and "Why" respectively. All other data entities of the entity-relationship diagram stored in a computer memory, such as computer memory 8 of FIG. 1, in a coherent data identification method data model in accordance with an embodiment of the present invention should be related directly or indirectly to one or more of these six independent unified reference data entities. In accordance with an embodiment of the present invention, all data entities with direct data entity relationships to the six unified reference data entities must inherit the primary key data items or an alternate key data items of the unified reference data entities to which they share a data entity relationship.

The utility of the coherent identification method, of at least one embodiment of the present invention, is to provide a common foundation of metadata and unified reference data entities upon which data systems may be developed or modified in an attempt to provide distributed integrated data systems. This common foundation of metadata is achieved, in part, by a unified reference data model. One reason the coherent data identification method, in accordance with an embodiment of the present invention, is different from prior art data methods is that the coherent data identification method is based upon the definition of unified reference data entities. These unified reference data entities are defined to be used by multiple databases as a basis of sharing data across databases. Any database that uses unified reference database tables forward engineered from a predefined set of unified reference data entities will result in a database that has structural commonality with all other so forward engineered databases.

Figure 4B:
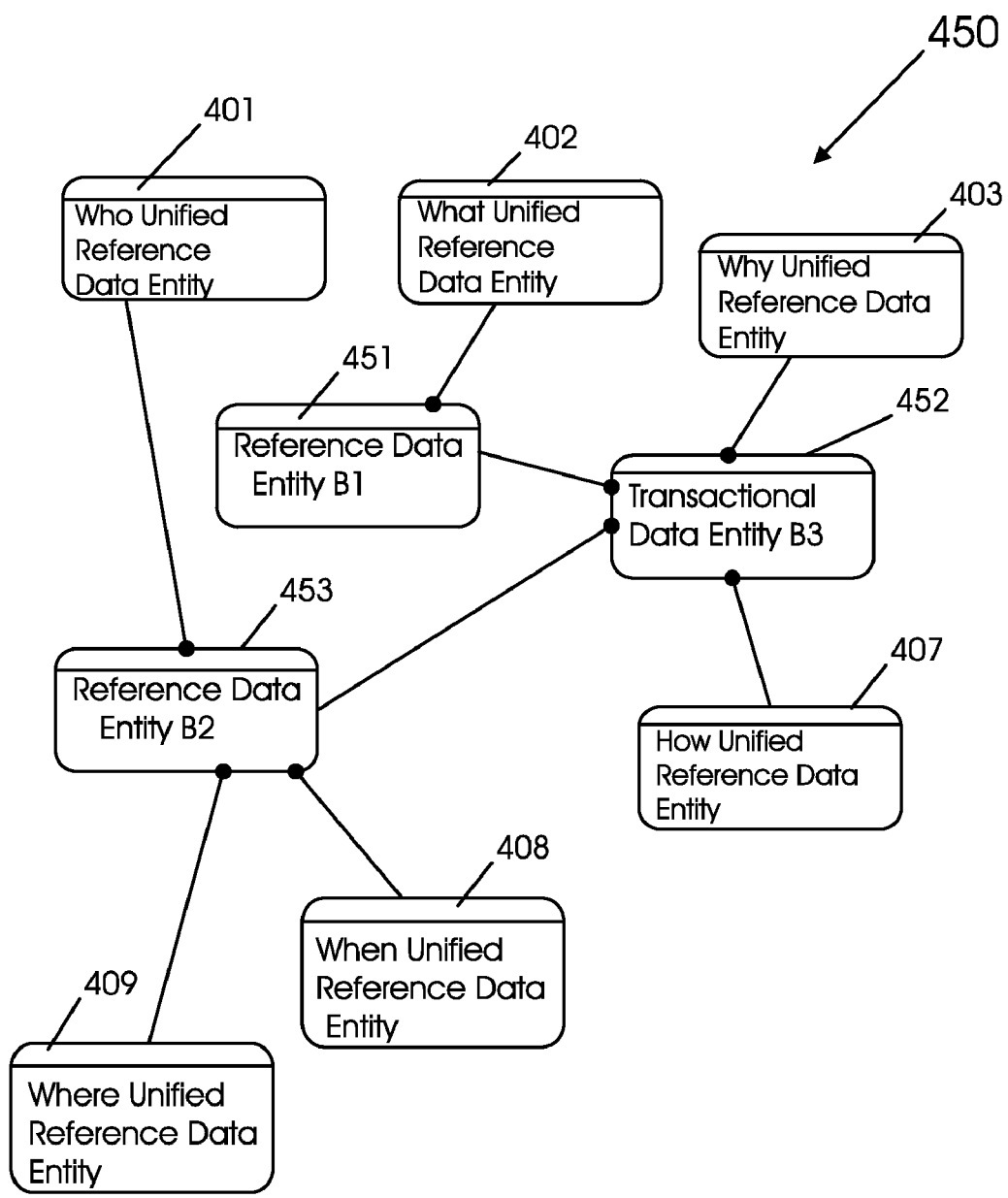
FIG. 4B shows a second unified reference data model's high-level or conceptual entity-relationship diagram for comparison to the entity-relationship diagram of FIG. 4A.

FIG. 4B shows a second unified reference data model's entity-relationship diagram 450 in accordance with an embodiment of the present invention. Again, this entity-relationship diagram has the same six unified data entities (401, 402, 403, 409, 408, and 407) as the unified reference data model's entity-relationship diagram 400 shown in FIG. 4A. In addition, this entity-relationship diagram 450 also includes reference data entity B1 451, reference data entity B2 453, and transactional reference data entity B3 452.

Figure 4C:
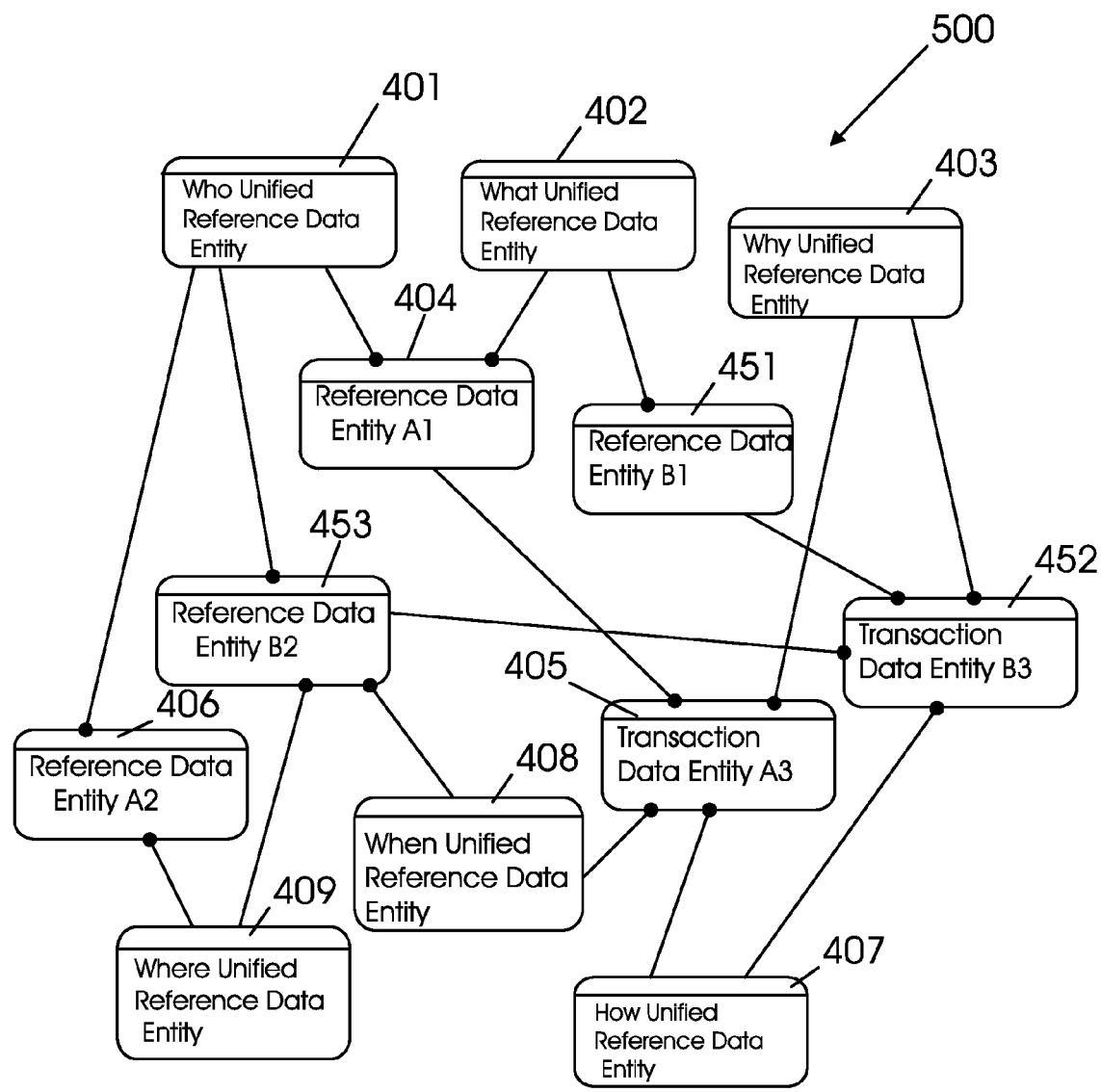
FIG. 4C shows a unified reference data model's high-level or conceptual entity-relationship diagram that is a combination or a union of the unified reference data model's entity-relationship diagrams individually depicted in FIG. 4A and FIG. 4B.

In accordance with an embodiment of the present invention, any unified reference entity-relationship diagram may be combined with any other unified reference entity-relationship diagram to form a new, composite entity-relationship diagram in the computer memory 8 of FIG. 1. FIG. 4C shows a third unified reference data model's entity-relationship diagram 500 that results from the union of the unified reference data model's entity-relationship diagram of FIG. 4A and the unified reference data model's entity-relationship diagram of FIG. 4B. Again, this entity-relationship diagram 500 contains the six unified data entities 401, 402, 403, 409, 408, and 407. The reference data entities 404, 406 and the transactional data entities 405 of FIG. 4A are also shown in FIG. 4C. The reference data entities 451 and 453 and the transactional data entity 452 of FIG. 4B are also shown in FIG. 4C.

In order to create an entity-relationship diagram in the computer memory 8 from the union of a first entity-relationship diagram, such as 400, and a second entity-relationship diagram, such as 450, requires that all independent data entities are similar data entities in both the first and the second entity-relationship diagrams. In FIG. 4A, the first entity-relationship diagram 400, and in FIG. 4B, the second entity-relationship diagram 450, both entity-relationship diagrams have the same set of six unified data entities 401, 402, 403, 407, 408, and 409. Each set of unified data entities from both entity-relationship diagrams 400 and 450 will have the same business keys and will therefore be similar reference data entities.

The ability to do an entity-relationship diagram union from multiple unified reference data models' entity-relationship diagrams was not available with prior art data models because they lacked a complete set of similar independent data entities such as the unified reference data entities. Beyond the ability to combine multiple entity-relationship diagrams in computer memory and to integrate their formed databases, the complete set of unified reference data entities provides the added ability to share data records across multiple unified reference databases. Since all data records from all unified reference databases are ultimately attached to unified reference database tables, these data records have a common foundation and may now be considered to be part of a distributed integrated database.

Figure 4D:
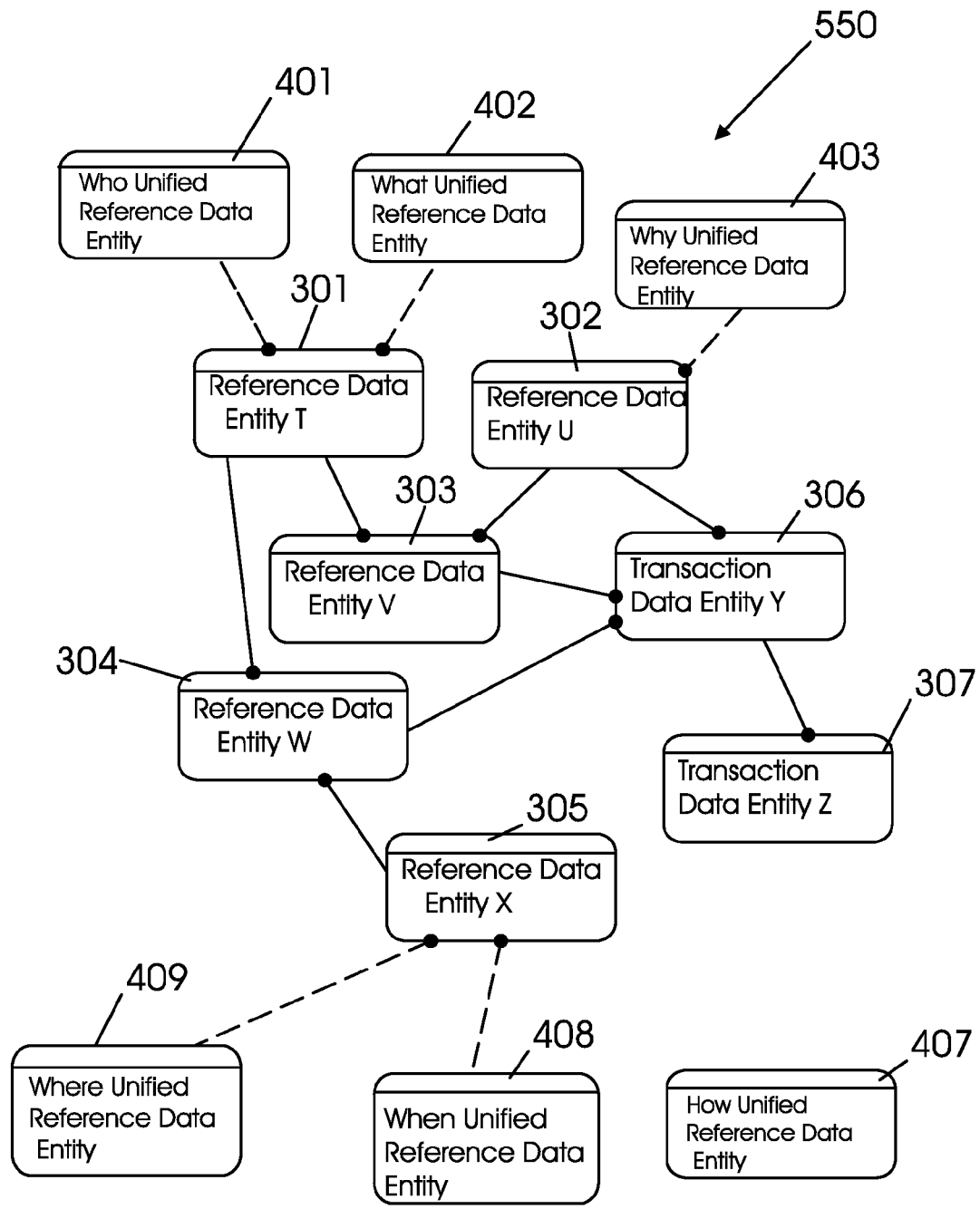
FIG. 4D shows an entity-relationship diagram in accordance with an embodiment of the present invention in which the prior art entity-relationship diagram shown in FIG. 3A is converted into a unified entity-relationship diagram by displacement of the prior art independent data entities of FIG. 3A with a set of six unified reference data entities.

FIG. 4D shows the entity-relationship diagram that results from a method, in accordance with an embodiment of the present invention, of converting an existing prior-art entity-relationship diagram into a unified reference data model's entity-relationship diagram of an embodiment of the present invention by displacing prior art independent data entities with the complete set of unified reference data entities. This entity-relationship diagram conversion method may also be used to convert any existing, formed database into a unified reference database. Once a prior art database is converted into a unified reference database, in accordance with an embodiment of the present invention, the resulting unified reference database may be used to directly share or exchange data with any other unified reference database.

FIG. 4D shows another unified reference data model's entity-relationship diagram 550 in accordance with an embodiment of the present invention, which may be stored in the computer memory 8 of FIG. 1. The diagram 550 includes the six unified reference data entities 401, 402, 403, 407, 408, and 409. The diagram 550 also includes the transaction data entities 306 and 307, and the reference data entities 301, 302, 303, 304, and 305. The entity-relationship diagram of FIG. 4D in accordance with an embodiment of the present invention, represents a conversion of a prior art entity-relationship diagram 300 as shown in FIG. 3B into a unified reference entity-relationship diagram of an embodiment of the present invention by displacing the prior-art independent data entities 301, 302, and 305 of both FIGS. 3B and 4D with the unified reference data entities 401, 402, 403, 407, 408, and 409 of FIG. 4D. With the addition of the unified reference data entities 401, 402, 403, 407, 408, and 409, the prior art independent data entities are no longer independent data entities as they have been displaced by the added unified reference data entities 401, 402, 403, 407, 408, and 409 which are now the independent data entities for this converted entity-relationship diagram 550.

The data entity relationships between the unified reference data entities 401, 402, 403, 407, 408, and 409 in accordance with an embodiment of the present invention, and the prior-art independent data entities 302, 302, and 305 are dashed to show that the foreign keys inherited by the displaced ultimate reference data entities are optional. In this way, an existing database that has been populated with data records will not violate foreign key constraints when the new unified reference database tables (each unified reference database table is based on one of the unified reference data entities 401, 402, 403, 407, 408, and 409) are added to the existing database. Once the unified reference database tables have been populated with the proper data records, the foreign key constraints may be declared as mandatory and the entity-relationship diagram's dashed data entity relationships should be redrawn as solid lines to make the foreign key constraint inherited data items required.

Unified reference data entities are, firstly, the independent data entities for the unified reference data model and secondly, they are unified in that they are defined to support one and only one interrogative. This support of a single interrogative is a very important condition in that the single interrogative criteria is a test as to aid in determining whether a reference data item is elemental. It has been suggested that in some prior art databases, interrogative cross-reference tables or interrogative data conversion tables be added in an attempt to add functionality to data systems databases. This, after the fact approach of updating databases is not a method to determine if a reference data item is an elemental reference data item. A coherent data identification method, in accordance with at least one embodiment of the present invention, provides a method to design relational database based data systems that are totally different from prior art relational database systems. The inclusion of database tables based upon a set of unified reference data entities alleviates the need for additional interrogative based cross-reference tables and interrogative data conversion tables. In fact, data system databases based upon one or more embodiments of the present invention have no need for including the interrogative values within the data records of any database table. All independent reference data items will now be associated to one and only one interrogative. All dependent data items will now be related directly or indirectly via foreign key relationships one or more of these independent reference data items. By inference, all dependent data items will now be classified by all relevant interrogatives via these direct and indirect relationships.

Figure 15:
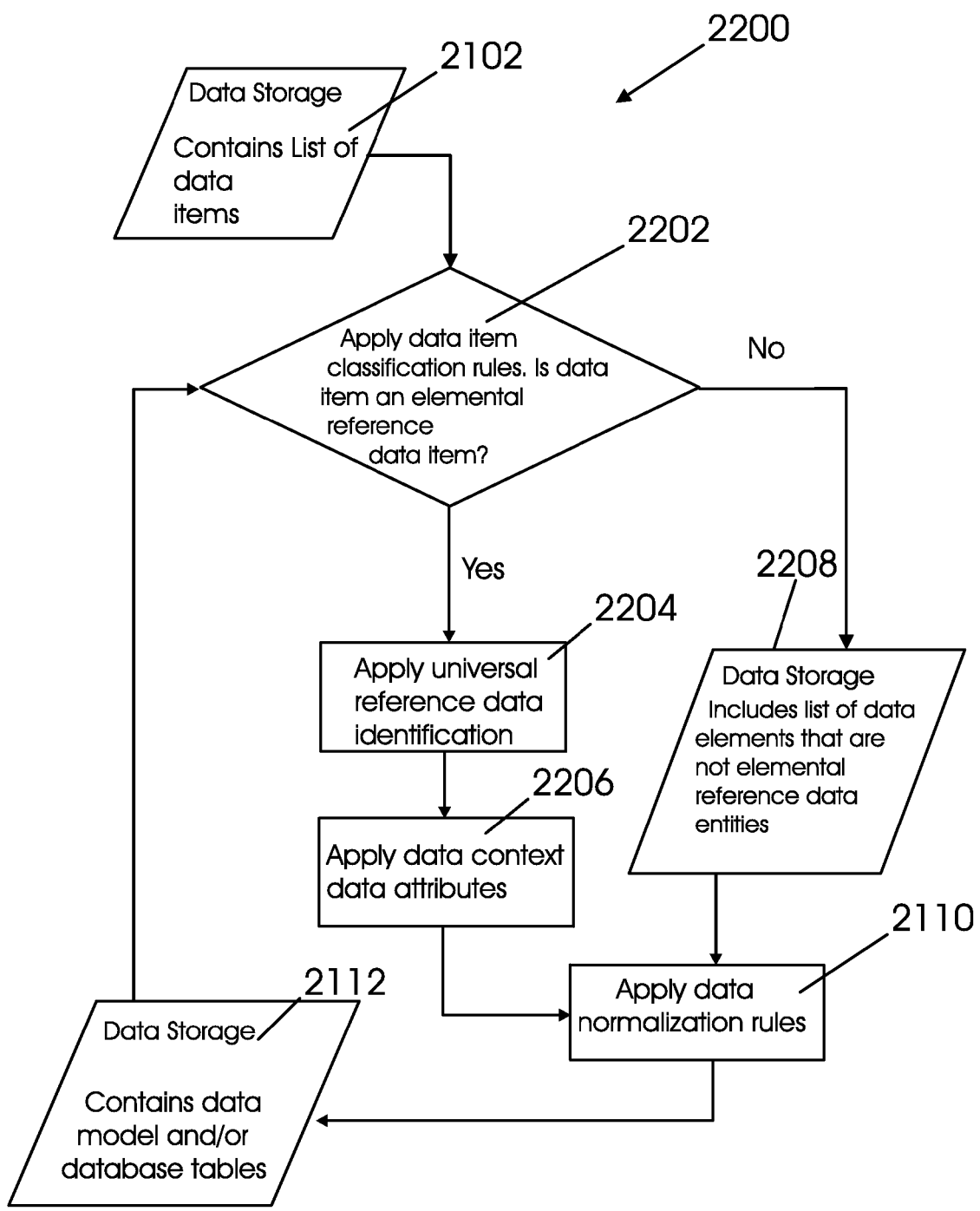
FIG. 15 shows a high-level flow chart 2200 representing a coherent data identification method of data model and entity-relationship diagram development method as well as a database table development method in accordance with an embodiment of the present invention.

FIG. 15 shows a flow chart 2200 of a coherent data identification method in accordance with an embodiment of the present invention. At process step 2202, data item or attribute classification is performed with a CASE tool or data modeling tool running on the computer processor 4 shown in FIG. 1. Data storage 2102, which contains a list of data items to be classified, is processed one data item at a time by process step 2202. The data storage 2102 may be a specific portion of computer memory 8 shown in FIG. 1 which contains a list of data items. As part of process step 2202, elemental reference data items are developed and classified into the proper unified reference data entities. Data items from the list in data storage 2102 that are not deemed to be elemental reference data items are stored in data storage 2208. Data storage 2208 may be a specific portion of computer memory 8 shown in FIG. 1, which contains a list of evaluated data items. The unified reference data entities may be stored in specific portion of computer memory 8 of FIG. 1 via the CASE tool or the data modeling tool. This CASE tool or data modeling tool data and metadata storage is also depicted as data storage 2112 of FIG. 15. Process step 2202 is further detailed in flow charts shown in FIGS. 16A-16B.

The data storages or storage devices 2102, 2208, and 2112, which are referenced in multiple flow charts, may be part of the computer memory 8 of FIG. 1.

Next at process step 2204 of FIG. 15, universal reference data identification primary keys are added to each unified reference data entity in the computer memory 8 by the CASE tool or the data modeling tool that is executed on the computer processor 4. Alternate keys are also added to each unified reference data entities in the computer memory 8 within process step 2204. Process step 2204 of FIG. 15 is presented in more detail in the flow chart depicted in FIG. 17.

At process step 2206 of FIG. 15, data context analysis is performed by the CASE tool or the data modeling tool that can be executed on computer processor 4 of FIG. 1. As part of step 2206, unified reference data entities have data context data items added. In addition, the unified reference data entities' alternate keys are updated in the computer memory 8 to include the new data context data attributes. The data context analysis process, step 2206, is further detailed in the flow chart depicted in FIG. 18.

At next process step 2110 shown in FIG. 15, both the unified reference data entities and the data items of data storage 2208 are normalized using the data normalization rules of FIG. 2. This data normalization process again uses the CASE tool or data modeling tool for this prior art data normalization process. The results of this data normalization process will result in a data model containing an entity-relationship diagram such as that depicted in FIG. 4C. Once the data normalization process has been completed, the metadata in the data model may be used to database instantiate database tables into the database management system.

Figure 16A:
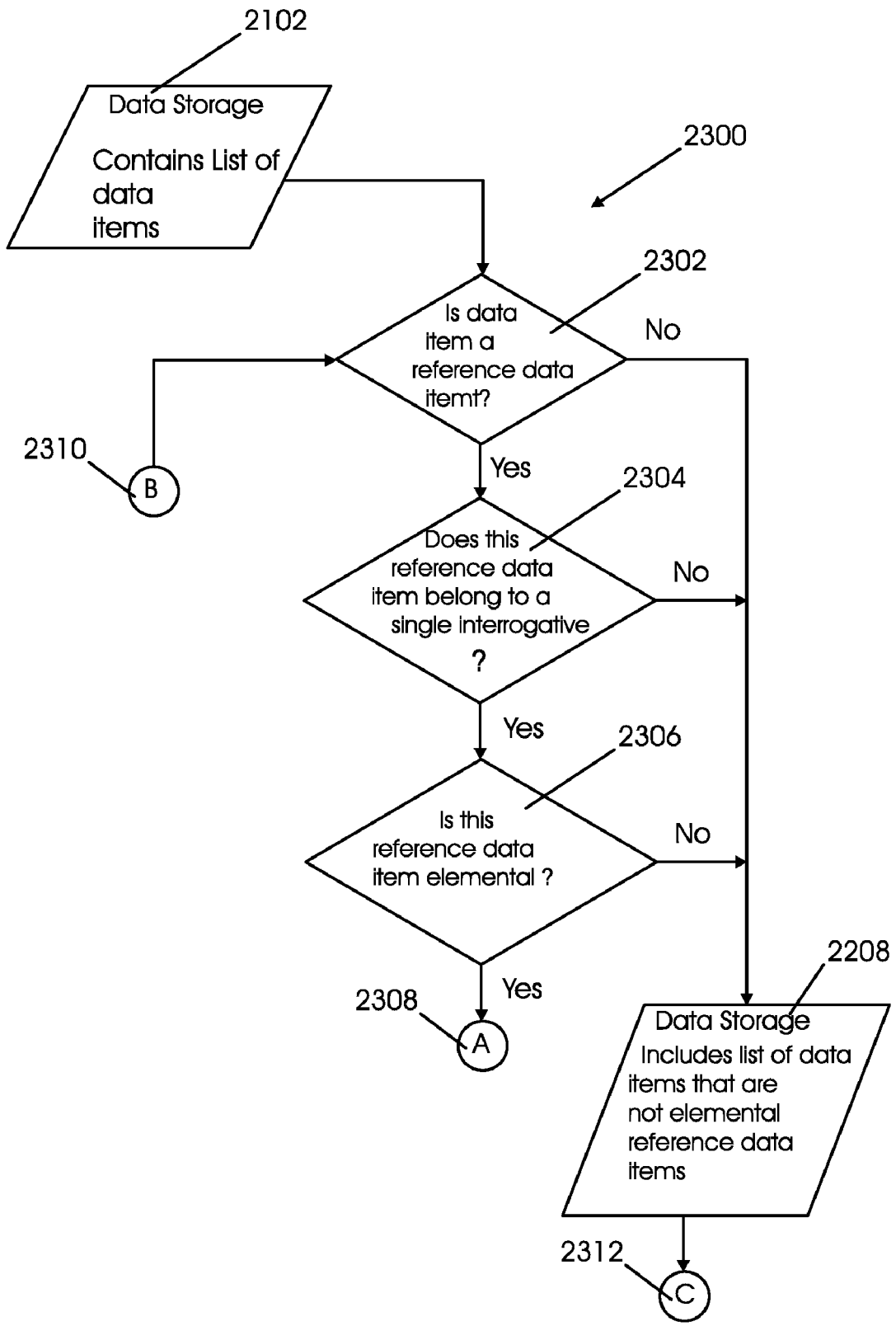
FIG. 16A shows a flow chart 2300 of a first portion of a data item classification method that details the process step 2202 of the higher-level flow chart 2200 shown in FIG. 15.
Figure 16B:
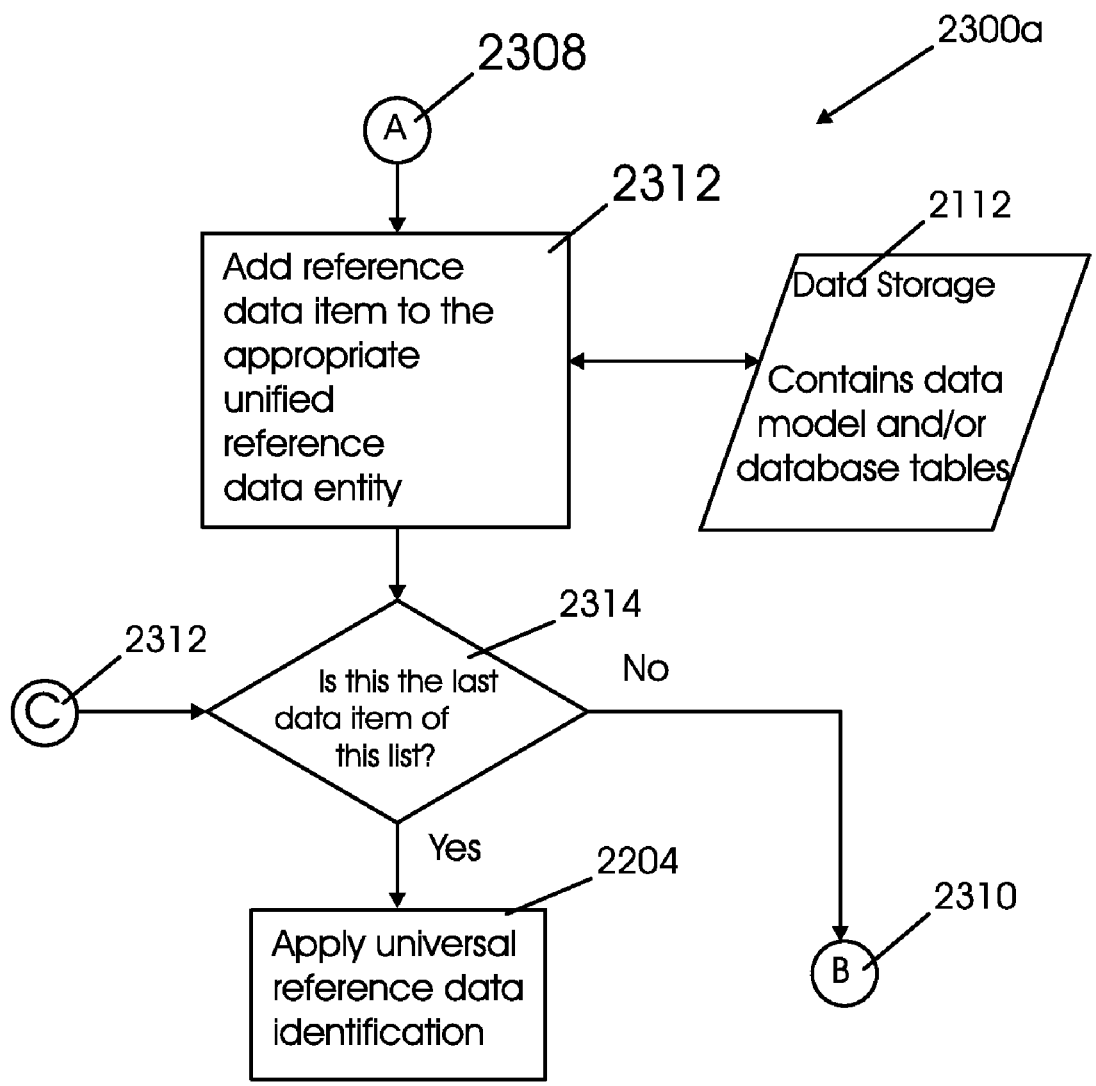
FIG. 16B shows a flow chart 2300a of a second portion of a data item classification method that details the process step 2202 of the higher-level flow chart 2200 shown in FIG. 15.
Figure 17:
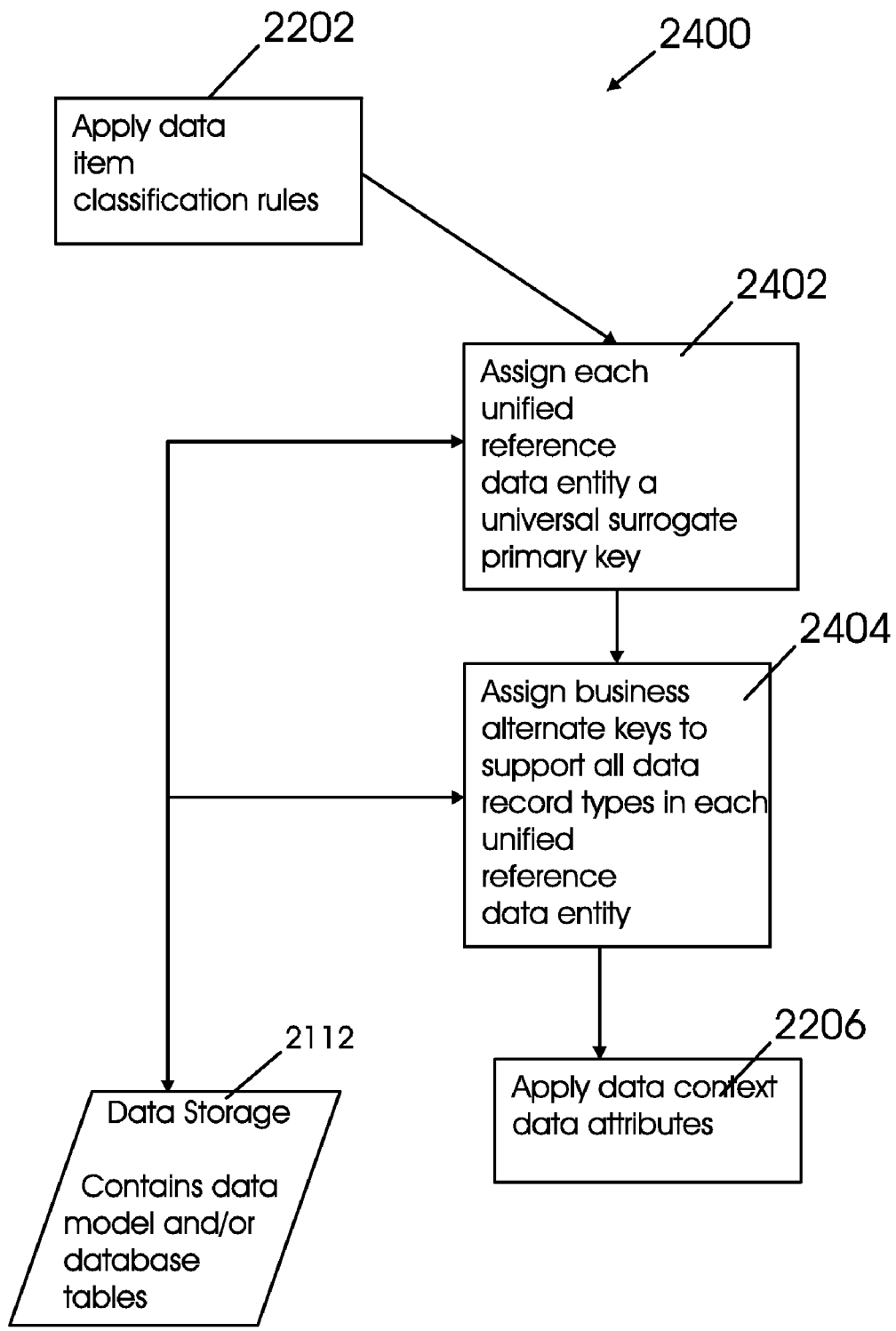
FIG. 17 shows a flow chart 2400 of a universal reference data identification method that details the process step 2204 of the higher-level flow chart 2200 shown in FIG. 15.
Figure 18:
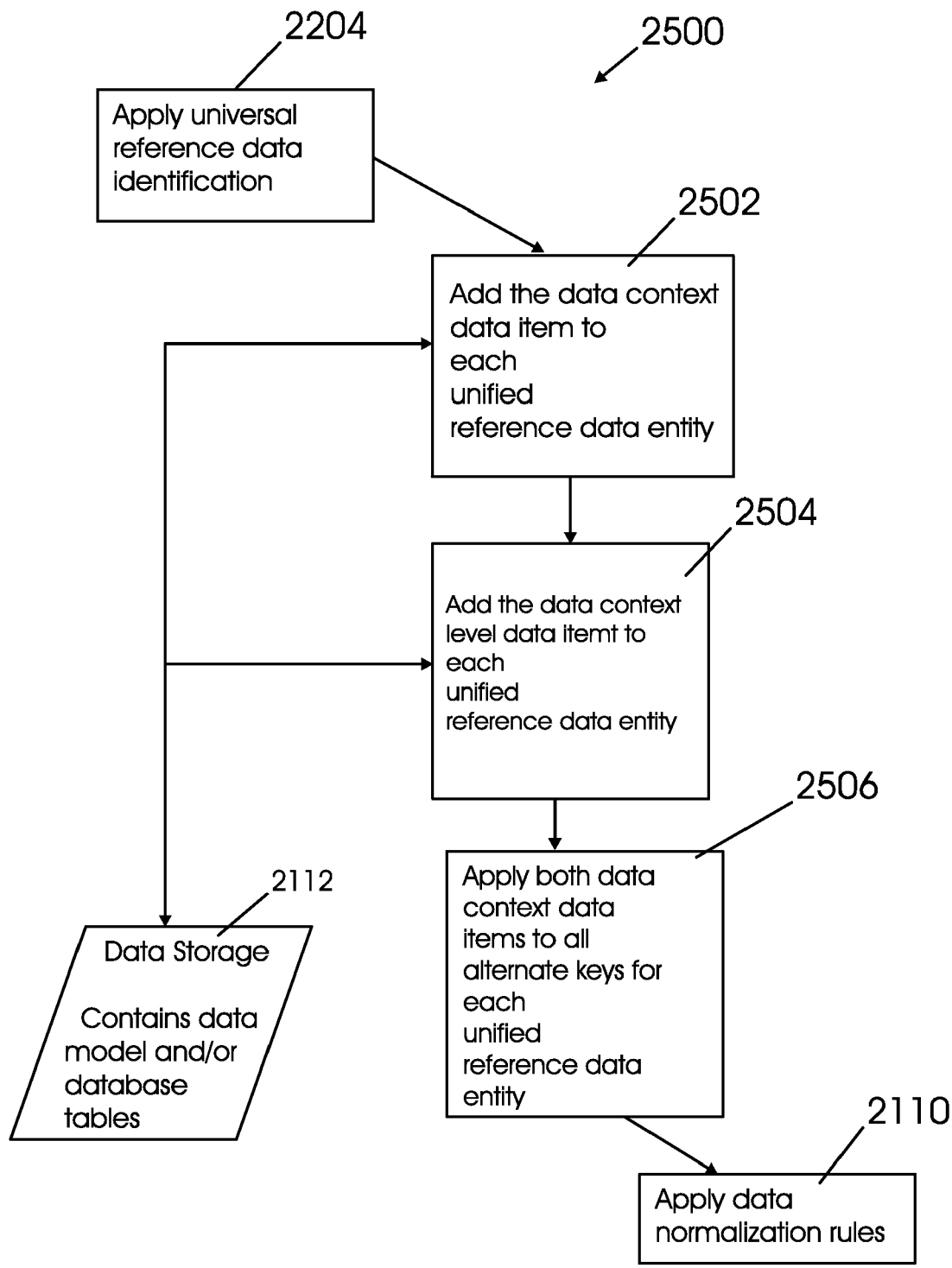
FIG. 18 shows a flow chart 2500 of a data context analysis method that details process 2206 of the higher-level flow chart 2200 shown in FIG. 15.
Figure 19:
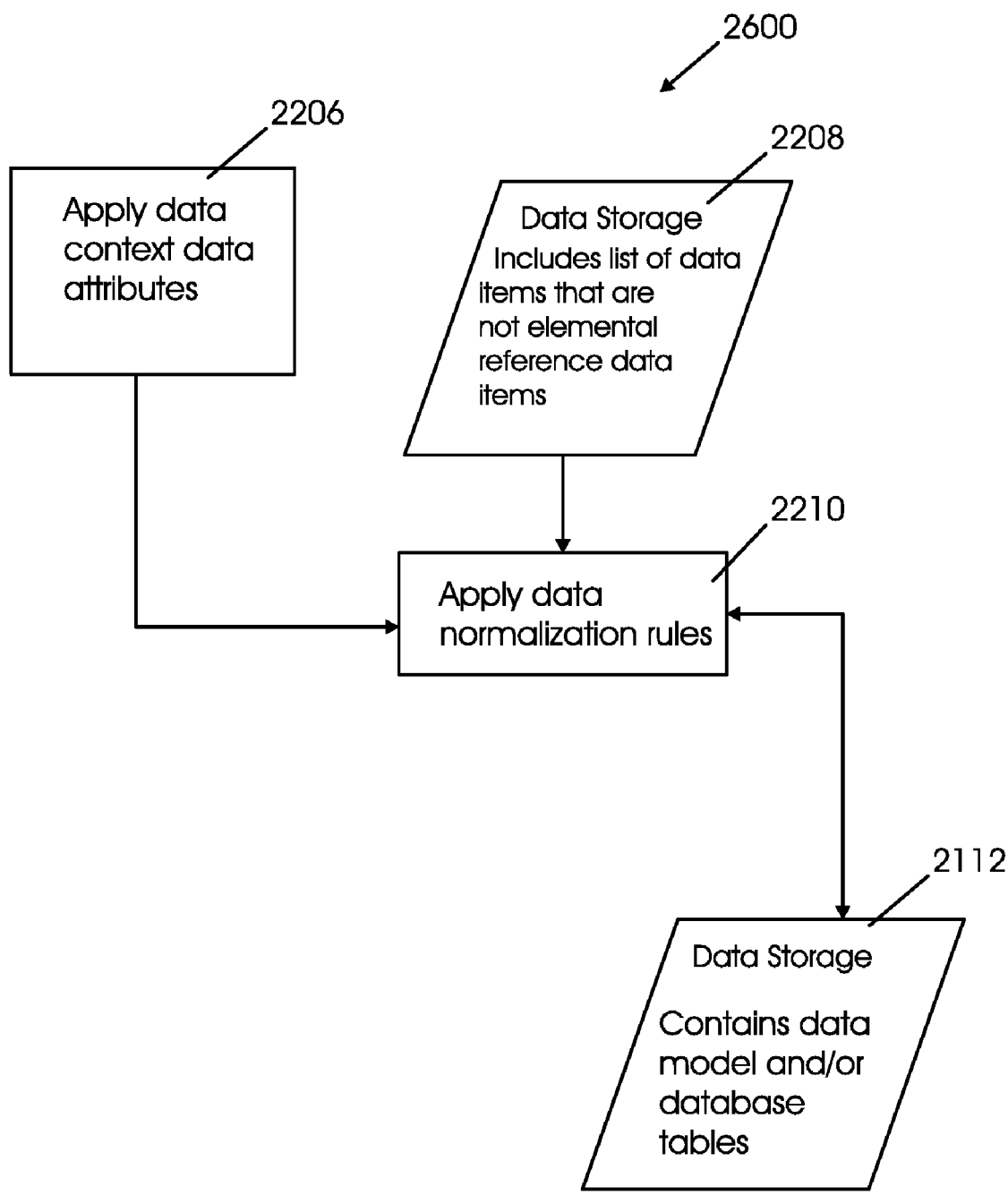
FIG. 19 shows a flow chart for applying the data normalization rules that details process step 2110 of the higher-level flow chart 2200 by FIG. 15.

One of the differences between the prior art database table development method's flow chart, FIG. 14, and a coherent data identification method's flow chart, FIG. 15 in accordance with an embodiment of the present invention, is that in an embodiment of the present invention processes are added to preprocess the list of data items (from data storage 2102) before the data normalization rules are applied at step 2110. A coherent data identification method in accordance with an embodiment of the present invention may be comprised of the following:

(1) a data item classification scheme or method represented by process step 2202 of FIG. 15 and shown in more detail by the flow charts in FIGS. 16A and 16B;

(2) a universal reference data identification method represented by process step 2204 of FIG. 15 and shown in more detail by the flow charts shown in FIG. 17;

(3) a data context analysis method represented by process step 2206 of FIG. 15 and shown in more detail by the flow chart shown in FIG. 18;

(4) a data normalization method represented by process step 2110 of FIG. 15 which is the same as prior art process step 2110 of FIG. 14 and shown in more detail in the flow chart shown in FIG. 19.

(1) Data Item Classification

There are many standard classification methods or systems that have been developed in the past. The Dewey Decimal system is used to classify books. The well known taxonomy of organisms based upon kingdom, phylum, class, is another example of a standard classification method or system. There are numerous other examples of classification systems that have been defined, however, prior to the present application, no universally accepted data item classification method or system has been defined.

A data item classification method, such as detailed in the flow charts shown in FIGS. 16A-16B, in accordance with an embodiment of the present invention, provides a method to classify data items of importance while setting aside data items deemed not to belong to the classifications being implemented. The result of data item classification within a coherent data identification method of an embodiment of the present invention would be a unified reference data model stored in a computer memory, such as computer memory 8. One such unified reference data model is represented by a unified reference data model's entity-relationship diagram such as that shown in FIG. 4C. A further result of implementing a data item classification method as shown in the flow charts of FIGS. 16A-16B is to add only elemental reference data items to the unified reference data entities of the unified reference data model. Once the data item classification foundation is developed, the universal reference data Identification method, such as shown in FIG. 17 needs to be applied.

FIG. 26 shows a spreadsheet 3300 of metadata, that may be stored in computer memory 8, and that may be used to aid in determining which data items are elemental reference data items in one embodiment of this present invention. The metadata shown in spreadsheet 3300 represents a small portion of the metadata that would be stored in a data model or a metadata repository in computer memory, such as computer memory 8. The metadata would normally also contain information such as a data item's data types, a data item's length of the anticipated data values, a data item's precision of the anticipated data values and more.

Spreadsheet 3300 includes a header row 3301, and sixteen data records 3302-3316 or rows of data values. The first column in this spreadsheet lists constituent data items to be evaluated. In a data normalized entity-relationship diagram, several of these data item constituents would be data entities. As such, these constituent data items often have other data items associated with them, such as business key data items. The second column contains a definition for each of the constituent data items. These constituent data item definitions need to name other data items upon which they are dependent if any. The third column contains the reference data item indicator that is used to determine if the constituent data item is a reference type data item. This reference data indicator has a data value of either 'Yes' or 'No'. Columns four to nine, which are labeled 'Who', 'What', 'Where', 'When', 'How', and 'Why' respectively are used to indicate which of the interrogatives may be used to classify the constituent data item. If the constituent data item of a specific data record row is classified by the interrogative which is the label of that column, a data value of 'Yes' is stored in that column for that data record row, otherwise, a data value of 'No' is stored in that column for that data record row. The tenth column in FIG. 26, which is labeled 'Business Key Data Items' is used to record the business key data items that may be used to uniquely identify data records for that constituent data item. In an actual data model, metadata data of the type shown in spreadsheet 3300 would be several thousand data records which would make the computer aided evaluation of data items most helpful.

This process of developing the elemental reference data items may be iterative. The results of a data item evaluation may require subsequent additions to the metadata. In cases where a data item appears to be independent, but is determined to not be an elemental data item, potential related elemental reference data items must be added. These data item evaluation results could also cause several constituent data items to be combined under a common set of business key data items. Specific examples of these metadata updates will be given in this patent application where appropriate.

(2) Universal Reference Data Identification Method

The primary key identification of reference data is very important to developing database tables. Many database table developers use a business key for the primary key identification of reference data in a reference data entity and a reference database table such as the database table shown in FIG. 9A. This practice is not allowed in at least one embodiment of a coherent data identification method in accordance with an embodiment of the present invention, as it does not provide the flexibility that is required by the method. Another table development method utilizes surrogate primary key identification for data entities and database tables such as the database table shown in FIG. 9B. In this method, a numeric surrogate identifier is declared as the primary key for a reference data entity or a reference database table. The purpose of this surrogate identifier is to provide unique identification of reference data records within that database table without using business significant data items. This surrogate identifier has no business significance since it is added to the database table to add database functionality and not to contain business relevant data values. Again, this prior art surrogate key reference data identification is not flexible enough for embodiments of the present invention, because it does not support reversible data normalization.

A universal reference data identification method in accordance with an embodiment of the present invention is an improvement upon the prior art surrogate reference data identification method. In the universal reference data identification of an embodiment of the present invention, a single surrogate mutually exclusive primary key is declared in the data model tool or the CASE tool for each of the six unified reference data entities. By this primary key declaration in the unified reference data model, a unique primary key identification for each unified reference data record is assured. That is, even if the unified reference data entity is later normalized into a cluster of related unified reference data entities, the same mutually exclusive primary key identifier is used for each data normalized unified reference data entity. The resulting normalized unified reference database table cluster will also have the same primary key data item and it must be populated in a mutually exclusive manner being certain that no data values are use more than once anywhere within the database table cluster. If it is desired to de-normalize any combination of the unified reference database tables in this mutually exclusive primary key cluster, there will not be a problem with duplicate primary key values. The use of universal reference data identifiers along with the definition of the six unified reference data entities before any data normalization is attempted, supports reversible data normalization. It is the combination of the data item classification method and the universal data identification method that provides support of reversible data normalization. A data item classification method in accordance with one or more embodiments of the present invention provides the correct clustering of elemental reference data items for the surrogate mutually exclusive primary key identification. The flow chart of FIG. 17 shows a method for universal reference data identification in accordance with an embodiment of the present invention.

Since a surrogate mutually exclusive primary key is required for the coherent data identification method, one or more alternate keys of which each is comprised from one or more business data items also need to be defined. These alternate keys provide a method to retrieve specific data records from database tables based upon business-relevant data values. The surrogate mutually exclusive primary keys provide a method for the database management system to combine data records from multiple database tables into a coherent set of extended data records.

(3) Data Context Analysis Method

The data context analysis method portion of a coherent data identification method in accordance with an embodiment of the present invention is used to reduce the overall number of database tables needed within a database. Prior art data normalization results in a database with numerous database tables, and many of these database tables have relatively few data records such as those database tables shown in FIGS. 6A, 7A, 7B and 8A. By using the data context analysis method as part of the database table development, data that would be normalized into several database tables may now be placed into a single database table such as that database table 1700 shown in FIG. 11. This allows for a tremendous amount of flexibility in the database table development process while remaining within the coherent data identification method. Please note that the database table 1700 in FIG. 11 contains all the data records represented in the database tables of FIGS. 6A, 7B and 7A. Data records from the database table shown in FIG. 6A, data records 701 and 702, are also represented in the database table 1700 of FIG. 11 as data records 1701 and 1702 respectively. Data records 1001-1005 from the database table 1000 shown in FIG. 7B are also represented in the database table 1700 of FIG. 11 as data records 1703, 1704, 1705, 1706, and 1707, respectively. Data records 901-907 from the database table 900 shown in FIG. 7A are also represented in the database table 1700 of FIG. 11 as data records 1708, 1709, 1710, 1711, 1712, 1713, and 1714.

Each unified reference data entity may be defined to contain multiple data context types such as those shown in the when unified reference database table (data entity) 2000 of FIG. 13. Note that the first and the last data records of database table 2000 (first data record is first row below title row, and last data record is last row) have the same values for the start time period (AK1), Jan. 1, 1991, and the end time period (AK1), Dec. 31, 1991. Without the addition of the data context (AK1) data item to the first alternate key, which is a unique key, the database table could not contain both Gregorian calendar years, as shown in the first data record, and Julian calendar years, as shown in the last data record. This ability to store various data contexts of data records in a single database table is required since the data normalization of a unified reference data entity will not occur until after all data items from all reference data record data contexts have been added to the unified reference data entity. The use of the data context analysis method data attributes will provide the means of defining these various data record data contexts for each of the six unified reference data entities.

Data context analysis provides a method for combining, into a single unified reference database table, multiple types of reference data records. This combination of multiple data record data contexts into a single unified reference database table is only supported when used in conjunction with a universal reference data identification method in accordance with an embodiment of the present invention. With the addition of the data context data item and the data context level data item to a unified reference data entity, multiple valid alternate keys may be defined within the same data entity. Unified reference data entities with multiple alternate keys may require data normalization to form unified reference database tables with single alternate keys. All the alternate keys of the unified reference data entity will combine the two data context data items with the business relevant data items. Flow chart 2500 shown in FIG. 18 shows a method for context analysis in accordance with an embodiment of the present invention.

(4) Data Normalization Method

Prior art database table development is based upon a standard set of data normalization rules which are shown in FIG. 2. A coherent data identification method of database table development of an embodiment of the present invention is based upon developing the six unified reference data entities. Once the unified reference data entities are completed, they may also be data normalized before database instantiating the unified reference database tables. Flow chart 2600 as shown in FIG. 19 depicts how the data normalization process is implemented in the coherent data identification method.

Since the unified reference data entities represent the boundaries of entity-relationships diagrams, the unified reference data entities should be comprised from elemental reference data items which represent the limits for identifying data items. Therefore, elemental reference data items must be developed for each of the unified reference data entities. One method of developing elemental reference data items is via the data item classification method.

FIGS. 16A-16B shows the detailed flow chart for the data item classification method of a coherent data identification method in accordance with an embodiment of the present invention. Within the context of this patent application, data has two basic categories that are reference data and non-reference data. Reference data is comprised of data items used to identify, define, and characterize something of significance such as persons, places and things. Reference data is used to aid in distinguishing one instance of a specific data record, from all other instances. For example, postal address reference data is comprised of reference data items used to specify a single postal address among all other postal addresses. All non-reference data items depend upon one or more sets of reference data items for defining the significance of the non-reference data items as well as defining their relationships to other non-reference data items. Non-reference data items are often quantitative and/or qualitative type data items that are always dependent upon reference data items.

FIGS. 16A-16B show a flow chart comprised of portions 2300 and 2300*a*. FIG. 16A shows portion 2300 of the flow chart. The flow chart including 2300 and 2300*a*, shows a data item classification method that may be part of the process executed by process step 2202 in the overall method shown by FIG. 15. Data storage device 2102 of computer memory 8, could be managed by a data model tool or a CASE tool computer software running on computer processor 4. Once the list of data items are entered into the data model tool or the CASE tool, metadata will also be required for each data item such as the definition, the data type, and the data length. At decision step 2302 shown in FIG. 16A, the computer processor 4 determines whether a data item is a reference data item. The metadata, such as that shown in spreadsheet 3300 of FIG. 26, is used to determine that the data item is a reference data item. Again, a reference data item is used to define or identify some person, place, time, method, reason, or thing. As an example of a non-reference data, net Sales is a non-reference, numeric quantity that is related to reference data such as the time period, the company, the product line, the sales territory, the chart of accounts, and the sales channel. The computer processor 4 is programmed, in accordance with a method of the present invention, to read a single data item. For example, a list 2702, shown in FIG. 20, of data items may be stored in data storage of computer memory 2102. For example, each of "Corporation Name", "Country Name", "Customer Number", "Date", "Date Sequence in Year", "Month Name", "Month Sequence in Year", "Product Code", "Product Market Group Code", "Sales Amount", and "Year" is a data item. At this point the data items do not include data values.

It is important that the unified reference data model's metadata for all data items contain an accurate and complete definition and other metadata such as shown in FIG. 26 to support the decision made by computer processor 4 at decision step 2302 shown in FIG. 16A. The metadata for each data item, in one embodiment, contains an indicator used to determine whether the data item is a reference data item or a non-reference data item. The metadata for each reference data item also, in one embodiment, includes an indication as to which of the common interrogatives may be used to classify the data item. The metadata for each reference data item, in one embodiment includes an indicator to indicate that the reference data item may be used in a business key to aid in the unique identification of some data entity or constituent data item. In at least one embodiment, it is also important that the metadata contain a complete definition for the data item that includes any dependencies on any other data items. If the data item is not a reference data item as determined from its metadata, then the computer processor 4 places the non-reference data item in data storage 2208 of computer memory 8 for later processing. Using the metadata in spreadsheet 3300, data record rows 3306, 3308, and 3311 all have a data value of 'No' in the column labeled 'Reference Data Item Indicator'. Therefore, the constituent data items 'Date Sequence in Year' (metadata record row 3306), 'Month Sequence in Year' (metadata record row 3308), and 'Sales Amount' (metadata record row 3311) are deemed to be non-reference data items. A list 2704 is shown in FIG. 20 of non-reference data items which was taken from the list 2702 in data storage 2102 of computer memory 8 and placed in the data storage 2208 of computer memory 2208.

These data items, taken from data storage 2102 of computer memory 8 and placed in data storage 2208 of computer memory 8, are deemed non-reference data items that are dependent upon other data items and are often shown to represent quantitative data item values.

Once a data item has been placed into data storage 2208, process control is passed to decision step 2314 shown in FIG. 16B via flow chart connector labeled C of both FIGS. 16A-16B. The step of "placing" a data item in data storage 2208 may include storing metadata about the data item where not only the data item name is stored but the other metadata as well. No data item data values are stored in the metadata repository or data storage 2208. The data item data values are eventually stored in the database tables after these database tables have been database instantiated into the database management system.

Figure 20:
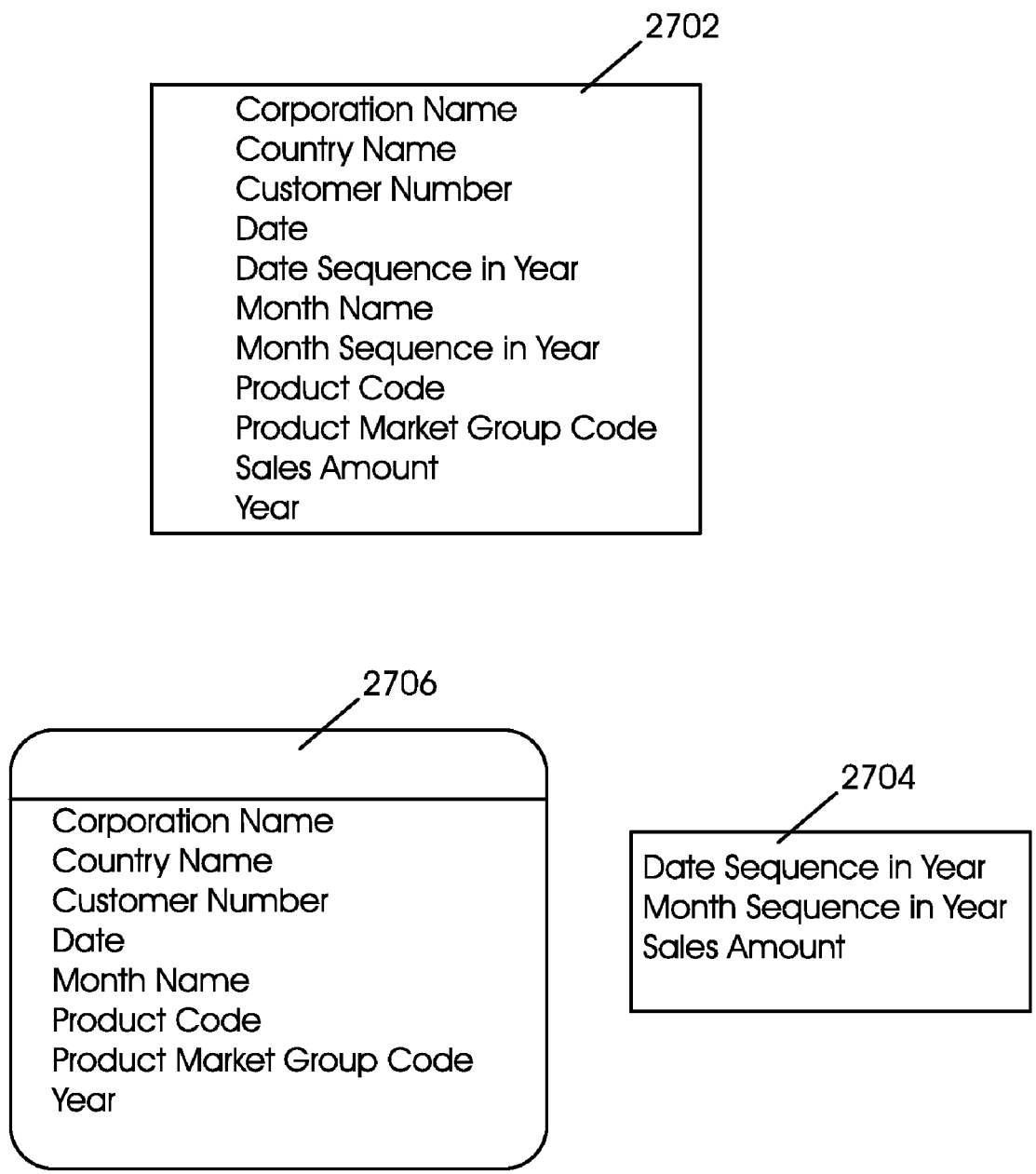
FIG. 20 shows a sample list of data items 2702 that may be placed in data storage 2102 of flow chart 2200 shown in FIG. 15 before process step 2302 of FIG. 16A is executed and a sample list of data items 2704 that may be used as data storage 2208 of flow chart 2300 of FIG. 16A and a reference data entity 2706 that may be used as data storage 2112 of flow chart 2200 of FIG. 15 after process step 2302 of FIG. 16A is executed.

If a data item is a reference data item, then the computer processor 4 is programmed to place it into a reference data entity, such as reference data entity 2706 shown in FIG. 20 in data storage or computer memory 2112. At this point, we have no criteria for forming multiple reference data entities since we are not yet applying the data normalization rules. This entity 2706 is simply a place holder to group the reference data items, but it is also only a visual representation for the figure. That is, the reference data items could just remain in the metadata repository, such as storage 2208, each with a reference data indicator. The reference data entity 2706 shown in FIG. 20 may be stored by the CASE tool or the data model tool running on the computer processor 4 in data storage 2112 shown in FIG. 16B of the computer memory 8 shown in FIG. 1.

Figure 21:
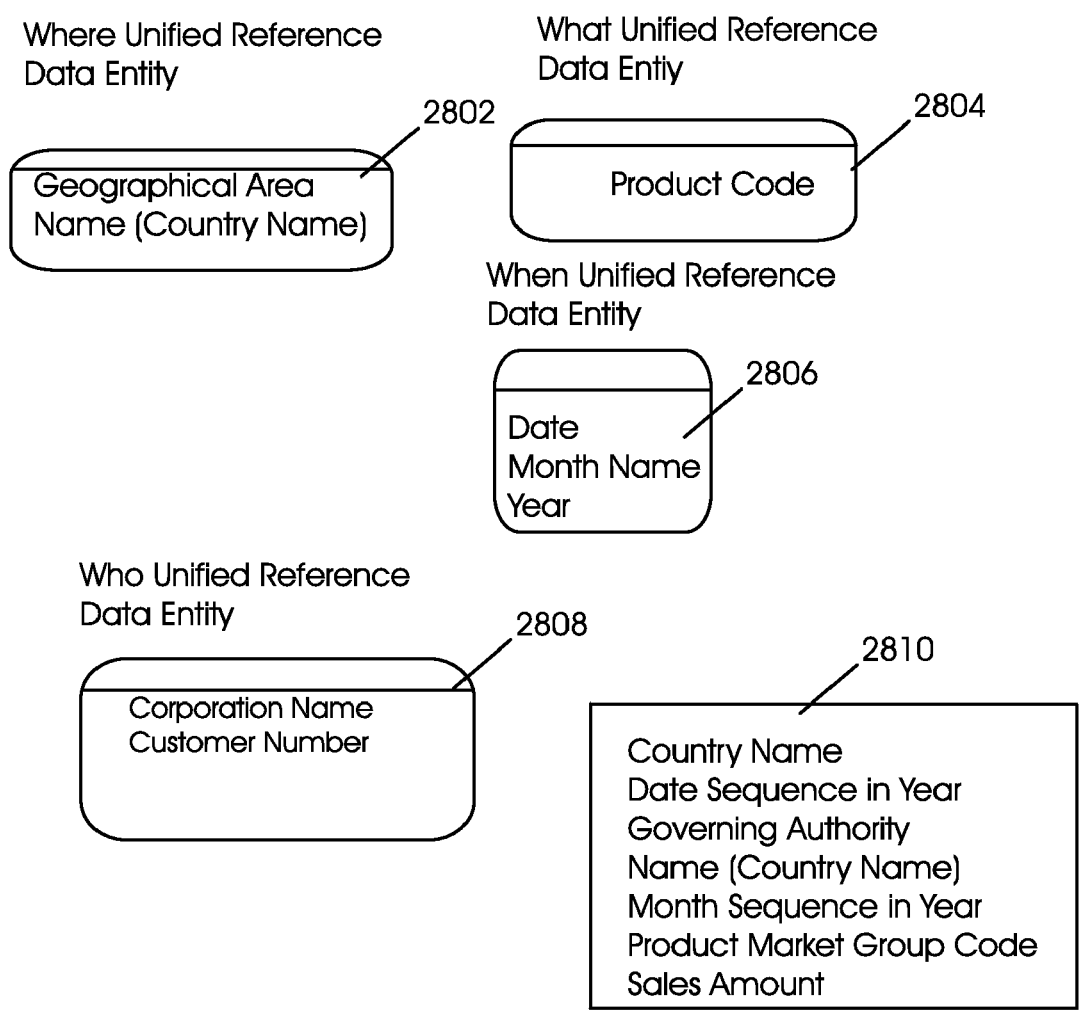
FIG. 21 shows four unified reference data entities 2802, 2804, 2806, and 2808 that may be stored in data storage 2112 of FIG. 16B and a sample list of data items 2810 that may be placed in data storage 2208 of FIG. 16A after the execution of process step 2304 shown in FIG. 16A.

Next, at decision step 2304 shown in FIG. 16A, the computer processor 4 determines whether the reference data item, such as 2706 shown in FIG. 20, may be assigned to one and only one interrogative. This classification of a data item by one and only one interrogative is one test used to determine that the reference data item is an elemental reference data item. It is important that the unified reference data model's metadata, such as that shown in spreadsheet 3300 of FIG. 26, for all data items contain an accurate and complete definition and other metadata to support the decision made by computer processor 4 at decision step 2304 shown in FIG. 16A. If a data item may be assigned to one and only one interrogative, such as shown in data record row 3302 of spreadsheet 3300, the computer processor 4 moves the data item from the reference data entity stored in data storage 2112 in computer memory 8 to the proper unified reference data entity that is also stored in data storage 2112 in computer memory 8 as illustrated in FIG. 21. The data model tool or the CASE tool running on the computer processor 4 could be programmed to move the data item in the reference data entity to the proper unified reference data entity based upon the information contained in the data item's metadata.

Unified reference data entities may not be further decomposed by interrogatives, since they are from a single interrogative. An example of a unified reference data entity is the where unified reference data entity 2902 shown in FIG. 22. Prior art data models and database tables did not use this single interrogative approach to developing data entities and database tables. Therefore, many prior art independent data entities can be further decomposed. This use of the single common interrogative to aid in development of independent data entities is not a part of the prior art since the common interrogatives have never been used in this manner. For example, a prior art data model that contains a country data entity and a state data entity would contain data items as shown in the entity-relationship diagram 200 of FIG. 3A. But, the country and state data entities really represent both a geographical component and a governing authority component. In a coherent data identification method of an embodiment of the present invention, both these reference data entities would be represented in both a where unified reference data entity and in the who unified reference data entity as indicated by data record row 3303 of spreadsheet 3300 in FIG. 26. In this metadata record row 3303, the constituent data item country is classified by both the who and the when interrogatives. The definition column of data record row 3303 indicates that the country is defined by a geographic area and defined by a governing authority. In this case, both the geographic area data item and the governing authority data item must now be defined in the metadata data records as shown in data record rows 3314 and 3315 respectively. Therefore, in this unified reference data model, the country data item is a dependent data item.

This one and only one interrogative determination is the start to providing elemental reference data items to the unified reference data entities. Beyond this, when a constituent data item is found to be classified by multiple common interrogatives, that constituent data item is now dependent upon other data items, in accordance with one or more embodiments of the present invention. For example, the constituent data item country, data record row 3303 of spreadsheet 3300 shown in FIG. 26, is classified by the interrogatives Who and Where. The dependent constituent data item, country, now needs to have a definition that details upon which other potential elemental reference data items it is dependent. In the example of data item country, the definition reveals that the country data item is dependent upon both constituent data item geographic area, metadata record row 3315, and constituent data item governing authority which is detailed in metadata record row 3314. Note that each of these potential elemental reference data items is associated to one of the interrogatives that classify the dependent data item country. That is, geographic area is classified by the where interrogative and governing authority is classified by the who interrogative. In some cases, new potential elemental reference data item records need to be added to the metadata when they do not exist. In this way, the boundaries of the entity-relationship diagram and the data model are being extended. Also, if the country name data item was the original business key for the constituent data item, it had to be replaced by the combination of business key data items for the potential elemental reference data items as shown in data record row 3303 of spreadsheet 3000 as shown in FIG. 26. This process of extending the boundaries of the data model is a very important process for developing the elemental reference data items and the unified reference data entities.

Any data item deemed not to be classified by one and only one interrogative is added to data storage 2208 of the computer memory 8. In FIG. 21, data item country name and product market group code were deemed not to be single interrogative type data items by the computer processor 4, and are part of a list 2810 of data items which are stored in data storage 2208 of the computer memory 8. Again, a country name data item is used to identify a geographic area as well as a governing authority. Therefore, the data item country name could be associated to both the "where" interrogative and the "who" interrogative. In this case, the data item country name was moved to the data storage 2208 while the data item country name was replaced by the geographic area name data item in the where unified reference data entity 2802 and the governing authority name in the who unified reference data entity 2808 as shown in FIG. 21. The product market group code, the fifth column of spreadsheet 1200 shown in FIG. 8B, is a data item that is a combination of the country code and the product code. As such, a single interrogative may not be assigned to the product market group code data item. The product code is placed into the what unified reference data entity 2804 while the country code is represented by the geographic area name in the where unified reference data entity 2802. Once the computer processor 4 has placed a data item into data storage 2208 of the computer memory 8, process control is passed to decision step 2314 of FIG. 16B via flow chart connector labeled C on both FIGS. 16A-16B.

This determination as to what one and only one interrogative a data item is classified by is very important. There are not many constituent data items that may be assigned to one and only one interrogative and therefore, not many data items are elemental reference data items. One example of a set of data items that may be associated to one and only one interrogative are the business key data items associated with an individual person. The individual person related business key data items will always be placed into the who unified reference data entity. Individual person related data items would not include an address for an individual which would be defined in the where unified reference data entity. A person is defined in the who unified reference data entity. If we wish to record that a person resides at a given address, we need a non-unified reference data entity with relationships to both the who unified reference data entity and the where unified reference data entity. In fact, we may need a third relationship to the when unified reference data entity to record when the person started to reside at that address. In another example, reference data items directly associated with a manufacturing facility would not be assigned a single interrogative by the computer processor 4. The manufacturing facility has a "what" component as well as a "where" component. Again, this use of the one and only one interrogative approach to developing elemental reference data items is not a part of the prior art since the common interrogatives were never used in this manner.

Next, at decision step 2306, the computer processor 4 examines the data item currently assigned to a unified reference data entity to determine whether the data item is an elemental reference data item. "Elemental" is generally defined as the nature of an ultimate constituent; simple; uncompounded. In at least one embodiment of the present invention, it is important that the unified reference data model's metadata for all data items contain an accurate and complete definition and other metadata to support the decision made by computer processor 4 at decision step 2306 shown in FIG. 16A. The unified reference data entities, which are defined by the computer processor 4 in accordance with a method of the present invention, in one embodiment, are configured to contain elemental reference data attributes, which are data attributes or data items that are independent, simple, uncompounded and most importantly, aid in the unique identification of an ultimate constituent data item. In prior art data models, subsets of data attributes are often defined as independent data entities. In the case of prior art data models, this is acceptable since the data model is always limited in scope. However, a coherent data identification method, in accordance with the present invention executed by the computer processor 4, provides a data model stored in computer memory 8, that is not limited in scope as the unified reference data model is to be used for the design and development of multiple databases. Therefore, in one embodiment of the present invention, only elemental reference data items would be acceptable and would be provided by the computer processor 4 executing a method in accordance with an embodiment of the present invention to insure that the reference data item could not be further divided into multiple data entities. Again, with the coherent data identification method, the entity-relationship diagram must have a set of independent data entities that represent the absolute boundary for any entity-relationship diagram because all other data entities that may be defined must be dependent upon this set of independent data entities. This set of independent data entities, prior to any data normalization process, is the unified reference data entities of the unified reference data model.

Once the prospective elemental reference data items have been culled by the computer processor 4, there are two more tests used by the computer processor 4 to determine that a prospective elemental reference data item is indeed an elemental reference data item. The first test implemented by the computer processor 4, is that the reference data item represents a single undividable data item. The second test, implemented by the computer processor 4, is that the prospective elemental reference data item represents a complete set of elemental reference data instances instead of a subset of data instances. If a prospective elemental reference data item is a reference data item that is an independent business key data item for an independent constituent data item classified by one and only one interrogative and passes both the first test and the second test for elemental reference data items is presently considered to be an elemental reference data item.

The business key data items of the constituent data item are used to uniquely identify the data records of the constituent data item.

As an example of the first test for elemental reference data items, reference data items that uniquely identify corporations will be evaluated using the metadata record row 3302 from spreadsheet 3300 as shown in FIG. 26. A corporation constituent data item, by definition, is an organization incorporated by a governing authority. From the definition, it is determined that corporation related data items are dependent upon both a defined organization, metadata record row 3313 and a defined governing authority, metadata record row 3314. Any first reference data items whose definition is dependent upon two or more or other data items may not, itself, be an elemental reference data item unless the first reference data item's business key data items are the same as the business key data items of the two or more other data items. Therefore, reference data items for identifying corporations would not be considered elemental reference data items as they violate the first test for elemental reference data items. However, organization identifying data items or business key data items should now be considered as a replacement for the now dependent corporation identifying data items. Likewise, governing authority identifying data items or business key data items should also be considered as a replacement for the now dependent corporation identifying data items. Note that the business key data items for the corporation constituent data item, metadata record row 3302, is now the combination of the business key data items from both the organization business key data items, metadata record row 3313, and the governing authority business key data items, metadata record row 3314.

Again, the second test for elemental reference data items is that the prospective elemental reference data item represent a complete set of elemental reference data items instead of a subset of elemental reference data instances. As an example of the second test for elemental reference data items, reference data items that uniquely identify the constituent data item Year are used. The year constituent data item is detailed by metadata record row 3312 of spreadsheet 3300 as shown in FIG. 26. From the metadata definition for the year constituent data item, it is determined that a year is simply a type of time period which itself is detailed in metadata record row 3316 of spreadsheet 3300 as shown in FIG. 26. Upon further inspection of the metadata spreadsheet 3300 of FIG. 26, it is found that constituent data item month, metadata record row 3307, and the constituent data item date, metadata record row 3305, are also subsets of the time period elemental reference data item. The constituent data items year, month, and date all represent subsets of the elemental reference data item time period as may be seen in the database table 1700 of FIG. 11. All constituent data items that are roles or subtypes of another constituent data item are examples of data items that are not elemental reference data items. The constituent data items that are determined to be roles or subtypes of another constituent data item should be combined into a single constituent data item that have a common set of business key data items. This process of combining similar constituent data items is also very important in developing elemental reference data items and unified reference data entities. Prior art data models may contain many independent data entities while the unified reference data model in accordance with an embodiment of the present invention is based upon six unified reference data entities.

Figure 22:
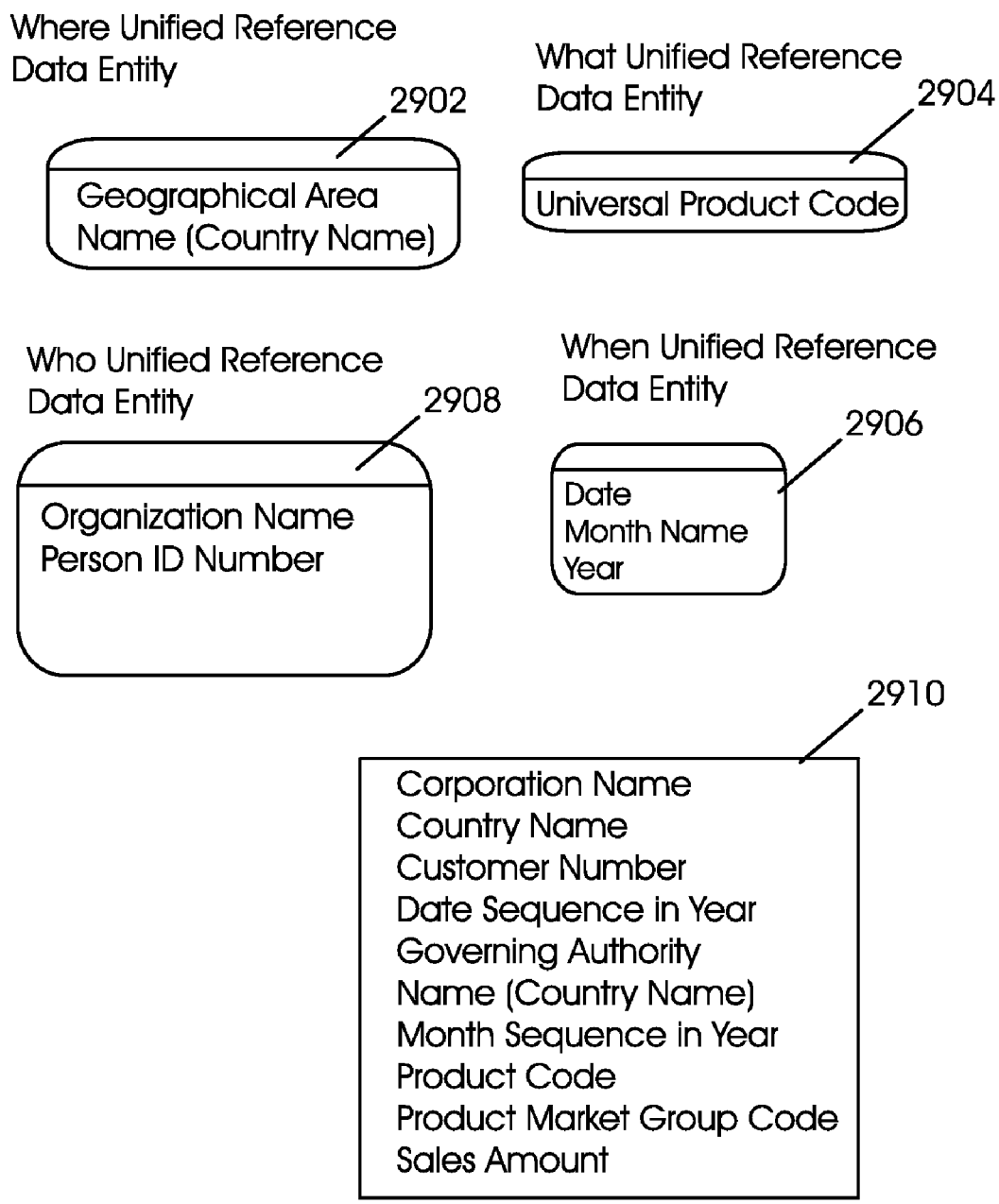
FIG. 22 shows four unified reference data entities 2902, 2904, 2906, and 2908 that may be stored in data storage 2112 of FIG. 16B and a sample list of data items 2910 that may be placed in data storage 2208 of FIG. 16A after the execution of process step 2312 as shown in FIG. 16B.

FIG. 22 depicts where, what, when, and who unified reference data entities 2902, 2904, 2906, and 2908, respectively. FIG. 22 also shows a list 2910 of non-elemental reference data items located in data storage 2208 in the computer memory 8. The unified reference data entities 2902, 2904, 2906, and 2908 are shown in FIG. 22 as they exist before process step 2306 shown in FIG. 16A. Any data items deemed not to be elemental are removed from the unified reference data entities 2902, 2904, 2906, and 2908 by the computer processor 4, as is the case for data items corporation name and customer number that are removed from the who unified reference data entity and placed in data storage 2208 as shown by the list of data items 2910 in data storage 2208 in FIG. 22. The Corporation Name data item referred to in the list 2910 is replaced in the who unified reference data entity 2908 by the Organization Name data item as shown in FIG. 22. The Customer Number data item referred to in the list 2910 is replaced in the who unified reference data entity 2908 by the Person ID Number data item as shown in data entity 2908 in FIG. 22. In decision step 2306 as shown in flow chart 2300 of FIG. 16A, all non-elemental reference data items, such as those of list 2810 in FIG. 21, are appended to data storage 2208 in the computer memory 8 by computer processor 4. Once a data item has been placed into data storage 2208, process control is passed to decision step 2314 of FIG. 16B via flow chart connector labeled C on both FIGS. 16A-16B.

FIG. 16B shows the portion 2300a of a data item classification method in accordance with an embodiment of the present invention that may be part of the overall method executed by the computer processor 4 and shown by FIG. 15. There are three common connectors between the flow chart of FIG. 16A and the flow chart of FIG. 16B. The common connector labeled 'A' (2308) connects decision step 2306 of FIG. 15 to process step 2312 of FIG. 16B. The common connector labeled 'B' (2310) connects process step 2314 of FIG. 16B to decision step 2302 of FIG. 16A. The common connector labeled 'C' (2312) connects data storage 2208 of FIG. 16A to decision step 2314 of FIG. 16B.

At process step 2312, the CASE tool or data modeling tool computer software program running on the computer processor 4 is used to move the elemental reference data attributes or data items from the reference data entity 2702 shown in FIG. 20, to the proper unified reference data entity shown in FIG. 21. Each data item name of the elemental reference data attributes is removed from reference data entity 2702 and placed into one of the proper unified reference data entities 2802, 2804, 2806, or 2808.

In decision step 2314 of FIG. 16B, the computer processor 4 determines if more data items need be processed from data storage 2102 shown in FIG. 16A. If there are still data items in data storage 2102 to be processed, then process step 2302 of FIG. 16A is again executed by computer processor 4. However, once all the data items have been evaluated from data storage 2102 of FIG. 16A, process step 2204 of FIG. 16B is then executed by computer processor 4. Process step 2204 of FIG. 16B is the same as process step 2204 in FIG. 15. Process step 2204 is detailed in FIG. 17. This completes the data classification process step 2202 of a coherent data identification method in accordance with an embodiment of the present invention that is depicted on flow chart 2200 of FIG. 15.

FIG. 17 shows a flow chart 2400 of a universal reference data identification method that may be part of an overall coherent data identification method in accordance with an embodiment of the present invention. A coherent data identification method in accordance with an embodiment of the present invention uses a universal reference data identification method of primary key definition referred to in process 2204 of FIG. 15 that is further detailed in FIG. 17.

In the prior art, each database table has a single primary key that uniquely identifies all data records within that database table. In the prior art, the emphasis is upon defining a single primary key for a given table. This primary key is most often composed from one or more business data items that, in combination, uniquely identify each and every data record in that specific database table. Usually, a surrogate data item is used if a combination of business data items is not available to uniquely identify each and every data record in a database table. Again, the surrogate primary key definition is intended for a single database table.

A coherent data identification method in accordance with an embodiment of the present invention uses the universal reference data identification method for primary key definition. This method is based upon surrogate type primary keys and always is intended to encompass all unified reference database tables in a database. Again, the prior art database table design is always of a limited scope and therefore, there is no need for the universal reference data method. A coherent data identification method, in accordance with an embodiment of the present invention, is used to develop database tables for multiple databases. These multiple databases will share unified reference database tables and therefore share the universal reference data identifiers.

FIG. 17 shows flow chart 2400 of a universal reference data identification method that may be part of an overall coherent data identification method in accordance with an embodiment of the present invention. In a universal reference data identification method, in accordance with an embodiment of the present invention, the unified reference data entities' primary keys are defined by the computer processor 4 in a very specific and unique way. All unified reference data entities are provided a primary key which is a universal surrogate key. The universal surrogate key is a numeric type data item with no business significance that provides mutually exclusive identification for all unified reference data records for a specific data interrogative. With prior art database table key development methods, the database table keys are not mutually exclusive and are only usable for the table for which each key is defined. If the unified reference data entities are normalized into multiple unified reference tables, the same universal surrogate key must still be applied to each of the tables as though they were still a single database table. This will maintain the mutually exclusive property of the universal surrogate keys. The mutually exclusive identification of the unified reference data records will support reversible data normalization.

The flow chart of FIG. 17 is a detailed flow chart that is represented as process step 2204 of FIG. 15. Once process step 2202, the data classification method, is completed, process step 2204 may begin.

At process step 2402 of FIG. 17, the CASE tool or data modeling tool that is executed on computer processor 4, is used to add a universal surrogate key to each unified reference data entity such as data entities 2902, 2904, 2906, and 2908 stored in data storage 2112, and shown in FIG. 22. First the unified reference data entities that were stored in data storage 2112 in the computer memory 8 at the end of process step 2202 are brought into computer memory 8. The CASE tool or data modeling tool is used to assign a single universal surrogate identifier to each of the unified reference data entities, such as each of 2902, 2904, 2906, and 2908. These unified reference data entities 2902, 2904, 2906, and 2908 of FIG. 22 then have a universal surrogate key added to them and declared to be the primary key of each unified reference data entity, as shown in resulting unified reference data entities 3002, 3006, 3008, and 3004 shown in FIG. 23. Database table 1600 in FIG. 10B shows a universal surrogate identification number, declared as the when unified reference database table's primary key (PK), in the first column of database table 1600. The resulting unified reference data entities, such as the data entities 3002, 3004, 3006, and 3008, shown in FIG. 23, may then be stored in data storage 2112 in the computer memory 8.

Figure 23:
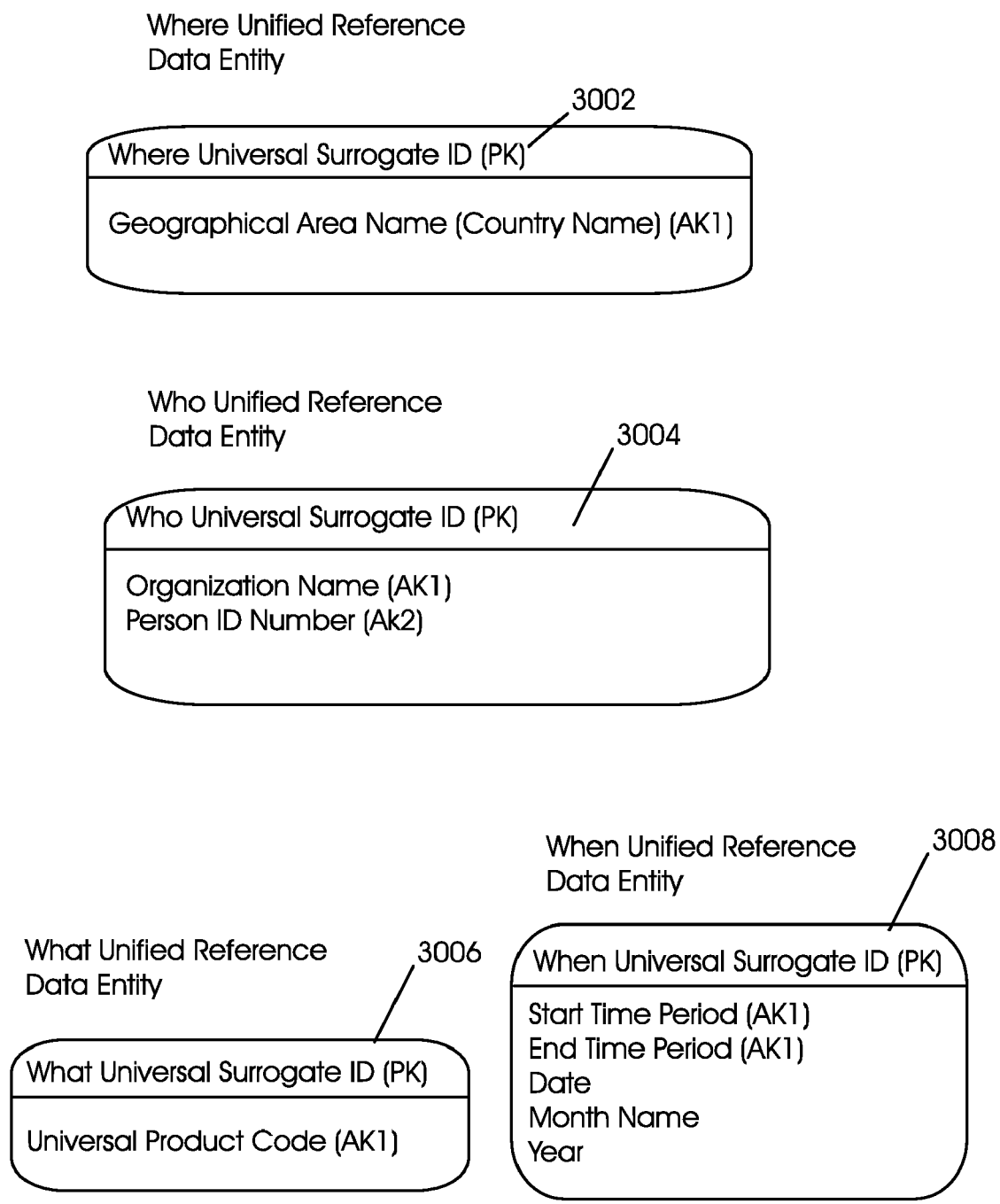
FIG. 23 shows four unified reference data entities 3002, 3004, 3006, 3008 that may be stored in data storage 2112 of FIG. 17 after the execution of process step 2404 of flow chart 2400 as shown in FIG. 17.

Next, at process step 2404, alternate keys are added to each unified reference data entity using the Data Model tool or the CASE tool running on the computer processor 4. In a Universal Reference Data Identification Method in accordance with an embodiment of the present invention, alternate keys become very important. Since universal surrogate primary keys are always declared for the unified reference data entities, each resulting database table will need one or more alternate keys, that may also be referred to as business keys, such as shown in the when unified reference database table 1600 of FIG. 10B. In database table 1600, the first column, data item Universal Surrogate Identification Number (PK), is declared as the database table's primary key, while the combination of the second and third columns, data items Start Time Period (AK1) and End Time Period (AK1), are declared as the database table's alternate key. These alternate keys provide a means of retrieving data records based upon known and significant business data items. The universal surrogate primary keys, however, are useful in joining database tables together via their foreign key indexes, to form extended data records as from a SQL (Structured Query Language) select query. Also, a unified reference database table may have multiple alternate keys declared as shown in the who unified reference data entity 3004 of FIG. 23. The who unified reference data entity of FIG. 23 has three alternate keys declared as (AK1), (AK2), and (AK3). In process step 2404, the CASE tool or data modeling tool computer software program that is executed on the computer processor 4, is used to retrieve the unified reference data entities such as 2902, 2904, 2906, and 2908 shown in FIG. 22 from data storage 2112 of computer memory 8, into another portion of computer memory 8. One or more alternate keys may be assigned to each unified reference data entity and are each designated by (AK1), (AK2), . . . (AKn). The resulting or modified unified reference data entities 3002, 3004, 3006, and 3008 are shown in FIG. 23. Please note that the when unified reference data entity 3008 now has two additional data attributes or data items that are start time period (AK1) and end time period (AK1). These two data attributes were added since an alternate key could not be assigned to any of the data attributes that previously existed. After all the alternate keys have been assigned, the CASE tool or data modeling tool computer software executed on the computer processor 4, is used to store the updated unified reference data entities in data storage 2112.

Sometimes reference data items are combined to consolidate constituent data items into a single elemental reference data item. This is an important process as it drastically reduces the number of independent data entities in an entity-relationship diagram. For example, the constituent data items of year, month and date were combined into the when unified reference data entity 3008. In the metadata spreadsheet 3300 shown in FIG. 26, the date constituent data item of metadata record row 3305, and the month constituent data item of metadata record row 3307, and the year constituent data item of metadata record row 3312 may be combined since they share a common set of business key data items. This common set of business key data items, start time period (AK1) and end time period (AK1) is also shared with the constituent data item time period of metadata record row 3316 of spreadsheet 3300 as shown in FIG. 26. In this case, the date, month and year constituent data items represent subsets of the time period constituent data item which represents the superset of possible data records such as shown in the When Unified Reference Data Entity database table 2000 of FIG. 13.

Next, process step 2206 of FIG. 17 is executed after all unified reference data entities have had their alternate keys declared. Process step 2206 as shown in FIG. 17 is the same as process step 2206 as shown in FIG. 15. Process step 2206 is further detailed in flow chart 2500 as shown in FIG. 18.

FIG. 18 shows a flow chart 2500 of a data context analysis method that may be part of the overall coherent data identification method shown by flow chart 2200 of FIG. 15. Flow chart 2500, which is shown in FIG. 18, represents the details of process step 2206 of FIG. 15. To support multiple types of data records in the same unified reference database table, several non-business data attributes need to be added to each unified reference data entity. These additional non-business type data items are used to define the data context and the data context level of each unified reference data record. In FIG. 12B, database table 1900, the data item data context (AK1) and the data item context level (AK1) were added to the when unified reference database table 1900. This use of a data context data item and a data context level data item would be a violation of the rules of data normalization as presented in FIG. 2 in prior art database table development. However, in a coherent data identification method in accordance with an embodiment of the present invention, the unified reference data entities are developed before the data normalization method is applied. These data context related data items also support reversible data normalization provided these data context data items are carried into any unified reference data entity or any unified reference database table that has data normalization rules applied. The data values for the data context (AK) data item in database table 2000 in FIG. 13 are either Gregorian calendar or Julian calendar. With the addition of the data context (AK1) data item, the when unified reference database table may now contain data associated with multiple calendars in this example. The data values for the data context level of database 2000 in FIG. 13 are Year, Year JD, Month, Date, Season, and Century. So it can be seen that these two data context related data items are used in conjunction to allow the definition of multiple types of data records in the same unified reference database table or the same unified reference data entity.

At process step 2502 of FIG. 18, a data context data item is added to the unified reference data entities. The CASE tool or the data modeling tool computer software program that is executing on computer processor 4 of FIG. 1, is used to read the modified or resulting unified reference data entities 3002, 3004, 3006, and 3008 (after they have had a primary key and alternate key(s) added), shown in FIG. 23, from data storage 2112 in the computer memory 8. The CASE tool or data modeling tool computer software program then adds a data context data item to each of the unified reference data entities in computer memory 8. Once completed, the CASE tool or data modeling tool may store the updated unified reference data entities in data storage 2112 in computer memory 8.

At process step 2504 of FIG. 18, the computer processor 4 adds a data context level data item to each unified reference data entity in the computer memory 8. The CASE tool or the data modeling tool computer program that is executed on a computer processor 4 of FIG. 1, is used to read the unified reference data entities, such as 3002, 3004, 3006, and 3008 from data storage 2112 in the computer memory 8. The CASE tool or data modeling tool computer program is then used to add a data context level data item to each of the unified reference data entities in computer memory 8. Once completed, the CASE tool or data modeling tool computer program may be used to store the updated unified reference data entities in data storage 2112 in the computer memory 8.

Figure 24:
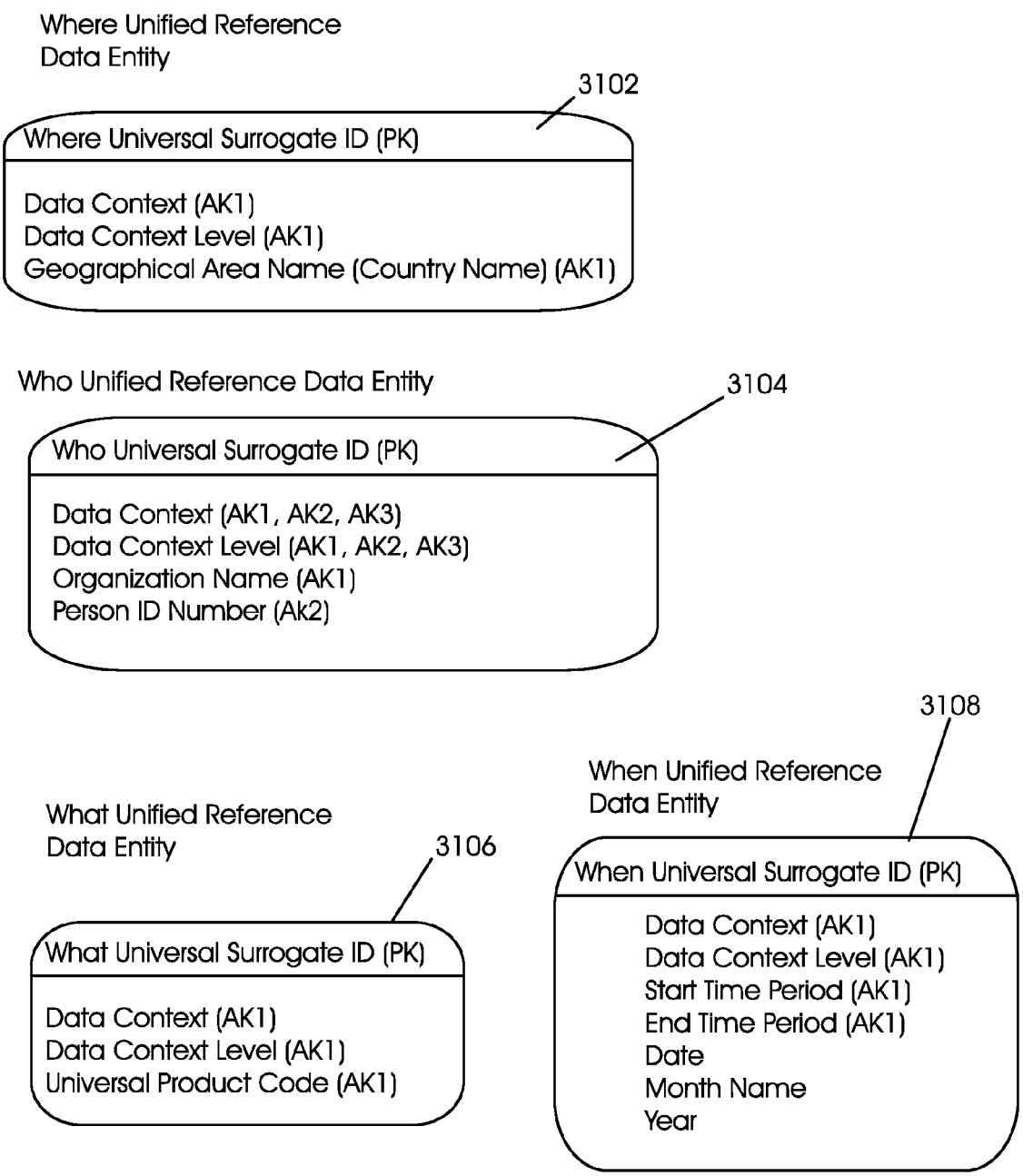
FIG. 24 shows four unified reference data entities 3102, 3104, 3106, and 3108 that may be stored in data storage 2112 of FIG. 18 after the execution of process step 2506 of flow chart 2500 as shown in FIG. 18.

Finally, at process step 2506, both data context data items are added to each alternate key of the unified reference data entities. The CASE tool or the data modeling tool computer program that is executed on computer processor 4 of FIG. 1, is used to read the unified reference data entities from the data storage 2112 in the computer memory 8. The CASE tool or data modeling tool computer program is then used to add both the data context data item and the data context level data item to each alternate key declared for each unified reference data entity. The updated unified reference data entities may appear like updated unified reference data entities 3102, 3104, 3106, and 3108 shown in FIG. 24. Once completed, the CASE tool or data modeling tool computer program, running on computer processor 4, is used to store the updated unified reference data entities 3102, 3104, 3106, and 3108 in data storage 2112 of the computer memory 8, After the completion of process step 2506, the data normalization process 2110 may begin as shown in FIG. 18. Process 2110 in FIG. 18 is the same process as process 2110 shown in FIG. 15. Process 2110 is further detailed in flow chart 2600 of FIG. 19.

FIG. 19 shows a flow chart 2600 of a data normalization method which may be part of an overall coherent data identification method in accordance with an embodiment of the present invention shown FIG. 15. Again, flow chart 2600 is a further detail of process 2110 of FIG. 15. At process step 2210, both the unified reference data entities, from process step 2206, such as data entities 3102, 3104, 3106, and 3108 depicted in FIG. 24 and the list 2910 of data items in data storage 2208 of computer memory 8, such as shown in FIG. 22, are available for the data normalization rules to be applied. The data normalization rules of FIG. 2 are applied by using the CASE tool or the data modeling tool computer program that is executed on computer processor 4 of FIG. 1. Once the data normalization rules have been applied, the logical data model is complete and should have an entity-relationship diagram such as the entity-relationship diagram shown in FIG. 4C. The completed logical data model may again be stored in data storage 2112 of the computer memory 8. After completion of the associated physical data model, the data model may be forward engineered to database instantiate database tables in the database management system.

FIG. 5 shows spreadsheet 600 of Gregorian calendar data items which can be displayed on the display device 6 of the apparatus 1 of FIG. 1 or stored in the computer memory 8 of the apparatus 1 of FIG. 1. The spreadsheet 600 includes a header row showing Date, Year, Month, Month Sequence in Year, Date Sequence in Year, and Date Sequence in Month. The spreadsheet 600 also includes seven data rows, 601, 602, 603, 604, 605, 606, and 607. Each row has data under each heading. This spreadsheet 600 of data items will have the data normalization rules applied to construct a set of normalized database tables.

The process of data normalization may be demonstrated using the Gregorian calendar data items of spreadsheet 600. For example, the Gregorian calendar has defined data items associated to dates, months and years. The spreadsheet 600 shown in FIG. 5 of un-normalized data items may be the starting point of the data normalization process as depicted in flow chart 2100 of FIG. 14.

In order to normalize the data items shown in spreadsheet 600, computer processor 4 typically would be used to first group the data items into data sets by applying the first normal form (1NF) rule, which is seen in the first row of the table in FIG. 2. To support the first normal form of these data items, a separate data entity or a separate database table is defined for each group of related data attributes or data items. Each data entity or each database table that results, also, has a primary key (PK) declared based upon the data items grouped into that database table. In addition, each data entity and each database table is named so it may be referenced by the database management system computer software program that is executed on computer processor 4.

FIG. 6A shows a first normal form database table 700 of Gregorian calendar years that may be stored in the computer memory 8 or displayed on the display device 6 of FIG. 1. The database table 700 includes a header row "Year(PK), "PK" standing for primary key, and a list of years under the header row. Please note that spreadsheet 600 in FIG. 5 had only two distinct year data values, which are the data value 1991, as shown in rows designated as 601, 602, 603, 604, and 605, and the data value 1992, as shown in rows designated as 606 and 607. Both of these data values are now represented in database table 700 of FIG. 6A in rows designated as 701 with data value 1991 and as 702 with data value 1992. This first normal form data normalization compressed the year data from seven data rows in spreadsheet 600 into two data rows of table 700.

FIG. 6B shows a first normal form database table 800 of Gregorian calendar months, which may be stored in the computer memory 8 or displayed on the display device 6 of FIG. 1. The database table 800 includes a header row with headings of Year (PK stands for primary key, FK stands for foreign key), Month (PK), and Month in Sequence in Year. There is a plurality of rows of data under the header row that result from eliminating repeating Year and Month data value combinations from spreadsheet 600 as shown in FIG. 5. Row 801 of database table 800 results from rows 601 and 602 of spreadsheet 600 where the data values of month and year are January 1991. Likewise, row 802 of database table 800 results from rows 603 and 604 of spreadsheet 600 where the data values of month and year are February 1991. Rows 803, 804, and 805 of database table 800, as shown in FIG. 6B, result from rows 605, 606, and 607 respectively of spreadsheet 600 as shown in FIG. 5. Please note that database table 800 contains the two year data values, 1991 and 1992, which are also present in database table 700 of FIG. 6A. The Year Month combinations found in database table 800 of FIG. 6B are the same Year Month combinations found in the spreadsheet 600 of FIG. 5.

FIG. 7A shows a first normal form database table 900 of Gregorian calendar dates that may be stored in the computer memory 8 or displayed on the display device 6 of FIG. 1. The database table 900 includes a header row with headings of Date (PK), Year (FK), Month (FK), Date Sequence in Year, and Date Sequence in Month. There is a plurality of rows of data under the header row. Please note that database table 900 of FIG. 7A has all the dates represented from the spreadsheet 600 of FIG. 5. That is rows 901, 902, 903, 904, 905, 906, and 907 of database table 900 from FIG. 7A result from rows 601, 602, 603, 604, 605, 606, and 607 of spreadsheet 600 respectively.

After the first normal form data normalization rule has been applied to the data items in the spreadsheet 600 shown in FIG. 5, such as by computer processor 4, the three database tables (700, 800, and 900) shown by FIG. 6A, FIG. 6B, and FIG. 7A, respectively, may be defined. FIG. 6A shows a first normal form database table 700 of Gregorian calendar years. FIG. 6B shows a first normal form database table 800 of Gregorian calendar months. FIG. 7A shows a first normal form database table 900 of Gregorian calendar dates.

Note that each database table has a primary key (PK) defined. Also, note that the Gregorian Calendar Month database table 800 of FIG. 6B contains the Year data item which is also present in the Gregorian Calendar Year database table 700 of FIG. 6A. This shared data item provides a means to "join" these database tables as to allow the retrieval of extended data records that combine data items from both database tables. These shared data items are referred to as a foreign key (FK). Also note that the Gregorian Calendar Date database table 900 shown in FIG. 7A, has the data items Year and Month in common with the Gregorian Calendar Month table 800 of FIG. 6B. These shared data items also provide the joint capability for retrieval of extended data records from tables 800 and 900. In fact, all three tables (700, 800, and 900) may be joined to retrieve the same extended data records that are shown in the original spreadsheet 600 shown in FIG. 5, of data items. This ability to join database tables to produce the original data set from its components stored in various database tables is fundamental to a data normalization method. Again, the general concept of applying the data normalization rules to normalize database tables is a part of prior art.

To create database tables that support the second normal form (2NF), each of these first normal form database tables, such as 700, 800, and 900, need to have the second normal form rule shown in row 2 of FIG. 2 applied. Applying the data normalization rule for second normal form to the Gregorian calendar year database table 700 of FIG. 6A results in the same database table. The data normalization rule for second normal form has no impact upon that database table. The Gregorian calendar year database table is now considered to be in second normal form, since the second normal form data normalization rule has been applied. The Gregorian calendar month database table 800 of FIG. 6B structure is further refined by the second normal form data normalization rule since the data item month sequence in year is depended only upon the month data item of the multi-valued primary key. By applying the second normal form data normalization rule of row 2 in spreadsheet 100, as shown in FIG. 2, to database table 800 of FIG. 6B, results in the combination of database tables 1000 in FIG. 7B, and 1100 in FIG. 8A.

FIG. 7B shows a second normal form database table 1000 of Gregorian calendar months which can be stored in the computer memory 8 or displayed on the display device 6 of FIG. 1. The table 1000 includes a header row with headings of Year (PK) and Month (PK). There is a plurality of rows of data in database table 1000 under the header row designated as rows 1001, 1002, 1003, 1004, and 1005 that result from the normalization of database table 800 of FIG. 6B rows 801, 802, 803, 804, and 805 respectively.

FIG. 8A shows a second normal form database table 1100 of Gregorian month sequences that can be stored in the computer memory 8 or displayed on the display device 6 of FIG. 1. The database table 1100 includes a header row with headings of Month (PK) and Month Sequence in Year. There is a plurality of data rows under the header row of database table 1100 designated as rows 1101, 1102, and 1103. Row 1101 of database table 1100 results from rows 801 and 804 of database table 800, in that, both rows have a month sequence in year data value of 1. Row 1102 of database table 1100 results from rows 802 and 805 of database table 800, in that, both rows have a month sequence in year data value of 2. Row 1103 of database table 1100 results from row 803 of database table 800 in that row 803 has a month sequence in year data value of 3.

A second normal form database table 1000 of Gregorian calendar months is shown in FIG. 7B. A second normal form database table 1100 of Gregorian calendar month sequences is shown in FIG. 8A. In this case, the first normal form the Gregorian calendar database table 800 in FIG. 6B has been replaced by two second normal form database tables that are table 1000 in FIG. 7B and table 1100 in FIG. 8A. In the first normal form, the Gregorian Month database table 800 of FIG. 6B, the Month Sequence number was redundant in that sequence number repeated based upon the month name.

Please note that the second normal form Gregorian calendar tables, such as table 1000 of FIG. 7B and table 1100 in FIG. 8A, also have primary keys declared as well as foreign keys. So, in a first normal form, three database tables were developed as shown in FIGS. 6A, 6B, and 7A. In second normal form, the first normal form Gregorian calendar database table 800 FIG. 6B was replaced by the two second normal form database tables, such as in table 1000 of FIG. 7B and table 1100 of FIG. 8A Therefore, in second normal form, four database tables result. These database tables are table 700 of FIG. 6A, table 1000 of FIG. 7B, table 1100 of FIG. 8A, and table 900 of FIG. 7A.

As more data normalization rules are applied by the computer processor 4, more database tables may result. Often, database tables are developed to a third normal form for implementation into a database management system. Some database table developments apply more data normalization rules as they are fitting for their business requirements.

FIG. 8B shows a spreadsheet 1200 of sales related data items for a data item classification method. This data item classification method is a portion of a coherent data identification method in accordance with an embodiment of the present invention, such as shown in process 2202 of FIG. 15 Spreadsheet 1200 includes a header row with headings of Month, Country, Product, Product Market Group, and Sales. There is a plurality of data rows under the header row.

FIG. 9A shows a database table 1300 containing calendar year data items and based upon a business key as the designated primary key, which can be stored in the computer memory 8 or displayed on the display device 6 of FIG. 1. Database table 1300 is an extended version of database table 700 in FIG. 6A where the start date (AK1) and end date (AK1) data items have been added. The database table 1300 includes a header row with headings of Year Number (PK), Start Date (AK), and End Date (AK). There is a plurality of data rows under the header row.

In prior art data entity and database table development, there are two types of primary keys used and referred to as either business keys or as surrogate keys. In FIG. 9A, database table 1300 uses the data item named Year Number (PK) as the primary key, which is classified as a business primary key. The table's designated primary key is denoted by the '(PK)' and in this case is the Year Number.

FIG. 9B shows a database table 1400 containing calendar year data items and based upon a surrogate key as the designated primary key, which can be stored in the computer memory 8 or displayed on the display device 6 of FIG. 1. Database table 1400 is another version of database table 1300 of FIG. 9A and of database table 700 of FIG. 6A. Database table 1400 includes a header row with headings of Year ID (PK), Year Number (AK1), Start Date (AK2), and End Date (AK2). There is a plurality of data rows under the header row.

This same year related data may be represented in database tables 1400, 1300, or 700. The database table 1400 uses the data item named Year ID (PK) as the primary key. This data item has no business significance and is therefore classified as a surrogate primary key. Again, the primary key of this table is denoted by the '(PK)'.

In database table 1400 of FIG. 9B the data item Year Number (AK1) may be defined as an alternate key. The alternate key is unique and is always based upon one or more business data items. Each alternate key would be database instantiated as an individual unique database table index based upon that database table. Any single data items or groups of data items, that may be used to uniquely identify all the data records in a database table, may be declared as an alternate key for that database table. A database table may have zero, one or more alternate keys defined. In the above example, the table's alternate key data item is denoted by the '(AK)' in table's header.

FIG. 10A shows a database table 1500 containing calendar quarter data items with a Year ID (FK) (AK1) foreign key data item, which can be stored in the computer memory 8 or displayed on the display device 6 of FIG. 1. The table 1500 includes a header row with headings of Quarter ID (PK), Year ID (FK) (AK1), Quarter Name (AK1), Start Date (AK2), and End Date (AK2). The Quarter ID (PK) data item is a surrogate primary key. The data item Year ID (FK) (AK1) is a foreign key that links database table 1500 of FIG. 10A to database table 1400 of FIG. 9B named "Calendar Year" and provides a means of relating the data in this Calendar Quarter table to the data in the Calendar Year table. There is a plurality of data rows under the header row.

FIG. 10B shows a when unified reference database table 1600 before the data context data attributes have been added. This database table is as it would appear after process 2204 of flow chart 2200 as shown in FIG. 15. In process step 2204, a universal surrogate key, was added along with the alternate key(s) to this unified reference database table, which can be stored in the computer memory 8 or displayed on the display device 6 of FIG. 1. The unified reference database table 1600 includes a header row with headings of Universal Surrogate Identification Number (PK), Start Time Period (AK), End Time Period (AK), Year, Month, and Date. There is a plurality of data rows under the header row. These data rows are the when unified reference data entity representation of the data records in spreadsheet 600 of FIG. 5. The data records of spreadsheet 600, rows designated as 601, 602, 603, 604, 605, 606, and 607, are represented in database table 1600 by rows designated as 1601, 1602, 1603, 1604, 1605, 1606, and 1607 respectively.

The database table 1600, as shown in FIG. 10B, may now be used to define multiple types of time periods, such as years, months, and dates in a single database table, in the fourth through sixth columns of the database table. In contrast, in the prior art database table development, these reference data items were normalized into multiple database tables such as table 700 of FIG. 6A, table 1000 of FIG. 7B, table 1100 of FIG. 8A, and table 900 of FIG. 7A.

FIG. 11 shows the when unified reference database table 1700 after the data context data items have been added to the when unified reference database table 1600 of FIG. 10B. Database table 1700 is a representation of the when unified reference database table as it would appear after the execution of process step 2206 of flow chart 2200 as shown in FIG. 15. This when unified reference database table 1700 may be stored in the computer memory 8 or displayed on the display device 6 of FIG. 1. The database table 1700 includes a header row with headings of Universal Surrogate Identification Number (PK), Start Time Period (AK1), End Time Period (AK1), Data Context (AK1), Context Level (AK1), Year, Month, and Date. There is a plurality of data rows under the header row. These data rows now represent all the data records from the original spreadsheet 600 of FIG. 5, as well as the data records from database table 700 of FIG. 6a, database table 1000 of FIG. 7B and database table 900 of FIG. 7A. Data rows designated as 1701 and 1702 in database table 1799 of FIG. 11 are elemental reference data representations of data rows designated as 701 and 702 respectively of database table 700 of FIG. 6A. Data rows designated as 1703, 1704, 1705, 1706, and 1707 in database table 1799 of FIG. 11 are elemental reference data representations of data rows designated as 1001, 1002, 1003, 1004, and 1005 respectively of database table 1000 of FIG. 7B. Data rows designated as 1708, 1709, 1710, 1711, 1712, 1713, and 1714 in database table 1799 of FIG. 11 are elemental reference data representations of data rows designated as 901, 902, 903, 904, 905, 906, and 907 respectively of database table 900 of FIG. 7A.

FIG. 12A shows the when unified reference data entity 1800 that may be used to generate the when unified reference database table 1700 shown in FIG. 11. The database table 1700 is generated by the computer processor 4 from the data entity that is stored in computer memory 8 of FIG. 1. The resulting database table may be displayed on display device 6 and may be stored in computer memory 8. Note that the primary key and the alternate keys have been declared in this data entity.

FIG. 12B shows the when unified reference database table 1900 of time periods, with various time period types of data records added, which may be stored in the computer memory 8 or displayed on the display device 6 of FIG. 1. Database table 1900 includes a header row with headings of When Universal Surrogate Identification number (PK), Start Time Period (AK1), End Time Period (AK1), Data Context (AK1), Data Context Level (AK1), Year, Month Name, and Date. There is a plurality of data rows under the header row.

Database table 1900 of FIG. 12B is an extension of database table 1600 of FIG. 10B. Database table 1600 shows the when unified reference database table as it would appear after process step 2204 of flow chart 2200 as depicted in FIG. 15. Database table 1900 is the result of adding the data context data items via flow chart 2200 process step 2206 as depicted in FIG. 15 to database table 1600 of FIG. 10B.

FIG. 13 shows the when unified reference database table 2000 which is an extension of database table 1900 of FIG. 12B with a time period name data item added, which can be stored in the computer memory 8 or displayed on the display device 6 of FIG. 1. The when unified reference database table 2000 includes a header row with headings of Universal Surrogate Identification number (PK), Start Time Period (AK1), End Time Period (AK1), Data Context (AK1), Context Level (AK1), Name, Year, Month, Name, and Date. There is a plurality of data rows under the header row.

In the when unified reference database table 2000, more data contexts and data contexts levels are now displayed. Not only are the Gregorian calendar data records displayed, but now Julian calendar data records may also be displayed such as shown in the final data record of this database table. Also, other data context levels for the Gregorian calendar are also displayed such as season and century.

FIG. 25 shows a diagram 3200 of a plurality 3210 of shared reference databases linked to one or more of a plurality 3220 of common source databases. In one embodiment of the present application the plurality 3210 of shared reference databases may include unified reference database A 3212, unified reference database B 3214, unified reference database C 3216, and any number of further unified reference databases as shown by the three dots, including unified reference database n 3218.

In at least one embodiment of the present invention, the plurality 3220 of common source databases includes a who common source unified database 3222, a what common source unified database 3224, a where common source unified database 3226, a when common source unified database 3228, a how common source unified database 3230, and a why common source unified database 3232.

The purpose for the plurality 3220 of common source databases is to form a repository for reference data records that may be used by multiple shared reference databases such as one or more of the plurality 3210. Within the plurality 3220 of common source databases, reference data records are maintained to insure data correctness and to provide a source of accurate common reference data records that may be used by a plurality of shared reference databases, such as the plurality 3210.

In prior art databases, data registries of reference data may be provided by some organizations. Currently, in the prior art, data registries are developed on an as needed basis. That is, when a need arises, a new reference data registry is defined. There are no standard methods or guidelines for their development, in the prior art. Most prior art reference data registries are deployed with little regard for other existing reference data registries. Also, there is no standard or common data structure for the databases that may use these data registries. Each database that may use a data registry, must devise their own method to utilize the reference data records provided by the data registries. Beyond that, in the prior art, the data registries themselves decide what reference data to provide as there is no high-level data governance for data registries. In some cases, data registries are not available for all reference data and in other cases, multiple data registries exist for the same reference data.

Prior art data registries support certain aspects of data management but not all that may be required. For example, some prior art data registries support multilingual reference data while other data registries are monolingual. Some prior art data registries contain only a current view of reference data while other prior art data registries support some form of chronologically accurate reference data but even these data registries implement the chronological reference data views using different methods. Prior art data registries also suffer from the lack of a standard database structure into which the data registry's data records may be deposited in databases that wish to share their data records.

In at least one embodiment of the present invention, only a single source for each constituent data item of reference data will be provided in the common source databases. The aspects of data management of each type of reference data will be consistently applied. That is, if chronologically accurate reference data is needed, it will be implemented with a single method, in an embodiment of the present invention.

In at least one embodiment of the present invention, each of the plurality 3210 of shared reference databases may exist on a separate computer from the other shared reference databases of the plurality 3210. Additionally, each of the plurality 3220 of common source databases could each exist on a separate computer as well. In fact, each common source database of the plurality 3220 could be further distributed across multiple databases on multiple computers. A communications link such as the internet would need to be available to each computer that contains these databases so that data records could be exchanged and shared across databases.

As an example of a common source database, the when common source unified database 3228 could contain a list of all time periods defined for use by the plurality 3210 of shared reference databases. All the when unified reference database tables, like database table 2000 of FIG. 13 for example, will have the same logical database structure. That is, all the when unified database tables in the plurality 3210 of shared reference databases will be forward engineered from the same logical entity-relationship unified reference data entity. Since the when unified reference database tables have structural commonality and the reference data is managed in a single common source database, it will now be simple to share and exchange time period related data between the plurality 3210 of shared reference databases. With this structural commonality and reference data commonality provided by the plurality 3210 of shared reference databases, data queries and data record sharing between the plurality 3210 of shared reference databases will be vastly simplified over what is available in prior art distributed databases.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising the steps of
storing a plurality of sets of metadata in a computer memory using a computer program running on a computer processor; and
storing a plurality of constituent data items in the computer memory using a computer program running on a computer processor, wherein each constituent data item of the plurality of constituent data items is comprised of one or more data items;
wherein each data item of the one or more data items of each of the plurality of constituent data items is a named data field which identifies a column in a database table in the computer memory;
wherein each of the plurality of sets of metadata corresponds to one of the plurality of constituent data items, such that there is one set of metadata for each of the plurality of constituent data items;
wherein each set of metadata includes
 a constituent data item name for a corresponding one of the plurality of constituent data items;
 an indication of which one or more interrogatives a corresponding one of the plurality of constituent data items may be assigned to,
 at least one business key comprised of at least one business key data item,
 and an indication of any dependencies of a corresponding one of the plurality of constituent data items on any other constituent data items of the plurality of constituent data items; and further comprising
examining each of the plurality of sets of metadata to determine if its corresponding one of the plurality of constituent data items is an independent constituent data item by use of a computer program running on the computer processor;
examining each business key data item of each of the plurality of sets of metadata to determine if each business key data item of each independent constituent data item is independent, wherein each business key data item of each independent constituent data item is independent if it is not dependent upon a business key data item in another constituent data item of the plurality of constituent data items;
wherein each constituent data item of the plurality of constituent data items is an independent constituent data item if: (a) its corresponding set of metadata includes an indication that the corresponding constituent data item can only be assigned to one and only one interrogative, (b) it is assigned in the computer memory to one and only one interrogative and (c) it is not dependent upon any other constituent data item of the plurality of constituent data items for its definition; and
further comprising combining a first independent constituent data item of the plurality of constituent data items with a second independent constituent data item of the plurality of constituent data items, wherein the first and second independent constituent data items have the same one or more independent business key data items.

2. A method comprising
setting up and storing a first entity-relationship diagram in a first data model in a computer memory prior to storing data values in a first database in the computer memory;
using a computer processor to interpret the first entity-relationship diagram in the first data model in the computer memory in order to form the first database in the computer memory; and
storing a first plurality of data records in a database table, each including a row of a plurality of data values, in the first database;
wherein the first entity-relationship diagram includes:
 a first unified reference data entity classified in the computer memory by one and only one first interrogative;
wherein the first unified reference data entity is an independent data entity in the first entity-relationship diagram;
further comprising adding the first unified reference data entity to a second entity-relationship diagram as an independent data entity;
wherein an independent data entity does not inherit any foreign key data attributes from any other data entity of the first data model, wherein a foreign key data attribute is a named data field which is used to identify a column of data values after the first database has been formed and wherein a foreign key data attribute is derived from a data entity; and
wherein a data entity is a component of the first entity-relationship diagram which becomes a database table once the first database is instantiated from the first entity-relationship diagram;
wherein the first unified reference data entity in the computer memory includes a first set of a plurality of elemental reference data items, wherein each elemental reference data item of the first set of the plurality of elemental reference data items, is classified by the first interrogative and only that first interrogative, and wherein setting up and storing the first entity-relationship diagram in the first data model in the computer memory includes storing the first set of the plurality of elemental reference data items in the first unified reference data entity in a first location in the computer memory;
wherein each elemental reference data item of the first set of the plurality of elemental reference data items is a named data field, wherein after the first database is formed each elemental reference data item of the first set of the plurality of elemental reference data items identifies a column in a first database table in the first database in the computer memory, so that there are a plurality of columns in the first database table, each of the plurality of columns identified by one corresponding elemental reference data item of the first set of the plurality of elemental reference data items;
wherein each elemental reference data item of the first set of the plurality of elemental reference data items aids in identifying a constituent data item, so that there is a first set of a plurality of constituent data items,
wherein each constituent data item of the first set of the plurality of constituent data items has a definition stored in the computer memory, so that there are a plurality of definitions stored in computer memory, one for each constituent data item of the first set of the plurality of constituent data items;

wherein each constituent data item of the first set of the plurality of constituent data items has a business key stored in the computer memory, so that there is a first set of a plurality of business keys, one for each constituent data item of the first set of the plurality of constituent data items;

wherein each business key of the first set of the plurality of business keys is comprised of one or more elemental reference data items;

wherein each business key of the first set of the plurality of business keys uniquely identifies its corresponding constituent data item; and wherein each definition of each constituent data item of the first set of the plurality of constituent data items is independent of any other constituent data item of the first set of the plurality of constituent data items, such that each constituent data item of the first set of the plurality of constituent data items has a definition that does not refer to any other constituent data item of the first set of the plurality of constituent data items.

3. A method comprising setting up and storing a first entity-relationship diagram in a first data model in a computer memory prior to storing data values in a first database in the computer memory;

using a computer processor to interpret the first entity-relationship diagram in the first data model in the computer memory in order to form the first database in the computer memory; and storing a first plurality of data records in a database table, each including a row of a plurality of data values, in the first database;

wherein the first entity-relationship diagram includes:
a first unified reference data entity classified in the computer memory by one and only one first interrogative;

wherein the first unified reference data entity is an independent data entity in the first entity-relationship diagram;

further comprising adding the first unified reference data entity to a second entity-relationship diagram as an independent data entity;

wherein an independent data entity does not inherit any foreign key data attributes from any other data entity of the first data model, wherein a foreign key data attribute is a named data field which is used to identify a column of data values after the first database has been formed and wherein a foreign key data attribute is derived from a data entity; and wherein a data entity is a component of the first entity-relationship diagram which becomes a database table once the first database is instantiated from the first entity-relationship diagram; and further comprising storing a first universal surrogate primary key in the first unified reference data entity in the computer memory, wherein the first universal surrogate primary key is a named data field, wherein after the first database is formed the first universal surrogate primary key identifies a column of a plurality of data values in the database table in the first database in the computer memory;

wherein each data value of the column of a plurality of data values is different from every other data value of the column of a plurality of data values; and wherein the first universal surrogate primary key is indicated in the computer memory to be the primary key to the first unified reference data entity as well as the primary key to each of a set of data entities that are related to the first unified reference data entity that result from a known data normalization technique of the first unified reference data entity; and wherein each data value of the column identified by the first universal surrogate primary key uniquely identifies a data record of the unified reference data entity as well as the set of data entities that are related to the first unified reference data entity of the first database, that a plurality of data records are uniquely identified by a corresponding plurality of data values of the column of data values.

4. The method of claim 3 wherein after the first database is formed, the first universal surrogate primary key identifies a plurality of columns of data values in a corresponding plurality of database tables in the first database in the computer memory; wherein each data value of the plurality of columns of data values is different from every other data value of the plurality of columns of data values.

5. A method comprising setting up and storing a first entity-relationship diagram in a first data model in a computer memory prior to storing data values in a first database in the computer memory;

using a computer processor to interpret the first entity-relationship diagram in the first data model in the computer memory in order to form the first database in the computer memory; and storing a first plurality of data records in a database table, each including a row of a plurality of data values, in the first database;

wherein the first entity-relationship diagram includes:
a first unified reference data entity classified in the computer memory by one and only one first interrogative;

wherein the first unified reference data entity is an independent data entity in the first entity-relationship diagram;

further comprising adding the first unified reference data entity to a second entity-relationship diagram as an independent data entity;

wherein an independent data entity does not inherit any foreign key data attributes from any other data entity of the first data model, wherein a foreign key data attribute is a named data field which is used to identify a column of data values after the first database has been formed and wherein a foreign key data attribute is derived from a data entity; and wherein a data entity is a component of the first entity-relationship diagram which becomes a database table once the first database is instantiated from the first entity-relationship diagram;

and further comprising storing a first data context in the first unified reference data entity in the computer memory;

and wherein the first data context is a named data field, wherein after the first database is formed the first data context identifies a column of data values in the database table in the first database in the computer memory;

wherein after the first database is formed and after the plurality of data values have been stored in the first database, the column in the database table identified by the first data context has at least two data values, each of which provides an indication of a type of data record stored in the database table of the first database;

and further comprising storing a first data context level in the first unified reference data entity in the computer memory; and wherein the first data context level is a named data field, wherein after the first database is formed the first data context level identifies a column of data values in the database table in the first database in the computer memory;

wherein after the first database is formed and after the plurality of data values have been stored in the first database, the column in the database table identified by the first data context level has at least two data values, each of which provides an indication a level of granularity of a data record to which each data value refers.

6. A method comprising setting up and storing a first entity-relationship diagram in a first data model in a computer memory prior to storing data values in a first database in the computer memory;

using a computer processor to interpret the first entity-relationship diagram in the first data model in the computer memory in order to form the first database in the computer memory; and storing a first plurality of data records in a database table, each including a row of a plurality of data values, in the first database;

wherein the first entity-relationship diagram includes:

a first unified reference data entity classified in the computer memory by one and only one first interrogative;

wherein the first unified reference data entity is an independent data entity in the first entity-relationship diagram;

further comprising adding the first unified reference data entity to a second entity-relationship diagram as an independent data entity;

wherein an independent data entity does not inherit any foreign key data attributes from any other data entity of the first data model, wherein a foreign key data attribute is a named data field which is used to identify a column of data values after the first database has been formed and wherein a foreign key data attribute is derived from a data entity; and wherein a data entity is a component of the first entity-relationship diagram which becomes a database table once the first database is instantiated from the first entity-relationship diagram; and further comprising storing a first data context in the first unified reference data entity in the computer memory; and wherein the first data context is a named data field, wherein after the first database is formed the first data context identifies a column of data values in the database table in the first database in the computer memory;

wherein after the first database is formed and after the plurality of data values have been stored in the first database, the column in the database table identified by the first data context has at least two data values, each of which provides an indication of a type of data record stored in the database table of the first database; and wherein the type of data record may only be either a first type or a second type, which is different from the first type.

7. A method comprising setting up and storing a first entity-relationship diagram in a first data model in a computer memory prior to storing data values in a first database in the computer memory;

using a computer processor to interpret the first entity-relationship diagram in the first data model in the computer memory in order to form the first database in the computer memory; and storing a first plurality of data records in a database table, each including a row of a plurality of data values, in the first database;

wherein the first entity-relationship diagram includes:

a first unified reference data entity classified in the computer memory by one and only one first interrogative;

wherein the first unified reference data entity is an independent data entity in the first entity-relationship diagram;

further comprising adding the first unified reference data entity to a second entity-relationship diagram as an independent data entity;

wherein an independent data entity does not inherit any foreign key data attributes from any other data entity of the first data model, wherein a foreign key data attribute is a named data field which is used to identify a column of data values after the first database has been formed and wherein a foreign key data attribute is derived from a data entity; and wherein a data entity is a component of the first entity-relationship diagram which becomes a database table once the first database is instantiated from the first entity-relationship diagram; and wherein the first entity-relationship diagram includes:

a second unified reference data entity classified by one and only one second interrogative;

wherein the second unified reference data entity is an independent data entity in that first entity-relationship diagram;

wherein the second unified reference data entity is added to any entity-relationship diagram as an independent data entity;

wherein an independent data entity does not inherit any foreign key data attributes from any other data entity of the first data model, wherein a foreign key data attribute is a named data field which is used to identify a column of data values after the first database has been formed and which is derived from another data entity of the first data model.

8. The method of claim 7 wherein wherein the second unified reference data entity includes a second set of the plurality of elemental reference data items, wherein each elemental reference data item of the second set of the plurality of elemental reference data items, relates to the second interrogative, and wherein setting up and storing the first entity-relationship diagram in the data model in the computer memory includes storing the second set of the plurality of elemental reference data items in the second unified reference data entity in a second location in the computer memory;

wherein each elemental reference data item of the second set of the plurality of elemental reference data items is a named data field, wherein after the first database is formed each elemental reference data item of the second set of the plurality of elemental reference data items identifies a column in a database table in the first database in the computer memory, so that there are a plurality of columns in the database table, each of the plurality of columns identified by one corresponding elemental reference data item of the second set of the plurality of elemental reference data items;

wherein each elemental reference data item of the second set of the plurality of elemental reference data items aids in identifying a constituent data item, so that there is a second set of the plurality of constituent data items;

wherein each constituent data item of the second set of the plurality of constituent data items has a definition stored in the computer memory, so that there are a plurality of definitions stored in computer memory, one for each constituent data item of the second set of the plurality of constituent data items;

wherein each constituent data item of the second set of the plurality of constituent data items has a business key stored in the computer memory, so that there is a second set of a plurality of business keys, one for each constituent data item of the second set of the plurality of constituent data items;

wherein each business key is comprised of one or more elemental reference data items;

wherein each business key of the second set of the plurality of business keys uniquely identifies its corresponding constituent data item; and wherein each definition of each constituent data item of the second set of the plurality of constituent data items is independent of any other constituent data item of the second set of the plurality of constituent data items.

9. A method comprising setting up and storing a first entity-relationship diagram in a first data model in a computer memory prior to storing data values in a first database in the computer memory;

using a computer processor to interpret the first entity-relationship diagram in the first data model in the computer memory in order to form the first database in the computer memory; and storing a first plurality of data records in a database table, each including a row of a plurality of data values, in the first database;

wherein the first entity-relationship diagram includes:

a first unified reference data entity classified in the computer memory by one and only one first interrogative;

wherein the first unified reference data entity is an independent data entity in the first entity-relationship diagram;

further comprising adding the first unified reference data entity to a second entity-relationship diagram as an independent data entity;

wherein an independent data entity does not inherit any foreign key data attributes from any other data entity of the first data model, wherein a foreign key data attribute is a named data field which is used to identify a column of data values after the first database has been formed and wherein a foreign key data attribute is derived from a data entity; and wherein a data entity is a component of the first entity-relationship diagram which becomes a database table once the first database is instantiated from the first entity-relationship diagram; and wherein the first entity-relationship diagram includes:

a second unified reference data entity referring to a second interrogative;

a third unified reference data entity referring to a third interrogative;

a fourth unified reference data entity referring to a fourth interrogative;

a fifth unified reference data entity referring to a fifth interrogative; and a sixth unified reference data entity referring to a sixth interrogative;

wherein the first, second, third, fourth, fifth, and sixth interrogatives are who, what, why, where, when, and how, respectively, and wherein the second, third, fourth, fifth, and sixth unified reference data entities are independent data entities in the first entity-relationship diagram;

wherein the second, third, fourth, fifth, and sixth unified reference data entities are added to any entity-relationship diagram of the first data model in the computer memory as independent data entities;

wherein an independent data entity does not inherit any foreign key data attributes from any other data entity of the first data model, wherein a foreign key data attribute is a named data field which is used to identify a column of data values after the first database has been formed and which is derived from another data entity of the first data model.

10. The method of claim 9 wherein the second, third, fourth, fifth, and sixth unified reference data entities include second, third, fourth, fifth, and sixth sets of the plurality of elemental reference data items, respectively, wherein each elemental reference data item of the second, third, fourth, fifth, and sixth sets of the plurality of elemental reference data items, relates to the second, third, fourth, fifth, and sixth interrogatives, respectively, and wherein setting up and storing the first entity-relationship diagram in the data model in the computer memory includes storing the second, third, fourth, fifth, and sixth sets of the plurality of elemental reference data items in the second, third, fourth, fifth, and sixth unified reference data entities in second, third, fourth, fifth, and sixth locations in the computer memory;

wherein each elemental reference data item of the second, third, fourth, fifth, and sixth sets of the plurality of elemental reference data items is a named data field, wherein after the first database is formed each elemental reference data item of the second, third, fourth, fifth, and sixth sets of the plurality of elemental reference data items identifies a column in a database table in the first database in the computer memory;

wherein each elemental reference data item of the second, third, fourth, fifth, and sixth sets of the plurality of elemental reference data items aids in identifying a constituent data item, so that there are second, third, fourth, fifth, and sixth sets of the plurality of constituent data items, wherein each constituent data item of the second, third, fourth, fifth, and sixth sets of the plurality of constituent data items has a definition stored in the computer memory, so that there are a plurality of definitions stored in computer memory, one for each constituent data item of the second, third, fourth, fifth, and sixth sets, respectively, of the plurality of constituent data items;

wherein each constituent data item of the second, third, fourth, fifth, and sixth sets of the plurality of constituent data items has a business key stored in the computer memory, so that there are second, third, fourth, fifth, and sixth sets of a plurality of business keys, one for each constituent data item of the second, third, fourth, fifth, and sixth sets, respectively, of the plurality of constituent data items;

wherein each business key is comprised of one or more elemental reference data items;

wherein each business key of the second, third, fourth, fifth, and sixth sets of the plurality of business keys uniquely identifies its corresponding constituent data item; and wherein each definition of each constituent data item of the second, third, fourth, fifth, and sixth sets of the plurality of constituent data items is independent, such that each definition does not refer to any other constituent data item of the first, second, third, fourth, fifth, and sixth sets, respectively, of the plurality of constituent data items.

11. The method of claim 9 further comprising finding a plurality of independent data entities among a plurality of data entities in a first existing entity-relationship diagram stored in the computer memory;

wherein the first existing entity-relationship diagram is a data model for a first existing instantiated database that has been populated with data records;

wherein each independent data entity of the plurality of independent data entities is a data entity of the plurality of data entities of the first existing entity-relationship diagram;

wherein each independent data entity is independent of every other data entity of the plurality of data entities of the first existing entity-relationship diagram, such that each independent data entity of the plurality of independent data entities does not inherit any foreign key data attributes from any other data entity of the plurality of data entities of the first existing entity-relationship diagram, wherein a foreign key data attribute is a named data field which is used to identify a database table's column of data values after the first existing instantiated database has been formed and which is derived from another database table's column of data values of the first existing instantiated database;

and further comprising adding the first existing entity-relationship diagram to the first entity-relationship diagram to form a first updated entity-relationship diagram by adding a plurality of data entity relationships between a plurality of the first, second, third, fourth, fifth, and sixth unified reference data entities of the first entity-relationship diagram and one or more of the plurality of independent data entities of the first existing entity-relationship diagram, to form the first updated entity-relationship diagram; and wherein the added data entity relationships cause the originally independent data entities to become dependent data entities, wherein a dependent data entity inherits one or more foreign key data attributes from another data entity of the plurality of data entities of the first existing entity-relationship diagram or the first entity-relationship diagram; and the first, second, third, forth, fifth, and sixth unified reference data entities are now the independent data entities of the first updated entity-relationship diagram.

12. The method of claim 11 wherein the plurality of data entity relationships are based on one or more interrogatives which are associated in the computer memory with the plurality of independent data entities.

13. The method of claim 9 further comprising adding a plurality of further data entities to the first entity-relationship diagram to form a modified entity-relationship diagram in the computer memory, wherein the step of forming the modified entity-relationship diagram includes forming a modified database;

wherein each of the plurality of further data entities have data entity relationships added making them dependent upon one or more of the first, second, third, fourth, fifth, and sixth unified reference data entities, wherein a dependent data entity inherits one or more foreign key data attributes from another data entity;

and further comprising populating a plurality of database tables of the modified database with data values in the computer memory;

wherein in a resulting modified entity-relationship diagram the first, second, third, fourth, fifth, and sixth unified reference data entities remain independent data entities.

14. A method comprising setting up and storing a first entity-relationship diagram in a first data model in a computer memory prior to storing data values in a first database in the computer memory;

setting up and storing a second entity-relationship diagram in a second data model in the computer memory prior to storing data values in the first database in the computer memory;

wherein the first entity-relationship diagram includes a set of independent data entities;

wherein the second entity-relationship diagram includes the set of independent data entities;

combining the first entity-relationship diagram and the second entity-relationship diagram to form a combined entity-relationship diagram in a combined data model in the computer memory;

using a computer processor to interpret the combined entity-relationship diagram in the combined data model in the computer memory in order to form the first database in the computer memory; and storing a plurality of data records, each including a row of a plurality of data values, in the first database;

wherein each independent data entity of the set of independent data entities is a data entity of a data model of a plurality of data models of the first database that is independent of all other data entities of the plurality of data models of the first database, such that each independent data entity does not inherit any foreign key data attributes from any other data entity of any of the plurality of data models of the first database, wherein a foreign key data attribute is a named data field which is used to identify a database table's column of data values after the first database has been formed and which is derived from another data entity of the plurality of data models of the first database;

wherein a data entity is database instantiated as a database table in the first database in computer memory; and further comprising setting up and storing a second entity-relationship diagram in a second data model in a computer memory prior to storing data values in a second database in the computer memory;

using a computer processor to interpret the second entity-relationship diagram in the second data model in the computer memory in order to form the second database in the computer memory; and storing a second plurality of data records, each including a second row of a plurality of data values, in the second database;

wherein the second entity-relationship diagram includes:
a second unified reference data entity referring to a second interrogative;
wherein the second unified reference data entity is an independent data entity in that second entity-relationship diagram;
wherein the second unified reference data entity may be added to any entity-relationship diagram as an independent data entity;

wherein an independent data entity does not inherit any foreign key data attributes from any other data entity of the first or the second entity-relationship diagrams, wherein a foreign key data attribute is a named data field which is used to identify a database table's column of data values in the first database and the second database after the first and the second databases have been formed and that database table's column of data values is derived from another database table's column of data values in the first database or the second database.

15. The method of claim 14 wherein
the second unified reference data entity includes a second set of a plurality of elemental reference data items, wherein each elemental reference data item of the second set of the plurality of elemental reference data items, relates to the second interrogative, and wherein setting up and storing the second entity-relationship diagram in the second data model in the computer memory includes storing the second set of the plurality of elemental reference data items in the second unified reference data entity in a second location in the computer memory;
wherein each elemental reference data item of the second set of the plurality of elemental reference data items is a named data field, wherein after the second database is formed each elemental reference data item of the second set of the plurality of elemental reference data items identifies a column in a second database table in the second database in the computer memory, so that there are a plurality of columns in the second database table, each of the plurality of columns identified by one corresponding elemental reference data item of the second set of the plurality of elemental reference data items;
wherein each elemental reference data item of the second set of the plurality of elemental reference data items aids in identifying a constituent data item, so that there is a second set of a plurality of constituent data items;
wherein each constituent data item of the second set of the plurality of constituent data items has a definition stored in the computer memory, so that there are a plurality of definitions stored in the computer memory, one for each constituent data item of the second set of the plurality of constituent data items;
wherein each constituent data item of the second set of the plurality of constituent data items has a business key stored in the computer memory, so that there is a second set of a plurality of business keys, one for each constituent data item of the second set of the plurality of constituent data items;
wherein each business key is comprised of one or more elemental reference data items;
wherein each business key of the second set of the plurality of business keys uniquely identifies its corresponding constituent data item; and
wherein each definition of each constituent data item of the second set of the plurality of constituent data items is independent and consequently does not refer to any other constituent data item of the second set of the plurality of constituent data items;
and further comprising
combining the first database with the second database in the computer memory.

16. A method comprising
storing a plurality of unified reference databases in one or more computer memories;
populating a plurality of data records for each of the plurality of unified reference databases in the one or more computer memories from a common source unified database;
wherein the common source unified database includes at least one of:
a who common source unified database, which includes only data records related to the interrogative who,
a what common source unified database, which includes only data records related to the interrogative what,
a where common source unified database, which includes only data records related to the interrogative where;
a when common source unified database, which includes only data records related to the interrogative when;
a how common source unified database, which includes only data records related to the interrogative how; and
a why common source unified database, which includes only data records related to the interrogative why; and wherein
the common source unified database includes:
a who common source unified database, which includes only data records related to the interrogative who,
a what common source unified database, which includes only data records related to the interrogative what,
a where common source unified database, which includes only data records related to the interrogative where;
a when common source unified database, which includes only data records related to the interrogative when;
a how common source unified database, which includes only data records related to the interrogative how; and
a why common source unified database, which includes only data records related to the interrogative why.

17. A method comprising
storing a plurality of shared reference databases in a computer memory,
wherein each of the plurality of shared reference databases has a first plurality of shared reference database tables, such that the first plurality of shared reference database tables is contained within each of the plurality of shared reference databases;
wherein each of the first plurality of shared reference database tables has a business key index declared, so that there are a plurality of business key indices declared for the corresponding first plurality of shared reference database tables;
wherein each business key index of the plurality of business key indices is declared by Standard Query Language (SQL)) computer software command, such that there are a plurality of business key indices declared;
wherein each business key index of the plurality of business key indices is a named data field which will later identify a database table column of business key index data values in a database table in the computer memory;
wherein each business key index of the plurality of business key indices is comprised of at least one data field;
wherein each business key index is database instantiated from one or more business related data columns such that each of the business key index data values provide unique identification of a corresponding data record of a plurality of data records and the first business key index is database instantiated in each of the first plurality of shared reference database tables,
further comprising populating the plurality of data records for each shared reference database of the plurality of shared reference databases in the computer memory from a first common source database;

wherein each of the first plurality of shared reference database tables contains only a subset of all of the data records that are used in the plurality of shared reference databases;

wherein each of the first plurality of shared reference database tables is a data structure that is populated from a first common source database;

wherein each of the first business key index database table columns is independent of any other shared reference database table columns of the first plurality of shared reference database tables in that each of the first business key index database table column has all of its data records stored in the computer memory without referring to any other shared reference database table columns of the first plurality of shared reference database tables; and further comprising using the first common source database to store and manage the data quality of a plurality of data records of each of the plurality of shared reference databases; and wherein each of the plurality of shared reference databases is an ultimate elemental reference database, such that there are a plurality of ultimate elemental reference databases, wherein each ultimate elemental reference database of the plurality of ultimate elemental reference databases contains a plurality of ultimate elemental reference database tables;

wherein each of the plurality of ultimate elemental reference database tables of each of the plurality of ultimate elemental reference databases is independent of every other ultimate elemental reference database table of the plurality of ultimate elemental reference database tables of each of the plurality of ultimate elemental reference databases, such that each ultimate elemental reference database table contains the first business key unique index.

18. The method of claim 17 wherein
wherein the first common source database includes at least one of:
a who common source unified database, which includes only data records related to the interrogative who,
 a what common source unified database, which includes only data records related to the interrogative what,
 a where common source unified database, which includes only data records related to the interrogative where;
 a when common source unified database, which includes only data records related to the interrogative when;
 a how common source unified database, which includes only data records related to the interrogative how; and
 a why common source unified database, which includes only data records related to the interrogative why; and
wherein the who common source unified database is used to populate the who ultimate elemental reference database tables in each of the who ultimate elemental reference databases;
wherein the what common source unified database is used to populate the what ultimate elemental reference database tables in each of the what ultimate elemental reference databases;
wherein the where common source unified database is used to populate the where ultimate elemental reference database tables in each of the where ultimate elemental reference databases;
wherein the when common source unified database is used to populate the when ultimate elemental reference database tables in each of the when ultimate elemental reference databases;
wherein the how common source unified database is used to populate the how ultimate elemental reference database tables in each of the how ultimate elemental reference databases; and
wherein the why common source unified database is used to populate the why ultimate elemental reference database tables in each of the why ultimate elemental reference databases.

19. The method of claim 17 wherein
wherein the first common source database includes:
a who common source unified database, which includes only data records related to the interrogative who,
 a what common source unified database, which includes only data records related to the interrogative what,
 a where common source unified database, which includes only data records related to the interrogative where;
 a when common source unified database, which includes only data records related to the interrogative when;
 a how common source unified database, which includes only data records related to the interrogative how; and
 a why common source unified database, which includes only data records related to the interrogative why; and
wherein the who common source unified database is used to populate the who ultimate elemental reference database tables in each of the who ultimate elemental reference databases;
wherein the what common source unified database is used to populate the what ultimate elemental reference database tables in each of the what ultimate elemental reference databases;
wherein the where common source unified database is used to populate the where ultimate elemental reference database tables in each of the where ultimate elemental reference databases;
wherein the when common source unified database is used to populate the when ultimate elemental reference database tables in each of the when ultimate elemental reference databases;
wherein the how common source unified database is used to populate the how ultimate elemental reference database tables in each of the how ultimate elemental reference databases; and
 wherein the why common source unified database is used to populate the why ultimate elemental reference database tables in each of the why ultimate elemental reference databases.

* * * * *